US008965787B2

(12) United States Patent     (10) Patent No.: US 8,965,787 B2
Bonev et al.     (45) Date of Patent: Feb. 24, 2015

(54) COMMUNICATIONS SYSTEM AND METHOD FOR SERVING ELECTRONIC CONTENT

(75) Inventors: Robert Bonev, Grand Forks, ND (US); Samuel Louis Palahnuk, Burbank, CA (US)

(73) Assignee: Smooth Productions Inc., Wilmington, DE (US)

(*) Notice: Subject to any disclaimer, the term of this patent is extended or adjusted under 35 U.S.C. 154(b) by 411 days.

(21) Appl. No.: 12/141,106

(22) Filed: Jun. 18, 2008

(65) Prior Publication Data

US 2009/0157658 A1    Jun. 18, 2009

Related U.S. Application Data

(60) Provisional application No. 61/051,339, filed on May 7, 2008, provisional application No. 61/014,422, filed on Dec. 17, 2007.

(51) Int. Cl.
*G06Q 30/00* (2012.01)
*G06F 7/00* (2006.01)
*G06F 17/30* (2006.01)
*G06Q 30/02* (2012.01)

(52) U.S. Cl.
CPC .......... *G06Q 30/00* (2013.01); *G06Q 30/0252* (2013.01); *G06Q 30/0273* (2013.01)
USPC ....................... 705/14.49; 707/769

(58) Field of Classification Search
CPC .............. G06F 17/30699; G06Q 30/0251
USPC ............... 707/999.006, 705, 769; 705/14.27, 705/14.49
See application file for complete search history.

(56) References Cited

U.S. PATENT DOCUMENTS

| 6,182,050 | B1* | 1/2001 | Ballard ................... 705/14.61 |
| 6,369,840 | B1 | 4/2002 | Barnett et al. |
| 6,480,830 | B1 | 11/2002 | Ford et al. |
| 6,590,568 | B1 | 7/2003 | Astala et al. |
| 6,647,269 | B2* | 11/2003 | Hendrey et al. ........... 455/456.3 |
| 6,654,789 | B1 | 11/2003 | Bliss et al. |
| 6,694,353 | B2 | 2/2004 | Sommerer |
| 6,820,204 | B1 | 11/2004 | Desai et al. |
| 6,978,246 | B1* | 12/2005 | Ruvolo et al. .............. 705/7.19 |
| 7,103,563 | B1 | 9/2006 | Voisin et al. |

(Continued)

FOREIGN PATENT DOCUMENTS

| KR | 10-2005-0055657 | 6/2005 |
| WO | WO 2009/079609 | 6/2009 |

OTHER PUBLICATIONS

WO 2009-079609 International Search Report of PCT/US2008/087293 published Jun. 25, 2009.

(Continued)

*Primary Examiner* — Brannon W Smith
(74) *Attorney, Agent, or Firm* — Andrew Bodendorf

(57) ABSTRACT

A method and system for serving electronic content for placement in a user interface provided by an online service provider system is described. The system stores user data in a user database based on user interaction with the user interface and stores filters associated with the electronic content. The user data is compared to the filters associated with the electronic content and it is determined if the user data matches conditions of the filters. If a match is determined the electronic content is provided for presentation by the user interface.

28 Claims, 47 Drawing Sheets

(56) References Cited

U.S. PATENT DOCUMENTS

| | | | |
|---|---|---|---|
| 7,117,254 | B2 | 10/2006 | Lunt et al. |
| 7,194,424 | B2 * | 3/2007 | Greer et al. ............... 705/14.66 |
| 7,383,254 | B2 * | 6/2008 | Wen et al. .......................... 1/1 |
| 7,441,194 | B2 | 10/2008 | Vronay et al. |
| 7,519,663 | B1 | 4/2009 | Bostick et al. |
| 7,526,762 | B1 | 4/2009 | Astala et al. |
| 7,673,248 | B2 | 3/2010 | Narayanaswami |
| 7,680,786 | B2 * | 3/2010 | Koran ......................... 707/713 |
| 7,721,210 | B2 * | 5/2010 | Mansikkaniemi et al. ... 715/733 |
| 7,747,966 | B2 | 6/2010 | Leukart et al. |
| 7,788,598 | B2 | 8/2010 | Bansal et al. |
| 7,930,640 | B2 | 4/2011 | Dong et al. |
| 8,015,049 | B1 | 9/2011 | Tam et al. |
| 8,051,380 | B2 | 11/2011 | Knapp et al. |
| 8,086,676 | B2 | 12/2011 | Palahnuk et al. |
| 8,161,419 | B2 | 4/2012 | Palahnuk et al. |
| 8,341,184 | B2 | 12/2012 | Bonev et al. |
| 8,510,123 | B2 | 8/2013 | Bonev et al. |
| 8,510,137 | B2 | 8/2013 | Bonev et al. |
| 2002/0016729 | A1 | 2/2002 | Breitenbach et al. |
| 2002/0055880 | A1 | 5/2002 | Unold et al. |
| 2002/0063732 | A1 | 5/2002 | Mansikkaniemi et al. |
| 2002/0065109 | A1 | 5/2002 | Mansikkaniemi et al. |
| 2002/0065881 | A1 | 5/2002 | Mansikkaniemi et al. |
| 2002/0120498 | A1 * | 8/2002 | Gordon et al. ................. 705/14 |
| 2002/0154178 | A1 | 10/2002 | Barnett et al. |
| 2002/0194246 | A1 * | 12/2002 | Moskowitz et al. .......... 709/102 |
| 2003/0014296 | A1 | 1/2003 | Meine |
| 2003/0023463 | A1 | 1/2003 | Dombroski |
| 2003/0131023 | A1 | 7/2003 | Bassett et al. |
| 2003/0177190 | A1 | 9/2003 | Moody et al. |
| 2004/0073615 | A1 | 4/2004 | Darling |
| 2004/0093317 | A1 | 5/2004 | Swan |
| 2004/0119760 | A1 | 6/2004 | Grossman et al. |
| 2004/0267585 | A1 | 12/2004 | Andereson et al. |
| 2005/0005249 | A1 | 1/2005 | Hill et al. |
| 2005/0015710 | A1 | 1/2005 | Williams |
| 2005/0039142 | A1 | 2/2005 | Jalon et al. |
| 2006/0048059 | A1 | 3/2006 | Etkin |
| 2006/0085392 | A1 * | 4/2006 | Wang et al. ....................... 707/3 |
| 2006/0167747 | A1 * | 7/2006 | Goodman et al. .............. 705/14 |
| 2006/0195472 | A1 | 8/2006 | Cadiz et al. |
| 2006/0195474 | A1 | 8/2006 | Cadiz et al. |
| 2006/0229941 | A1 * | 10/2006 | Gupta ............................. 705/14 |
| 2006/0230137 | A1 | 10/2006 | Gare et al. |
| 2006/0282319 | A1 | 12/2006 | Maggio |
| 2006/0287919 | A1 * | 12/2006 | Rubens et al. ................. 705/14 |
| 2007/0064920 | A1 | 3/2007 | Ruckart |
| 2007/0088801 | A1 | 4/2007 | Levkovitz et al. |
| 2007/0130221 | A1 | 6/2007 | Abdo et al. |
| 2007/0136430 | A1 | 6/2007 | Qureshi et al. |
| 2007/0162328 | A1 * | 7/2007 | Reich ............................. 705/14 |
| 2007/0180377 | A1 | 8/2007 | Gittleman et al. |
| 2007/0192333 | A1 | 8/2007 | Ali |
| 2007/0250645 | A1 | 10/2007 | Meadows et al. |
| 2008/0010297 | A1 | 1/2008 | Goldfarb et al. |
| 2008/0033797 | A1 * | 2/2008 | Chickering et al. ............ 705/14 |
| 2008/0046311 | A1 * | 2/2008 | Shahine et al. ................. 705/14 |
| 2008/0052162 | A1 * | 2/2008 | Wood .............................. 705/14 |
| 2008/0059297 | A1 * | 3/2008 | Vallier et al. ................... 705/14 |
| 2008/0109376 | A1 | 5/2008 | Walsh et al. |
| 2008/0114737 | A1 | 5/2008 | Neely et al. |
| 2008/0115088 | A1 | 5/2008 | Frankel et al. |
| 2008/0120396 | A1 | 5/2008 | Jayaram et al. |
| 2008/0129835 | A1 | 6/2008 | Chambers et al. |
| 2008/0133677 | A1 | 6/2008 | Pattabhiraman et al. |
| 2008/0141145 | A1 | 6/2008 | Klausmeier |
| 2008/0141247 | A1 | 6/2008 | Saravanan |
| 2008/0148181 | A1 | 6/2008 | Reyes et al. |
| 2008/0155547 | A1 | 6/2008 | Weber et al. |
| 2008/0162260 | A1 * | 7/2008 | Rohan et al. ................... 705/10 |
| 2008/0177609 | A1 | 7/2008 | Grieb et al. |
| 2008/0215426 | A1 | 9/2008 | Guldimann et al. |
| 2008/0222127 | A1 | 9/2008 | Bergin |
| 2008/0235078 | A1 * | 9/2008 | Hong et al. ..................... 705/10 |
| 2008/0235681 | A1 | 9/2008 | Barnett |
| 2008/0244425 | A1 | 10/2008 | Kikin-Gil et al. |
| 2008/0244666 | A1 * | 10/2008 | Moon et al. ..................... 725/87 |
| 2008/0250334 | A1 * | 10/2008 | Price ............................. 715/753 |
| 2008/0281665 | A1 | 11/2008 | Opaluch |
| 2008/0294655 | A1 | 11/2008 | Picault et al. |
| 2008/0294994 | A1 | 11/2008 | Kruger et al. |
| 2008/0319818 | A1 | 12/2008 | Gurdin et al. |
| 2009/0037806 | A1 | 2/2009 | Yang et al. |
| 2009/0070219 | A1 * | 3/2009 | D'Angelo et al. ............. 705/14 |
| 2009/0094093 | A1 * | 4/2009 | Phan ............................... 705/10 |
| 2009/0100347 | A1 | 4/2009 | Schemers et al. |
| 2009/0125321 | A1 * | 5/2009 | Charlebois et al. ............... 705/1 |
| 2009/0150489 | A1 * | 6/2009 | Davis et al. .................... 709/204 |
| 2009/0152349 | A1 | 6/2009 | Bonev et al. |
| 2009/0157513 | A1 | 6/2009 | Bonev et al. |
| 2009/0157693 | A1 | 6/2009 | Palahnuk |
| 2009/0157717 | A1 | 6/2009 | Palahnuk et al. |
| 2009/0158173 | A1 | 6/2009 | Palahnuk et al. |
| 2009/0158186 | A1 | 6/2009 | Bonev et al. |
| 2009/0158200 | A1 | 6/2009 | Palahnuk et al. |
| 2009/0216569 | A1 | 8/2009 | Bonev et al. |
| 2009/0313299 | A1 | 12/2009 | Bonev et al. |
| 2010/0057559 | A1 * | 3/2010 | Wilf et al. .................... 705/14.49 |
| 2010/0198684 | A1 * | 8/2010 | Eraker et al. ................ 705/14.49 |
| 2010/0280906 | A1 * | 11/2010 | Lim et al. .................... 705/14.66 |
| 2010/0324990 | A1 * | 12/2010 | D'Angelo et al. .......... 705/14.46 |
| 2012/0116888 | A1 * | 5/2012 | Hendrickson et al. ..... 705/14.66 |
| 2013/0096966 | A1 * | 4/2013 | Barnes, Jr. ......................... 705/5 |
| 2013/0218684 | A1 * | 8/2013 | Roberts et al. ............. 705/14.64 |

OTHER PUBLICATIONS

First page of free calender Website "www.famundo.com" copyright 2008 by Famundo LLC.

* cited by examiner

PEOPLE

| | |
|---|---|
| Jennifer S. | 500 Main Street |
| Cindy Cole | 123 Oak Ave |
| Larry K. | 5446 Round Circle Drive |
| Robert B. | 56 Central Park Circle |
| Marisa D. | 44556 J St. Apt 456 |
| Faith P. | 546 David Street |
| Heather J. | 990 Divide Ave |
| Arnold S. | 12 ½ High Line Ave |
| Steve S. | 4990 Venice Blvd. |
| Roger H. | 112 Fromage Blvd |
| Shannon D. | One Edge Plaza, Suite 345 |
| Susan K. | 19002 42$^{nd}$ Street |
| Nick | 5446 Round Circle Drive |
| Sandy | 56 Central Park Circle |
| Howard | 446 J St. Apt 486 |
| Mister T | 546 David Street |
| Miss T | 997 Divide Ave |

ACTIVITIES

Lunch
Dinner
Bowling
Poker Run search/add

To-Do

☑ Fix Sprinkler
☐ Oil Change
☐ Anniversary search/add

Shopping

Read 1 bowling, Bob

Send

Chat   Share

LOCATIONS

Chili's
Denny's
Café Del Sol
TGI Fridays
McDonalds
Joe's Café
Donut World search/add

MAPS

CALENDAR — 1501

May 08

| M | T | W | T | F | S | S |
|---|---|---|---|---|---|---|
|   |   |   | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | 27 | 28 | 29 | 30 | 31 |   |

AGENDA — 1510

TODAY
12PM Staff Meeting 1515
7PM Dinner with Family
TOMORROW
No events
THURSDAY
9AM Breakfast Meeting
11AM Plumber Here
12PM Lunch with Jessica
3PM Wine Tasting
FRIDAY
All day – Flight to Maui

COMMUNICATIONS SYSTEM AND METHOD FOR SERVING ELECTRONIC CONTENT

CROSS-REFERENCE TO RELATED APPLICATIONS

This application claims the benefit under 35 U.S.C. §119(e) of U.S. Provisional Application No. 61/014,422, titled "Communications System" filed on Dec. 17, 2007 in the U.S. Patent and Trademark Office and U.S. Provisional Application No. 61/051,339, titled "Dynamic Communications, Data, and Marketing System" filed on May 7, 2008 in the U.S. Patent and Trademark Office, both of which are herein incorporated by reference in their entirety for all purposes.

TECHNICAL FIELD

The following description relates generally to an integrated web-based communications service and in particular to a PIM communications system serving electronic content.

BACKGROUND

A recent poll reveals the average computer user has four different email addresses—which is just one indication that users have too many sources of incoming communications to competently maintain. In addition, conventional systems place the burden of electronic communications squarely on the shoulders of the user. Users also are presented with many different types of communications devices. Many users are simply overwhelmed by the numbers and choices of functions of these devices and software they use such that many functions go unused. And to make matters worse, communications and conversation topics often jump between a variety of mediums including voice mails, text messages, faxes, and conversations. In addition, consumers using online organizers and websites are continually bombarded with advertisements, very few of which, if any, are directed to items of interest. The approaches currently used for providing these advertisements are only slightly better than using a "shotgun", hoping that one user out of millions actually notices the ad. In fact, most users find these ads intrusive and bothersome and some go to great lengths to block them. Therefore, an improved organizational system is needed to simplify, aid, and organize presentation of information.

SUMMARY

In one general aspect, method of serving electronic content for placement in a user interface provided by an online service provider system includes storing user data in a user database based on user interaction with the user interface; storing filters associated with the electronic content; comparing the user data to the filters associated with the electronic content; determining the user data matches a condition of the filters; and serving the electronic content for presentation by the user interface.

Comparing the user data to the filters may include comparing user data to filters indicating conditions for one of who the user is, what the user is going to do, where the user is, and when a time occurs. Comparing the user data to the filters also may include comparing user data to filters indicating conditions for who the user is, what the user is going to do, where the user is, and when a time occurs. Who the user is may include relationships of the user to other people. Where the user is may include one of a mobile location, a destination, and a home location of the user. Where the user is also may include an indication of weather conditions at a location associated with the user. What the person is going to do may include an indication of a user activity, a user event, a category of product or service, a brand, a product or service name, and a stock keeping unit. When a time occurs may include an indication of one of a current time and a scheduled time.

Comparing the user data to the filters may include comparing an event stored in association with one of a user calendar, a user to-do list, a user shopping list.

Determining the user data matches a condition of the filters may include determining the user data matches a condition of each filter where if a condition associated with a filter is left unspecified it is determined the user data satisfies the unspecified condition.

Serving the electronic content may include providing a graphical advertisement (Glad) for presentation by the user interface. The graphical advertisement may provide information indicating one of an incentive, a coupon, a value, a price, a discount, an offer, and a rebate associated with a product or a service.

The method also may include monitoring indications of an interaction of a user with the Glad and storing data about the interaction.

In another general aspect, system to serve electronic content for placement in an online user interface includes a database storing user data in a user database based on user interaction with the user interface; a database storing filters associated with the electronic content; and a processing device to compare the user data to the filters associated with the electronic content; determine the user data matches a condition of the filters; and to transmit the electronic content to the user interface for presentation to the user.

The processing device may be configured to compare the user data to filters indicating conditions for one of who the user is, what the user is going to do, where the user is, and when a time occurs. The processing device also may be configured to compare the user data to filters indicating conditions for who the user is, what the user is going to do, where the user is, and when a time occurs. Who the user is may include relationships of the user to other people. Where the user is may include one of a mobile location, a destination, and a home location of the user. Where the user is also may include an indication of weather conditions at a location associated with the user. What the person is going to do may include an indication of a user activity, a user event, a category of product or service, a brand, a product or service name, and a stock keeping unit. When a time occurs may include an indication of one of a current time and a scheduled time.

The processing device may be configured to determine the user data matches a condition of each filter where the user data is determined to satisfy any filter condition that is left unspecified.

The electronic content may be a graphical advertisement (Glad) for presentation by the user interface. The graphical advertisement may provide information indicating one of an incentive, a coupon, a value, a price, a discount, an offer, and a rebate associated with a product or a service.

The processing device may be configured to monitor indications of an interaction of a user with the Glad and store data about the interaction in a database.

Other features will be apparent from the detailed description, drawings, and claims.

DESCRIPTION OF DRAWINGS

FIG. 15 is an exemplary illustration of the user interface with a extra large people lozenge and a large calendar lozenge.

FIG. 18 is an exemplary illustration of the WHO strip with the calendar lozenge focused on a contact.

FIG. 19 is an exemplary illustration of the WHO strip with the calendar lozenge filtered for the family category.

FIG. 20 is an exemplary illustration of the WHO strip with the calendar lozenge in the Month view.

FIGS. 23, 24, and 25 illustrate an exemplary sequence of selecting and dragging to add a contact to an existing group.

FIGS. 26, 27, 28, 29, and 30 illustrate an exemplary sequence of selecting items from multiple lozenges to drag to create an event.

FIGS. 44, 45, 46, and 47 illustrate the dragging and dropping of a glad to a strip of the user interface.

Throughout the drawings and the detailed description, like reference numerals refer to the like elements.

DETAILED DESCRIPTION

The following describes a system and methods that provide integrated web-based graphic user interface to manage communications for a variety of WEB-accessible mobile devices, computers, and other consumer electronic devices. The user interface provided in conjunction with a server architecture simplifies all of a user's daily communications and information. The system logic is based on utilizing networked, online, or web-based processing devices, such as servers, as the central processing and database engine for content management and communications. As the system is device and source agnostic, the system is designed to work with any web-accessible device. As a result, the user devices may provide a communications portal to collect information from and present content to the user.

The system also facilitates communication between system users and system business and/or branding partners by serving content (e.g., products and services related information) to those system users who are most likely to be interested in the content. In addition to providing the content to the most interested users, the system also may provide the content in a strategic manner (e.g., at a time and/or place when a user is more likely to be interested in the content). The user interfaces, website, system, and various processes are described in further detail below.

System Architecture

Figure 1:
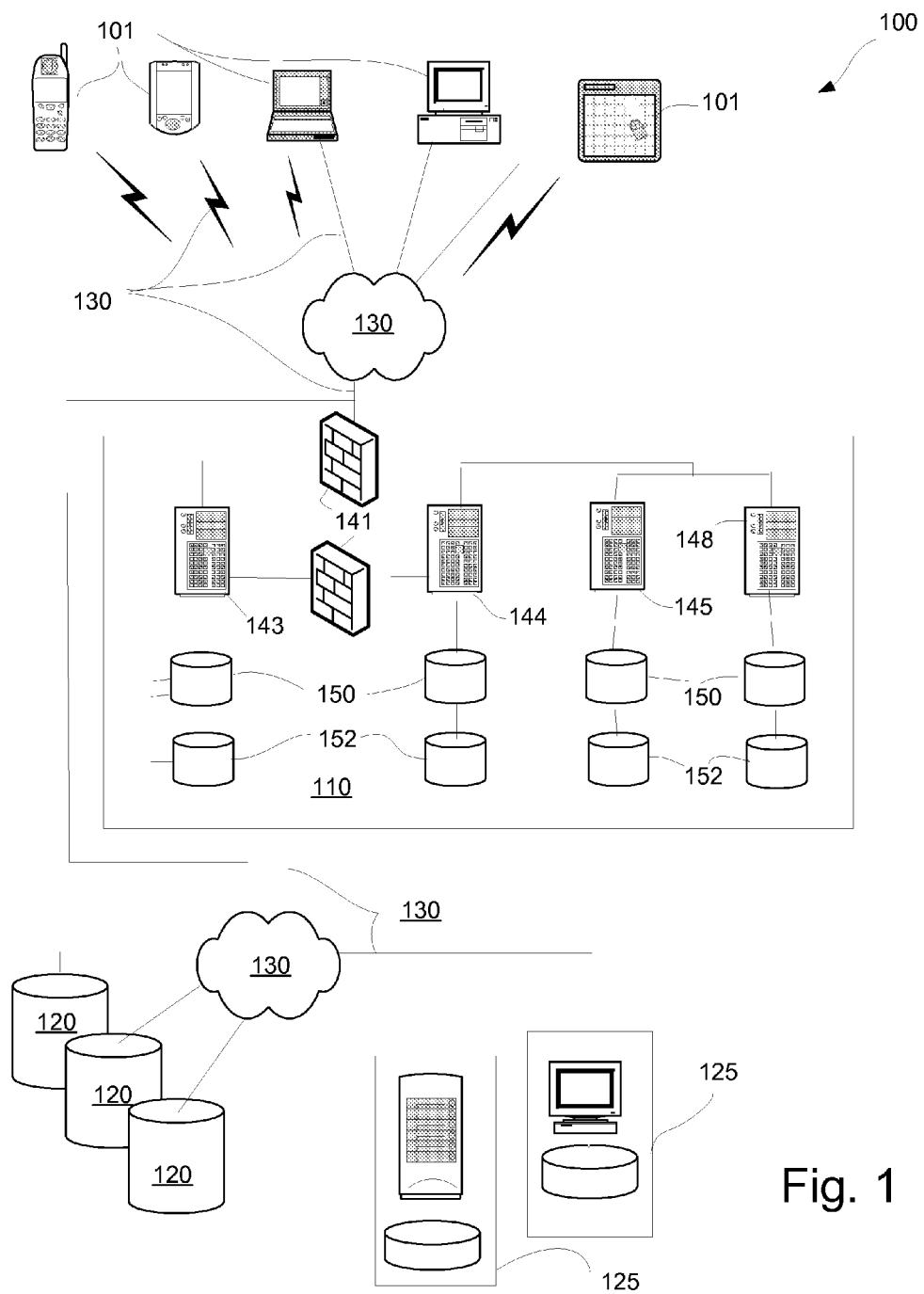
FIG. 1 shows one exemplary block diagram of a communications system.

FIG. 1 shows one block diagram of an exemplary communications system 100. The communications system 100 includes one or more user devices 101, a service provider system 110, other Internet Service Providers and websites 120, system partners 125, and various communication paths 130. As the communications system 100 is device and source agnostic, the communications system 100 is designed to work with any web-accessible user device, as explained in further detail below.

The user device 101 may be any type of electronic device that presents content received from the service provider system to the user. For example, the user device 101 may be a consumer electronics device, a mobile phone, a smart phone, a personal data assistant, a digital tablet/pad computer, a hand held/mobile computer, a personal computer, a notebook computer, a work station, a vehicle computer, a game system, a set-top-box, or any other device that can implement a user interface and/or browser to communicate with and present content from the service provider system 110.

The user device 101 may include a processing device, one or more storage devices, and one or more communications interfaces. A user device 101 also may include additional elements, such as, for example, one or more displays or screens, one or more speakers, one or more user input devices, and a microphone. A user device 101 also may include one or more associated peripheral devices, such as, for example, a display, a memory, a printer, an input device, an output device, and speakers.

The processing device may be implemented using any general-purpose or special purpose computer, such as, for example, a processor, a digital signal processor, a microcomputer, a field programmable array, a programmable logic unit, a microprocessor or any other device capable of responding to and executing instructions in a defined manner. The processing device may run one or more software applications that communicate with the service provider system 110 and present content received from the server provider system 110 to the user. The processing device also may access, store, manipulate, process, and create data in response to the applications. The software applications may include a computer program, a piece of code, an instruction, or some combination thereof, for independently or collectively instructing the processing device to operate as desired. Examples of software applications include: a browser, a mini browser, or other programs that interact with a front end interface application (FEIA) provided by the service provider system 110 to provide content, a login/signup, a user interface, and email among other features. Other examples of applications, include a mobile front end interface applications (e.g., for a cell or a smart phone) that allow the user device to communicate with the system service provider 110.

The applications, content, and data may be embodied permanently or temporarily in any type of machine, component, physical or virtual equipment, storage medium or device, or propagated signal wave capable of providing instructions or data to or being interpreted by the processing device. In particular, the applications or data may be stored by a storage medium or a memory including volatile and non-volatile memories that store digital data (e.g., a read only memory (ROM), a random access memory (RAM), a flash memory, a floppy disk, a hard disk, a compact disk, a tape, a DROM, a flip-flop, a register, a buffer, an SRAM, DRAM, PROM, EPROM, OPTROM, EEPROM, NOVRAM, or RAMBUS), such that if the memory is read or accessed by the processing device, the specified steps, processes, and/or instructions are performed and/or data is accessed, processed, or stored. The memory may include an I/O interface, such that data and applications may be loaded and stored in the memory allowing the applications, programming, and data to be updated, deleted, changed, or augmented. The memory may be removable, such as, for example, a card, a stick, or a disk that is inserted in or removed from the unit.

The communications interface may exchange data and content with the service provider system 110 using various communications paths 130. The interface allows the processing device to send and receive information using the communications paths 130. The communications interface may be implemented as part of the processing device or separately to allow the processing device to communicate using the communications paths 130. The interface may include two or more types of interfaces, including interfaces for different types of hardware and/or software to interact with different types of communications media and protocols and to translate information/data into a format that may be used by the processing device. Similarly, the interface may translate information/data received from the processing device to a format that may be transmitted to the service provider system 110 via a communications path 130.

The communications paths 130 may be configured to send and receive signals (e.g., electrical, electromagnetic, or optical) that convey or carry data streams representing various types of analog and/or digital data including content for presentation to a user. For example, the communications paths 130 may be implemented using various communications media and one or more networks comprising one or more network devices (e.g., network interface cards, servers, routers, switches, hubs, bridges, repeaters, blades, processors, and storage devices). The one or more networks may include a local area network (LAN), a wide area network (WAN), a global area network (GAN), a plain old telephone service (POTS) network, a digital subscriber line (DSL) network, an integrated services digital network (ISDN), a synchronous optical network (SONNET), Passive and Active Optical Networks (PON or AON), or a combination of two or more of these networks. In addition, the communications paths 130 may include one or more wireless links (e.g., microwave, radio, and satellite) that transmit and receive electromagnetic signals, such as, for example, radio frequency, infrared, and microwave signals, to convey information/data signal. In one example, a communications path 130 may include the Internet or World Wide Web.

The service provider system 110 facilitates communication by, organization of, and presentation of content to users. The service provider system 110 also stores and manages user associated information in a centralized location. In particular, the service provider system 110 implements a user interface to aggregate, consolidate, organize, and simplify a user's daily communications, such as email and instant messaging into a central point for one-stop organization, data, and content management.

The service provider system 110 includes one or more communications devices, processors, memories/storage devices, communications interfaces, network devices, and communications paths to store, process, manipulate, organize, consolidate, maintain, and present content and data for a user. In the example shown in FIG. 1, the service provider system 110 may include a one or more security devices 141 (e.g., firewalls), web servers 142, an application server 144, an SQL server 145 and a mirror SQL server 148, and associated memory 150 and backup memory devices 152. It is understood, however, that the example given in FIG. 1 is for illustrative purposes only, and that different configurations, combinations of devices, and numbers of devices may be provided for any particular service provider system 110. For example, the system service provider may include multiple banks of servers as need to supply adequate bandwidth for the number of users supported by the system. In addition, the system 110 may be geographically distributed.

In one example, the web server 143 may be implemented using a Dell PowerEdge 1900 2-Socket, Quad-Core Tower Server with a Red Hat Enterprise Linux 5 operating system using an apache HTTP server programming language to provide JavaServer Pages (JSP). The web server 143 may run a FEIA to aid in login, signup, and creation of a user account, and receive information from the first time wizard. The application server 144 may be implemented using a Dell PowerEdge 1900 2-Socket, Quad-Core Tower Server with a Red Hat Enterprise Linux 5 operating system using programming languages YoLinux Java, Eclipse C/C++ IDE. The application server 144 The application server may run system applications, such as, for example, the contact importer, harvester, and maintainer, calendar maintainer and syncer, mail fetcher/sender, threader, glad logic, glad placement applications, route mapper, item finder, client communicator, and user interface. The SQL Server 145 may be implemented using a Dell PowerEdge 1900 2-Socket, Quad-Core Tower Server with a Red Hat Enterprise Linux 5 operating system using an Oracle Database 11g Enterprise Edition for Linux (or equivalent) to maintain various databases, such as, for example, a contact database (DB). The mirror SQL 148 server mirrors the SQL Server 145. to maintain a user DB and a glad, advertisement, or customer incentive database, a store DB, a item DB, a contact DB, a message DB, among other described herein. The user database may include a user profile, user events, shopping lists, to-do lists, user groups and contact DB, and user locations DB. The mirror SQL server mirrors the SQL Server. The term database DB includes not only the data but may include the programming of the database application for maintaining the data.

In order to interact with the service provider system 110, a user needs to establish an account. The user must activate the account from a user device 101 running an application allowing the user device 101 to communicate with the service provider system 110, such as a browser. A browser may include any application that communicates with a web server primarily using hypertext transfer protocols HTTP (e.g., HTTP/1.1) to fetch content or provide a portal to service provided by the service provider system 110. HTTP allows the browser to submit information to servers in addition to fetching content from them. Content may be located by the browser using a uniform resource locator (URL) as an address. Many browsers also support a variety of other URL types and their corresponding protocols, such as Gopher (a hierarchical hyperlinking protocol), file transfer protocol (FTP), real-time streaming protocol (RTSP), and an SSL encrypted version of HTTP (HTTPS). Content may be provided in a hyper-text markup language (HTML) that is identified using a MIME content type. Most browsers natively support a variety of formats in addition to HTML, such as the JPEG, PNG, and GIF image formats, and can be extended to support more through the use of plugins and/or scripts. The combination of HTTP content type and URL protocol specification allows images, animations, video, sound, and streaming media to be embedded in the content.

The browser may include coding that interacts with the FEIA. The initial code that is run in the browser may be downloaded from the service provider system 110 (e.g., with purchase of an account) or retrieved from a storage medium (e.g., a CD promotional gift). The browser running on the client device 101 connects with the FEIA application run by the service provider system 110 web server 143 to initiate login, account activation, and provide a first-time questionnaire. During the initial account setup, the user may create a password and/or user identification (ID). In addition, the service provider system 110 may configure settings and data on the user device 101 (e.g., set cookies). The service provider system 110 also provides the user with a user profile questionnaire.

Figure 2:
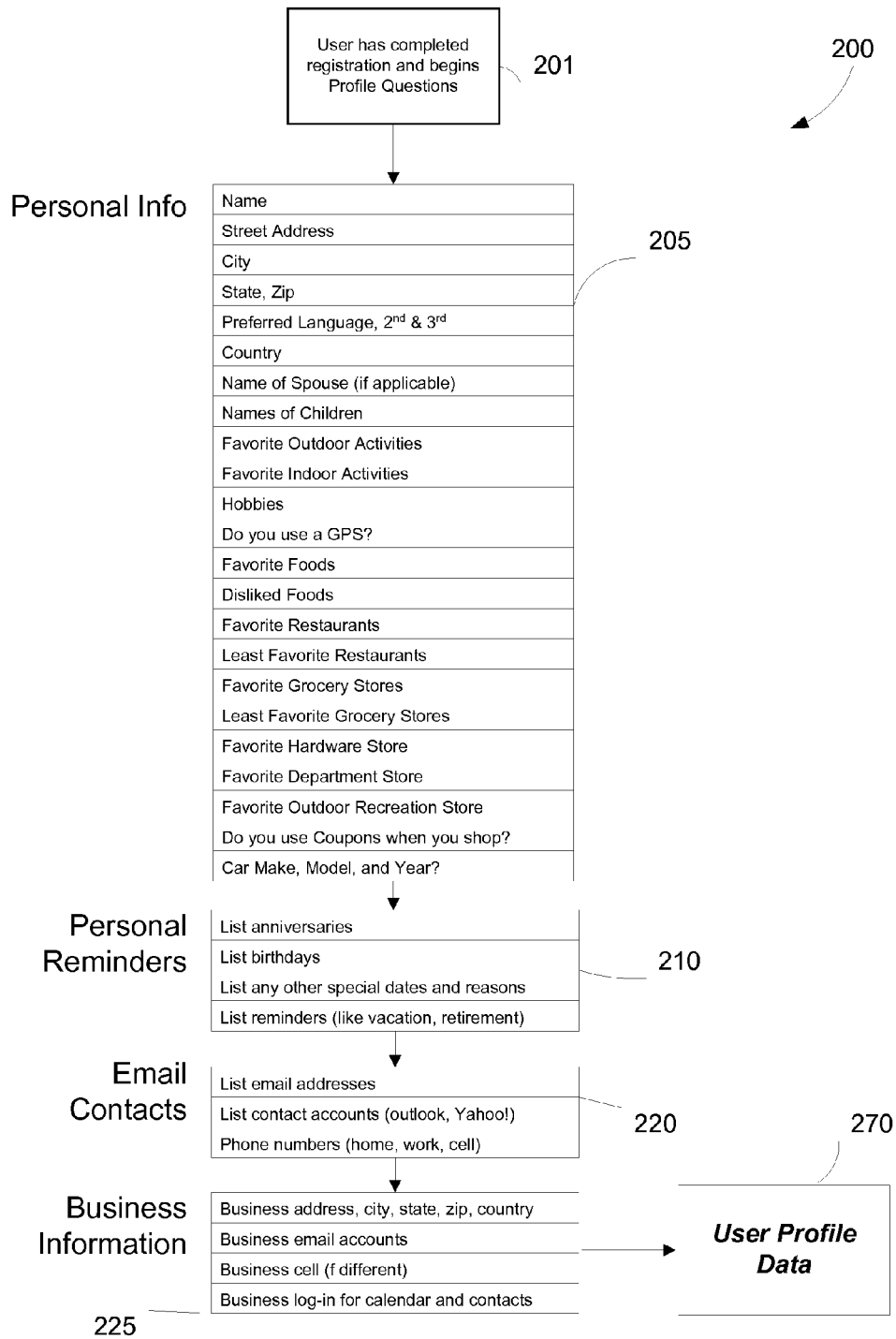
FIG. 2 is an exemplary process for a user profile questionnaire.

FIG. 2 illustrates an example 200 of how the service provider system 110 conducts the initial user profile questionnaire. As shown in FIG. 2, when the user login is first initiated 201, the service provider system 110 asks the user several questions to help tailor the content and services that are delivered to the user. After the initial questionnaire is completed, an edit function provided by the user interface allows the user to update their profile information at any time. After the user completes their initial registration, the user then responds to the questionnaire provided by the user interface, which may be updated or changed at any time. The questionnaire may be provided in any number of formats that allow a user to provide information to the service provider system 110. For example, the questionnaire may be a webpage that includes content, such as a series, list, or groups of questions for the user to answer. Various windows, fields, boxes, lists, or drop down menus may be provided to solicit and receive information from a user. Some examples of questions asked or information requested may include personal information 205, personal reminders 210, email contacts 220, and business information 225.

Examples of the personal information 205 may include: a user name, a zip code, a name of spouse, and the names of children. The user also may provide their address/contact data or the system can automatically provide address data.

The service provider system 110 also collects information about personal reminders 210 so the service provider system 110 may remind the user of important dates, such as, anniversaries; birthdays (e.g., spouse, kids, relatives, and friends); an unlimited number of special dates and names of those events; and reminders (e.g., such as vacation, appointments, activities, or retirement). The personal reminders may be used as a source of greeting events, as explained in further detail below.

The user also is prompted to input email addresses 220 (e.g., family, friends, business contact, and relatives, among other important contacts). The user is asked to input their user names/aliases/IDs/account numbers and passwords for any online accounts, such as Yahoo!, Google, MySpace, kut, Hi5, Facebook, Friendster, Linked In, XING and Twitter. The user also is asked for any other important contact information, such as phone numbers (e.g., work, cell, and home).

Business Information 225 also may be collected by the service provider system 110, such as business zip, business email account(s), business cell phone (if different), business log-in (user name and password) for contacts and calendar.

Once this information is collected, the information is stored in the user profile database 270.

Figure 3:
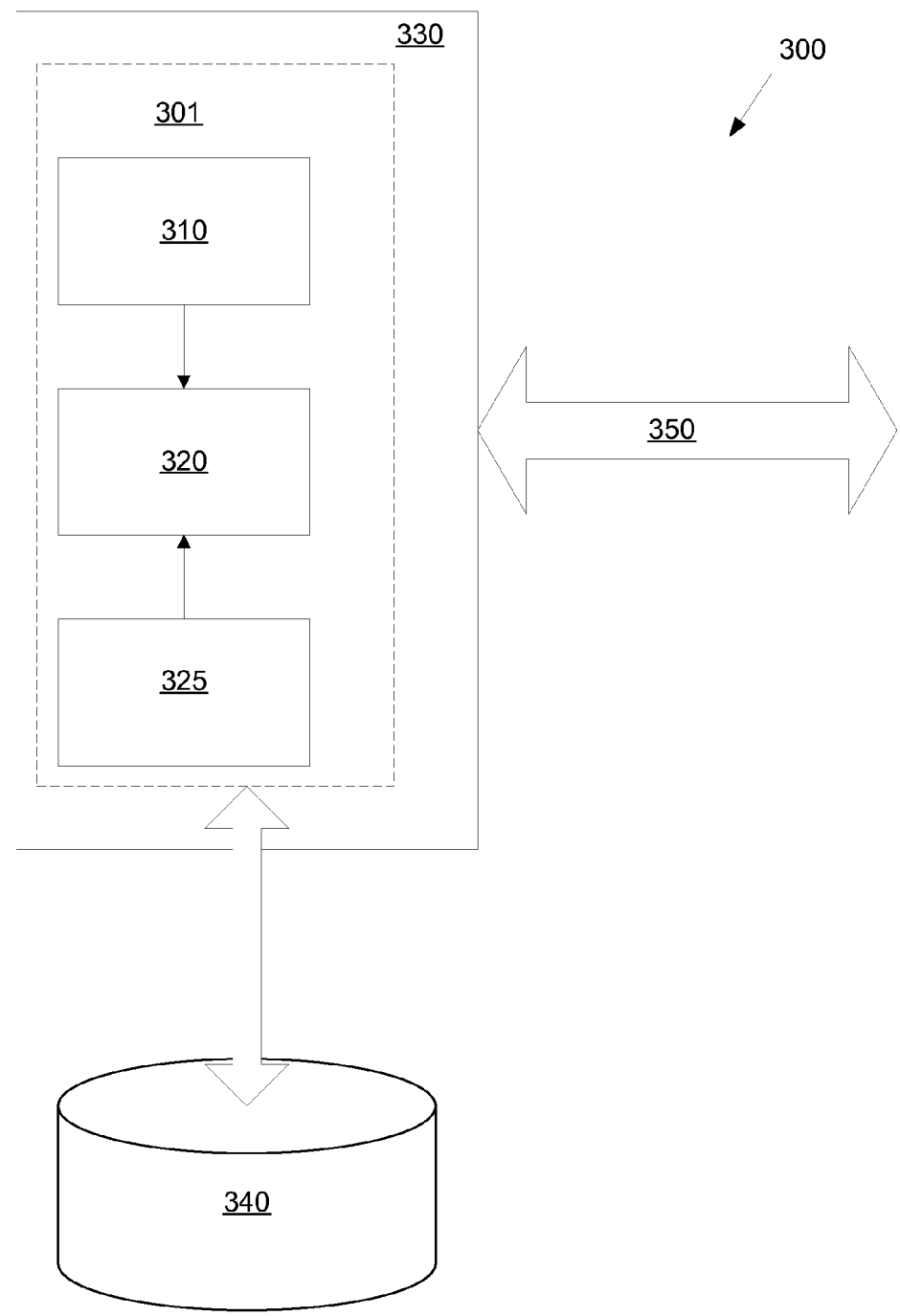
FIG. 3 is an exemplary block diagram of a contact aggregator system.

As shown in FIG. 3, the service provider system 110 works to collect, harvest, organize, and maintain contact information through the use of a contact aggregator system 300. The contact aggregator system includes a content aggregator 301. The content aggregator includes a suite of software/applications including a contact importer 310, a contact harvester 320, and contact maintainer 325 run by one or more servers 330 of the service provider system 110 that runs applications in conjunction with maintaining the client contact DB and a one or more storage devices 340. In one example, the server 330 may be implemented using the applications server 144 and associated hard disk 150 and shadow storage 152. The server 330 communicates with the rest of the service provider system 110 through communications path 350 (e.g., a communications path 130 secure link to the web server 143 and the SQL server 145).

The contact importer 310 imports contacts from various user client devices 101 and any other accounts, software, and systems associated with the user that store user contact information. The contact importer 310 also uses various user accounts information, such as the user names, the IDs, the aliases, and the passwords gathered during the initial account set up to masquerade as the user and download the user's contact information associated with or stored by any portal and/or social networking websites that user might belong to.

Using the passwords provided by the user during account setup, the contact maintainer 310 implements an automated process to login as the user on all supported address book/contact storage accounts, such as Yahoo!, Google mail, and Outlook. Any contacts that are identified from these accounts are imported into a temporary database. All imported contacts are compared against each other, and, if possible, the data is merged, the duplicates are deleted, and a final list of contacts and their associated information is created and placed in the user contact DB, which stores all of the user contacts.

For each contact associated with a user's account stored in contact DB, the contact DB may include a number of datafields to store information regarding the contact. For example, the data fields may include a contact name, one or more email addresses, a fax number, one or more mobile phone numbers, a voice phone number, a business phone number, a home number, a home address, a business address, and various IM IDs. The contact importer 310 also captures any user avatar images when available. During the automated import process, the contact importer 310 merges the data collected from various sources and eliminates any duplicate information. For each contact the importer finds in one the user's existing contact formats, the contact importer attempts to populate as many the fields provided by the contact DB as possible with the information available from the importation process. Any contacts that are missing information may be provided to the contact harvester 320 in an attempt to retrieve the missing information. The contact importer then writes this information stored in a temporary database to the Contact DB.

The contact harvester 320 is an application that is used to retrieve, supplement, and/or update contact information that may be incomplete, out of date, or in error. The service provider system 110 examines the contact DB after initial setup and periodically thereafter. As part of the examination, the service provider system 110 provides the contact harvester 320 with contacts that have information fields that are missing information, are incomplete, or may be suspected of being incorrect or out of date. The contact harvester 320 spawns a web page for such contacts to solicit missing or information in need of updating. The web page may be hosted by the web server 143. The web page may be populated with all or a portion of the existing information for the contact stored in the contact DB. In addition, information associated with one or more fields that are blank, incomplete, or missing may be requested or solicited. The web page may include window, boxes, fields, menus that may be used by a contact to provide the missing information in conjunction with a browser. The contact harvester 320 generates an email that is sent to the contact at one or more of the email addresses stored for the contact in the contact DB. The email contains a link to this spawned webpage which may then be filled out by the user. To assure the contact being solicited of the authenticity of the web page and the email with the link to the webpage, a personal message from the user may be included or other information known to the contact may be provided. For example, a photo or avatar of the user and/or a portion of the user's personal information may be included with the message and/or website.

The contact harvester 320 also may interface with a telephony based, or web-telephony based device with voice prompts and voice recognition capability. As a result, the contact harvester 320 may get in touch with a contact at a provided phone number and use automated voice recognition technology and/or automated menus to request the missing contact information directly from the contact. This is especially helpful for tracking down contact information for contacts without valid email addresses. The automated voice system translates answers from the contact into digital data that is stored in the contact DB. The contact harvester 320 may then provide a spawned website and email to the contact to verify the information received by the automated voice system. The contact harvester 320 provides a report to the user if the contact harvester 320 is unable to contact a user and/or determine missing information.

When the service provider system 110 spawns a custom website for a contact to fill out their contact information, all known contact information may be filled out in the spawned form. The contact is then asked to fill in any missing info or update and change information that may be incorrect. Certain items or fields having missing or incomplete information that can be looked up with high accuracy may are filled in automatically by contact harvester 320. For example, if the contact information contains an address with the word "Calgary" in the city field, the contact harvester safely fills in the State/Province field with "Alberta" and the country field with "Canada." If the contact includes an address field of "503 Aniston Place, Apt 43," a city field of "Salisbury," and a State/Province field of "WI," the contact harvester safely fills in the Zip Code/Postal Code field with 91234 and the country field with "USA." A sample spawned webpage which may be used by a contact to fill in missing information is shown in FIG. 4.

Figure 4:
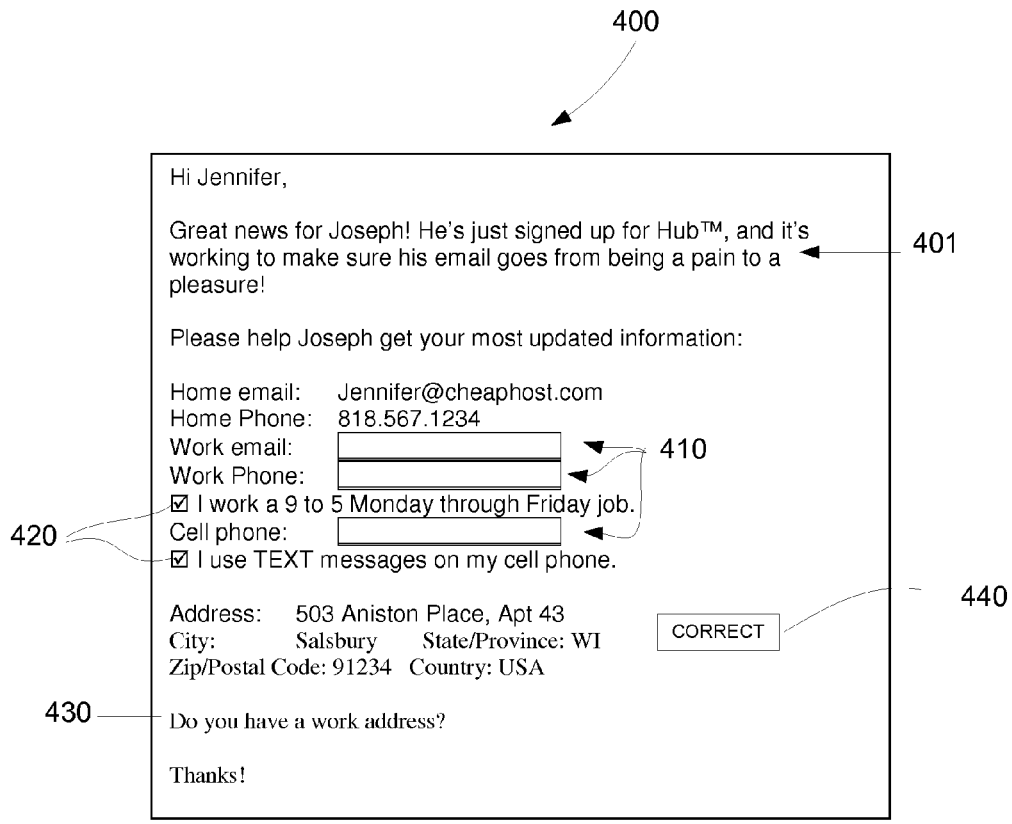
FIG. 4 is an exemplary contact fill-in form.

As shown in FIG. 4, the webpage 400 may include a personal greeting 401 and a listing of the contact data stored in the contact DB for the contact. Missing elements may include an entry field 410 for the contact to supply the missing information through use of a user input device. Check box 420 may be provided to toggle features on and off. In addition, there may be a solicitation for additional information 430 which can spawn additional web pages to supply the requested information. In addition, the webpage may include a verification 440 for the existing information. No response or a yes indication does not trigger any change; however a negative indication may spawn an additional webpage to correct and/or supplement the contact information displayed. Alternatively, the user may be able to change the information directly in the webpage by using a user input device and selecting the user information to change and change the information.

The contact maintainer 325 is an application that helps to maintain the integrity of contact information stored in the contact DB. For example, the contact maintainer 324 keeps track of failed email deliveries associated with the user account. If the contact maintainer 325 suspects that a contact has changed their email address (thereby accounting for the failed email deliveries), the contact maintainer 325 provides the information contact to the contact harvester 320. The contact harvester 320 may then generate a spawned webpage and/or use the automated phone system to determine correct contact information and/or update the contact information in the contact DB.

The contact maintainer 325 also scans or reviews user emails to detect key words and/or phrases, such as "my new phone number is," "we're moving," and "my new address is." If such key words, phrases, or combinations of key words are detected, the contact maintainer 325 parses the text to determine if the email is a change of address/email/phone message or is otherwise updating/change information associated with contact. If the contact maintainer 325 determines with a predetermined level of confidence that the email does contain such information, the contact maintainer prompts the user with a message, for example, like this:

"Hi, we think that Cynthia Alvarez might be changing her phone number from 310.234.1234 to 818.334.4456. Select here to make this change, or select here to read the email."

The user may then select to update the user information or make further inspection of the information to determine if the contact information should be updated. The message may be provided in any number of formats including email, instant messages, or directly through a user interface of the user device 101.

As described above, the service provider system 110 also gathers personal reminder information for users, such as contact birthdays. The contact maintainer 324 uses the personal reminder information as greeting events to automatically send greetings to contacts. Examples of greeting events include birthdays, anniversaries, and holidays, among others. The contact maintainer 325 uses the greeting event as an opportunity to periodically contact all members of the contact list. When the contact maintainer 325 determines the occurrence of a greeting event, the contact maintainer 325 sends a greeting to one or more contacts, such as "Happy New Year!" The greeting may be an email or instant message. The greeting may include a question for the contact, such as "Do you have new contact info?" If the user responds in the affirmative, the contact harvester 320 may spawn a webpage for the contact to review their stored contact information and update/change information as necessary. As a result, the greeting provides an opportunity to the contact to update their contact information and for the service provider system 110 to spread this information. More importantly, the contact maintenance is done without any additional effort or input required by the user.

The contact aggregator is described in further detail in co-pending U.S. patent application Ser. No. 12/141,097, titled "Contact Aggregator" filed Jun. 18, 2008, which is herein incorporated by reference in its entirety for all purposes.

Figure 5:
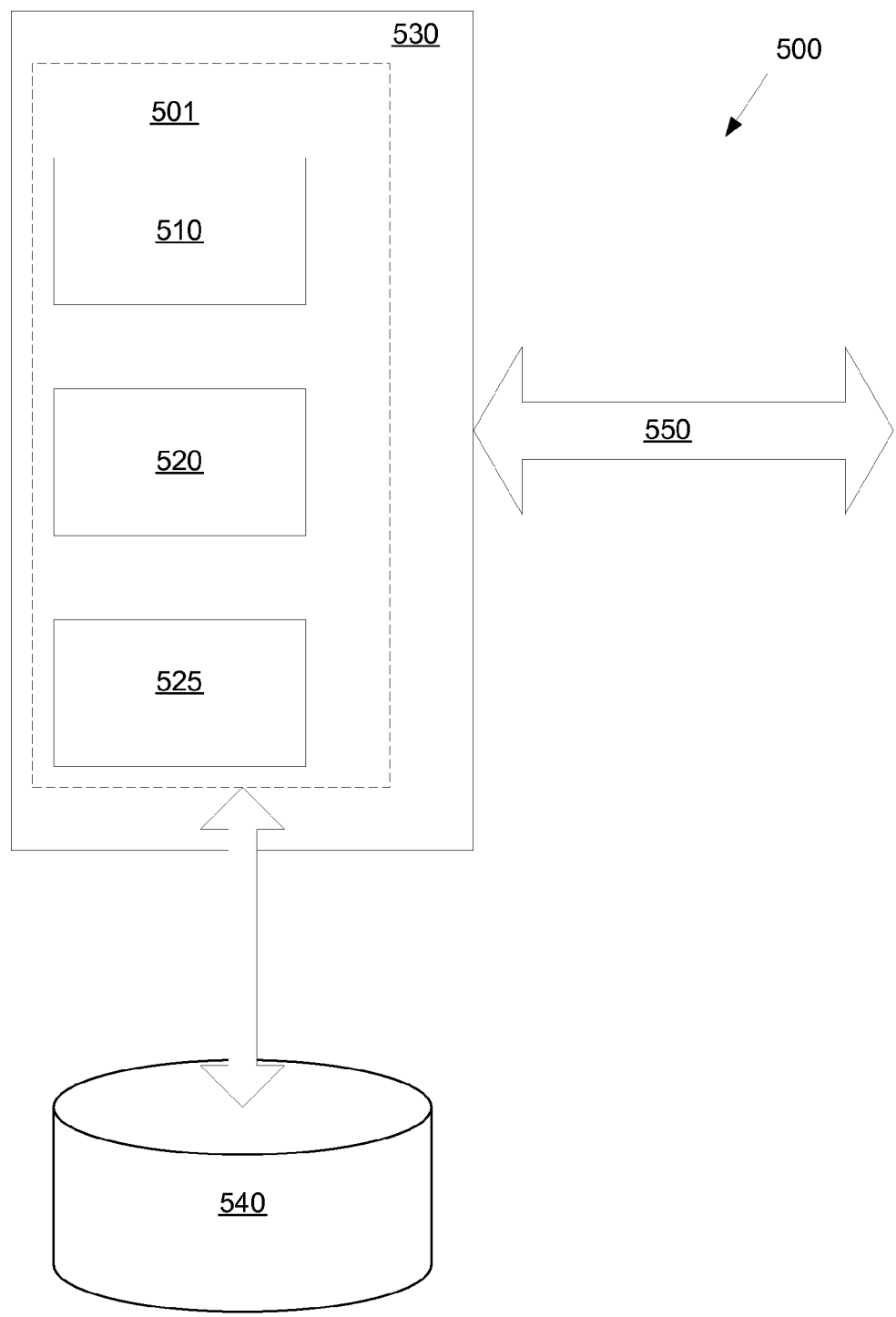
FIG. 5 is an exemplary process for message threading.

As shown in FIG. 5, the service provider system 110 works to collect, harvest, organize, and maintain a user's calendar information through the use of a calendar aggregator system 500. The calendar aggregator system 500 includes a calendar aggregator 501. The calendar aggregator includes a suite 501 of software/applications including a calendar importer 510, a calendar harvester 520, and calendar maintainer 525 run by one or more servers 530 of the service provider system 110 that runs applications in conjunction with maintaining the client calendar DB and a one or more storage devices 540. In one example, the server 530 may be implemented using the applications server 144 and associated hard disk 150 and shadow storage 152. The server 530 communicates with the rest of the service provider system 110 through communications path 550 (e.g., a communications path 130 secure link to the web server 143 and the SQL server 145).

The calendar importer 510 imports calendar data from various user client devices 101 and any other accounts, software, and systems associated with the user that store user calendar data and information. The calendar importer 510 also uses various user accounts information, such as the user names, the IDs, the aliases, and the passwords gathered during the initial account set up to masquerade as the user and download the user's calendar information associated with or stored by any portal and/or social networking websites that the user might belong to.

Using the passwords provided by the user during account setup, the calendar importer 510 implements an automated process to login as the user on all supported calendar storage accounts, such as Yahoo!, Google calendar, and Outlook. Any calendar items or data that are identified from these accounts are imported into a temporary database. All imported calendar items are compared against each other, and, if possible, the data is merged, the duplicates are deleted, and a final set of calendar data calendar is created and placed in the user calendar DB, which stores all of the user calendar information. The calendar importer 510 and its processes may be run in conjunction with the contact importer 510.

The calendar DB may include a number of data-fields to store information regarding the user's calendar. For example, the data fields may include a years, months, weeks, days, a timeline of hours and minutes during a day, and events, reminders, meetings, tasks, to-do items, shopping items, and there associated data and information. During the automated import process, the calendar importer 510 merges the data collected from various sources and eliminates any duplicate information. For each calendar the importer finds in one the user's existing calendar formats, the calendar importer 510 attempts to populate as many the fields provided by the contact DB as possible with the information available from the importation process. The calendar importer 510 then writes this information stored in a temporary database to the calendar DB.

The calendar harvester 520 is an application that is used to retrieve, supplement, and/or update calendar information by periodically logging into the users various calendar accounts to retrieve information and update the user's calendar information. The calendar harvester 520 is an application that is used to retrieve, supplement, and/or update calendar information by periodically checking these other calendar account databases either by accessing their data APIs, or by logging into these accounts utilizing user log on information (user name and password) provided by the user during setup. The calendar harvester has the ability to masquerade as the user, log onto their other calendar accounts, and harvest the data.

Depending on the type of access (API or masquerade) the frequency of the checking varies. With an API checking can happen very often, whereas masquerading may happen only a few times a day.

The calendar harvester reads the information from the user's other accounts, interprets that data thus converting it to a compatible format with the system, and then installs that data into the user's calendar.

The calendar manager 525 receives user input provided through the user interface to manage the user's calendar. The calendar manager provides calendar information and data to the user interface and receives use input to setup, schedule, and maintain user events. The calendar manager also has access to all system user calendars which allow to instantly providing information about a user's other contacts maintained by the system service provider.

In addition, to maintaining a user's contacts and calendar information, the system also manages a user's various dialogs with other users. For example, emails sent to a user account are stored by the service provider system 110 in an archive database that is associated with a user account. The archive database stores the communications in their original form (e.g., STMP). The archive database also store threads of previous user communications. The threads are chronically arranged communications between two or more individuals that have a common subject. The threads contain the actual body copy of the communication with other non-essential information removed, such as, for example, headers, signatures, boiler plate or legal disclaimers, text history, wallpaper, animations, avatars, demarcations, line or extraneous characters.

Figure 6:
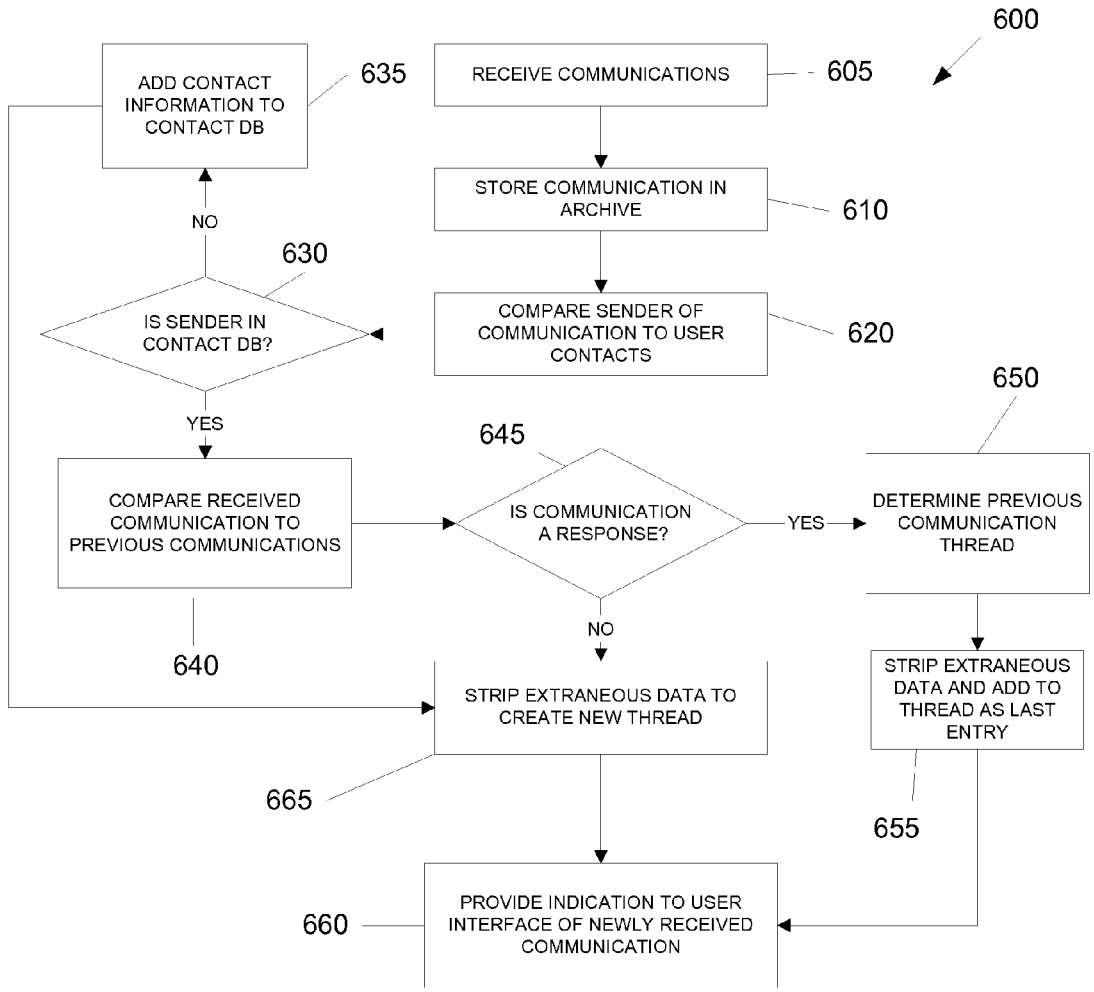
FIG. 6 is an example of a message thread.

FIG. 6 shows one example 600 the service provider system 110 processing of emails. As emails are received by the system service provider 110 (605), the emails are stored in the archive database (610). The address of the email sender is compared to the recipient's contact data to match the identification or name of the contact sending the email with information in the contact DB (620). For example, the server compares the text string in the FROM or SENDER fields with all of the contacts stored in the contact DB that are associated with a user. The system service provider determines if the user is in the contact DB 630. The service provider system 110 scans the archive DB of all current and previous communications sent or received by the user. The service provider system 110 identifies those communications between the user and the identified contact. By examining the text history in the email (i.e., the content displayed at the bottom of emails preceded by the ">" characters) and by examining the subject line, the service provider system 110 determines whether or not the email is a response to a previous communication stored in the archive DB 640.

If the email is a response, the service provider system determines a probability of which communication it is a response to 645. The service provider system 110 examines the subject, text history, and key words in the list of current conversation threads database, to determine which conversational thread the communication belongs to 650. Once a thread is determined, the system service provider 110 strips all data from the email except the actual body copy that was last typed by the contact sending the email 655. When stripping the email, the system removes all header information, all text history, signature boxes, wallpaper, avatars, animations, legal boilerplate, demarcations, lines, and extraneous characters to leave only the body copy or new communications characters sent by the contact. The body copy is then placed as a last entry to the communications thread. The updated thread is stored and an indication is provided by the user interface, as explained in further detail below 660.

If the communications is not determined to a response a new thread is created 665. When creating the new thread, the system includes only the actual body copy of the communication stripping all other data, as explained above. The new communication thread is stored in and an indication is provided by the user interface 660.

User Interface

As the number of technological advances in daily communications grows, many users find themselves overwhelmed by the sheer amount of information and content available to them. In addition, many of the user devices providing this information and content have a substantial number of functions associated with them to view and manipulate this content. As the amount of content and number of functions have grown, a typical user does not use many of the functions provided because it is difficult to access or utilize the information or the functions provided are only useful to a relatively small number of users. Therefore, a new user interface is provided to facilitate user access and manipulation of content and services provided by the service provider system 110.

The user interface provides a primary point of interaction between the user and service provider system 110. The web server 143 provides content and services to the user through a browser operating on the user device 101. The user device 101 establishes a connection to a web server 143 of the service provider system 110 using a communications path 130. After the connection is established, the primary interface is presented as screen rendered by a browser on a display of the user device 101. The screen may be a dynamic webpage provided by the web server 143 that is supplemented by additional programs, applications, and plugins operating on the user device.

The user interface provides electronic content generated by the applications, servers, and databases of the system service provider 110. The once the use device establishes a link with the service provider system 110, the user device and system exchange data. Data is transmitted from the system 110 to the browser in a markup language used by a client application or browser resident on the user device 101 and its operating system to render the page and present the user interface screen. Data also is transmitted from the user device 101 to the system 110 to provide indications of user interaction with the user interface. The data sent to the user device may be in any markup language that may be interpreted by the client application or browser running on the user devices that is presenting the system webpage. In one application, Flash technologies may be used and AJAX technologies may be used to provide the webpage of the user interface using the hypertext markup language (HTML), the JavaScript programming language, Cascading Style Sheets (CSS) and/or the eXtensible Markup Language (XML).

In one example, data may be transferred between the service and the user device using an HTML and/or XML format to render the page. Within the data of the markup language for the page, an instant messaging protocol application may be provided. The markup language is interpreted by the browser to run/assemble the instant messaging protocol application. Once operating in the browser, the instant messaging application may be used to establish an instant message link between the client application or browser and the system server. This may be done by providing the system server with connection information (e.g., an IP address and number of the port assigned to the client user device). In addition, the client device also is provided with the connection information (e.g., an IP address and number of a port on the system server). Because the client device and server both have the IP address and port number of the other, the two devices may be considered "linked." As a result, certain user interactions with the browser while manipulating the user interface are sent directly to, and received directly from the server in real time. The direct "link" may be used to provide certain information directly to and from the server and client. For example, any information for calendar events may be provided directly without, for example, the need for any page refresh between the browser and the server in order to display the associated information. In addition, all online system users have this link established. As a result, when one person updates their calendar to add an event, the calendar of another system user may appear to be updated almost instantly or in real time. Similarly other items inputted by on the interface, such as tick boxes may be updated in this manner.

The user interface may include one or more areas, portions, boxes, windows, scroll/slider bars, tools, menus, buttons, and tabs; however, the numbers and arrangement of these items is selected so as to not overwhelm a user with functionality. The functionality of the user interface may be accessed or activated through use of one or more user inputs of the user device 101. For example, items and content on the screen may be selected and manipulated using one or more screen position indicators or visual effects (e.g., a pointer, a cursor, a highlighting, a transparency, a color, an animation, or an effect) controlled by one or more user input devices (e.g., a key, a keyboard/pad, a touch screen/pad, a mouse, a joystick, a track ball, and a stylus) as is common in graphical user interfaces (e.g., a pointer controlled by a mouse to click and double-click to activate, select, and drag items within a window, browser, or desktop environment).

In most cases, items in lists can be: selected, clicked, or tapped to designate, activate, or expand the item; double-selected, clicked, or tapped to edit an item; dragged within a list to reprioritize the item; dragged from a window, a list, a tab, or a button and dropped to another to convert an item to another type of item or to activate a function; and a special selection process, such as holding down a specific key (e.g., the Ctrl key or shift key) to allow multiple items on a list to be selected and/or dragged.

Characters and text may be entered in specific locations (e.g., a text box or entry field) using a keyboard, a keypad, a number pad, or a virtual keyboard/keypad (e.g., provided through a touch screen).

As the user interacts with items, functions, and content presented by the user interface, the items, functions, and content may be focused based on their interaction. Further examples of the user interface and its functionality are given in greater detail below.

As pointed out above, many users find the number, type, and functionality of the many different user interfaces to be overwhelming or at a minimum burdensome. Accordingly, the user interface described herein presents content in manageable portions for a user. Each portion includes items, data, functions, and content concerning an area of interest to the user. In particular, the data and content of most interest to a user may be distilled into four basic areas of interest which govern their daily communications: who, what, when, and where. In addition, the user interface automatically focuses information provided within these areas to the information that is most likely desired by the user at any given moment. To aid the user and avoid confusion, all contacts, messages, and appointments may be color coded or otherwise visually distinguished to indicate which category they belong to (e.g., Red=Personal, Green=Family, Purple=Friends, and Blue=Business). As a result, items belonging to these groups may be shown in, bordered, highlighted or otherwise visually distinguished with these colors. Finally, because the user interface data, items, content, and functionality are provided by the service provider system 110, they may be accessed by the user using any web accessible device with a browser. As a result, the user has access to their information from virtually anywhere and because the information is presented consistently, the user does not need to re-familiarize themselves with different operations and functionality even when accessing the information from different user devices. Nor does the user have to worry about a lost or stolen device resulting in lost information or having it compromised.

Figure 7:
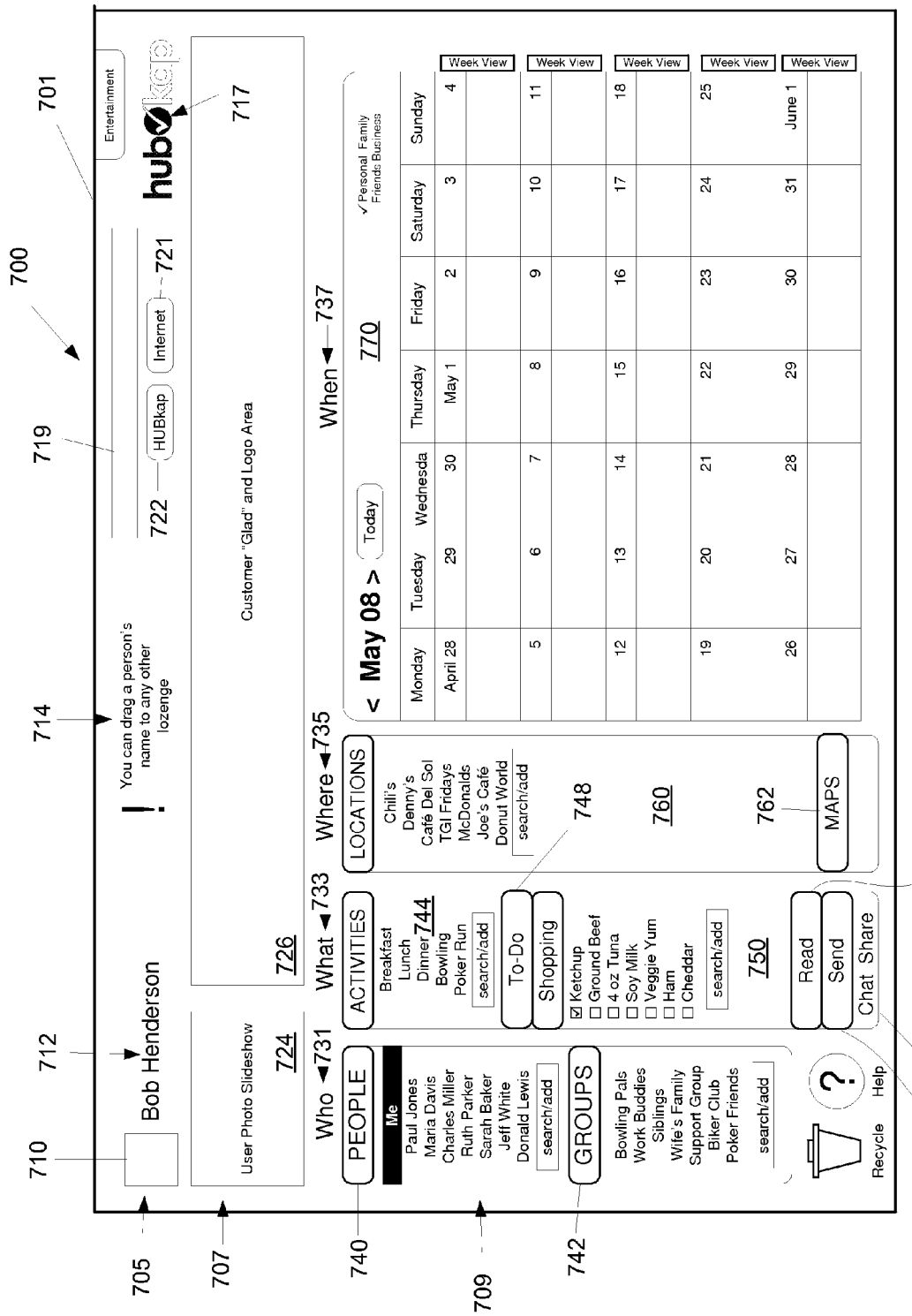
FIG. 7 is an exemplary screen map of a user interface including examples of dynamic WHO, WHAT, WHERE, and WHEN strips.

FIG. 7 shows a screen map 700 or layout of a user interface window 701. The screen map 700 of the user interface is implemented by the service provider system 110 in conjunction with a browser and other applications and plugins of the user device 101. Screen resolutions may be dimensions that are proportional to screen width and resolution used depending on type of display associated with the client device 110. The display also may be fully scaleable. As such, the screen dimensions and resolution shown in the figures is merely for illustration purposes only.

The user interface window 701 is divided into three primary areas: an information bar 705, a graphic bar 707, and a user organizer 709. As shown in FIG. 7, the first portion includes an information bar 705 that may be used to present various information pertaining to a particular user, such as, for example, a user avatar 710, a user name 712, any high-level alerts 714 (e.g., tips or message "3 new events"), and a system logo 717. In addition, a custom web search input field 719 may be provided to allow a user into input information (e.g., key words) through use of an associated user input device. The input information is supplied to a search engine to perform a query and present a response in a separate browser window. Searches of the web may be performed using Google, Yahoo, AltaVista, or any other web-based search engine. However, the service provider system 110 may automatically narrow or focus the search based on the user's personal profile stored in the user DB. In addition, the system service provider 110 may use its own propriety search engine to perform a search. Two buttons are provided, an Internet search button 721 and a system search button 722, to select where the search is to be performed. The search features are described in further detail below.

A second area 707 includes a graphic bar that provides a space or window 724 for a user photo gallery to display user photos (e.g., stored in the user database). The graphic bar also may include a products and services branding area 726 to display advertising (i.e., Glads) and logos for business clients 120 (e.g. a system sponsor). This area 707 also may be customized or used to promote a business for a sponsored user interface. The area may include identification of the business, such as a name, symbol, or logo. Selecting the business logo causes the user interface to open an additional browser to present the user with a website or other online content associated with the business. This area 707 of the user interface also may provide advertising content including coupons. The advertising display and Glads are described in further detail below.

A third portion 709 of the user interface provides a user organizer that organizes a user's daily communications, contacts, appointments, content and other information in several key contexts to facilitate the user's access to and manipulation of the information. As shown in FIG. 7, the user organizer is divided into four general themes, contexts, or strips: a WHO strip 731, a WHAT strip 733, a WHERE strip 735, and a WHEN strip 737. Each strip provides data, content, and functionality to a user in manageable portions based on a general aspect, context, or theme. The WHO strip 731 provides content and functionality regarding a user's contacts including people and groups of people. The WHAT strip 733 provides content and functionality regarding a user's daily activities, communications, shopping, and to-do items, and other events of a user's daily life. The WHERE strip 735 provides information about locations and points of interest to a user, such as addresses, points of interest, information related to points of interest, and maps associated with those locations. The WHEN strip 737 provides access to scheduled activities, events, appointments, and any other time sensitive data associated with the user. Each of the strips also dynamically focuses content and information based on user interaction with the strips. The strips also are automated such that simple manipulation of item between and within the strips causes the system to provide certain functions and service automatically. Each of the strips, their functionality, and focusing are described in further detail below.

Figure 8:
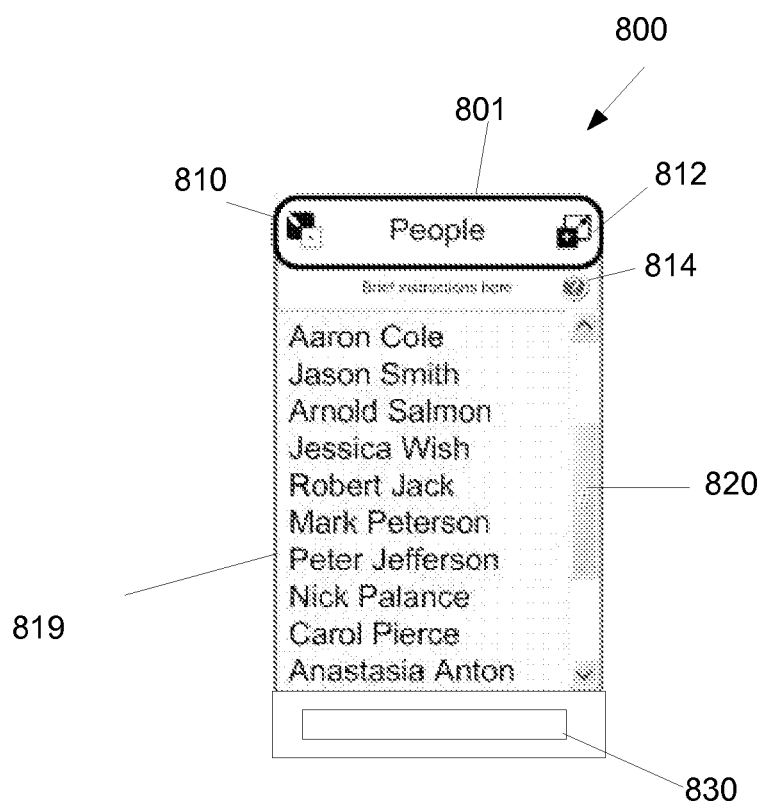
FIG. 8 is an example of a lozenge for use in a strip of the user interface.

The information and functionality provided by each strip are accessed through manipulation of one or more lozenges provided in each of the strips. FIG. 8 shows an example 800 of a lozenge. The lozenge 800 is an interactive, dynamic window that provides content and functionality to a user. Each lozenge allows a user to quickly arrange and display information and functionality within the theme or context of the strip. The lozenge may include one or more of the following: a title bar 801 including an expand icon 810 and a contract 812 icon, a information/item area 819, navigation aids (e.g., a scroll or slider bar) 820 and a search/add field 830. The area or window occupied by the lozenge 800 within a strip expands and/or contracts based on a user request or via automatic processes. Generally the lozenges may be presented as: small, medium, large, and extra large. In addition, the size of one lozenge may automatically and reciprocally affect the size of the one or more other lozenges within a strip based on user interaction with the strips.

A small lozenge generally occupies a minimal area of a strip, for example, less than 15% of the area of a strip and provides minimal information and functionality. For example, a small lozenge may include a title bar and some additional information, such as a minimal alert or counters. A medium lozenge provides a portion of the overall content associated with a lozenge focused generally, for example, on the most used or most needed content or functionality associated with the lozenge, such as alerts and/or counters. In one example, a medium lozenge occupies approximately up to half of a strip. A large lozenge may be considered full size providing multiple ways to view data while providing all the functionality associated with the lozenge. In one example, a large lozenge occupies a majority of the strip. Finally, an extra large lozenge provides additional space with an emphasis on editing data, adding/reordering items, and viewing of additional information provided by the lozenge. In one example, the extra large lozenge occupies a space larger than a strip, for example, the space of up to three large lozenges or additional strips. The individual lozenges are described below within the context of their strips.

At the bottom of a lozenge a data search/add field 820 (e.g., a text box) may be provided in which a user enters characters using user input device. As a user enters characters into the field, the system performs a character-by-character analysis to determined items featuring the letters the user is typing. The system displays in or next to the field any items that correspond with the characters. At any time the user may select one of the displayed items. If the user types in a character string that is not present in the database, and selects the items using a user input device (e.g., pressing ENTER), then the item is added to the database. The field may be used, for example, to add an item to the list or perform a search within the context of the lozenge.

The WHO strip 731 includes two lozenges: people 740 and groups 742. The WHAT strip 733 includes six lozenges: activities 744, to-do 748, shopping 750, buy (not shown), read 752, and send 753. The WHERE strip 735 includes two lozenges: locations 760 and maps 762. The WHEN strip 737 includes one lozenge: dynamic calendar 770. Expanding a lozenge causes a corresponding reduction in the size of one or more other lozenges within a strip, as explained in further detail below. Similarly, expanding a strip to accommodate an extra large lozenge, causes a correspond reduction in the size of one or more other strips. Any strips or lozenges that are shrunk may be done so in order of the oldest to the most recently used.

Figure 9:
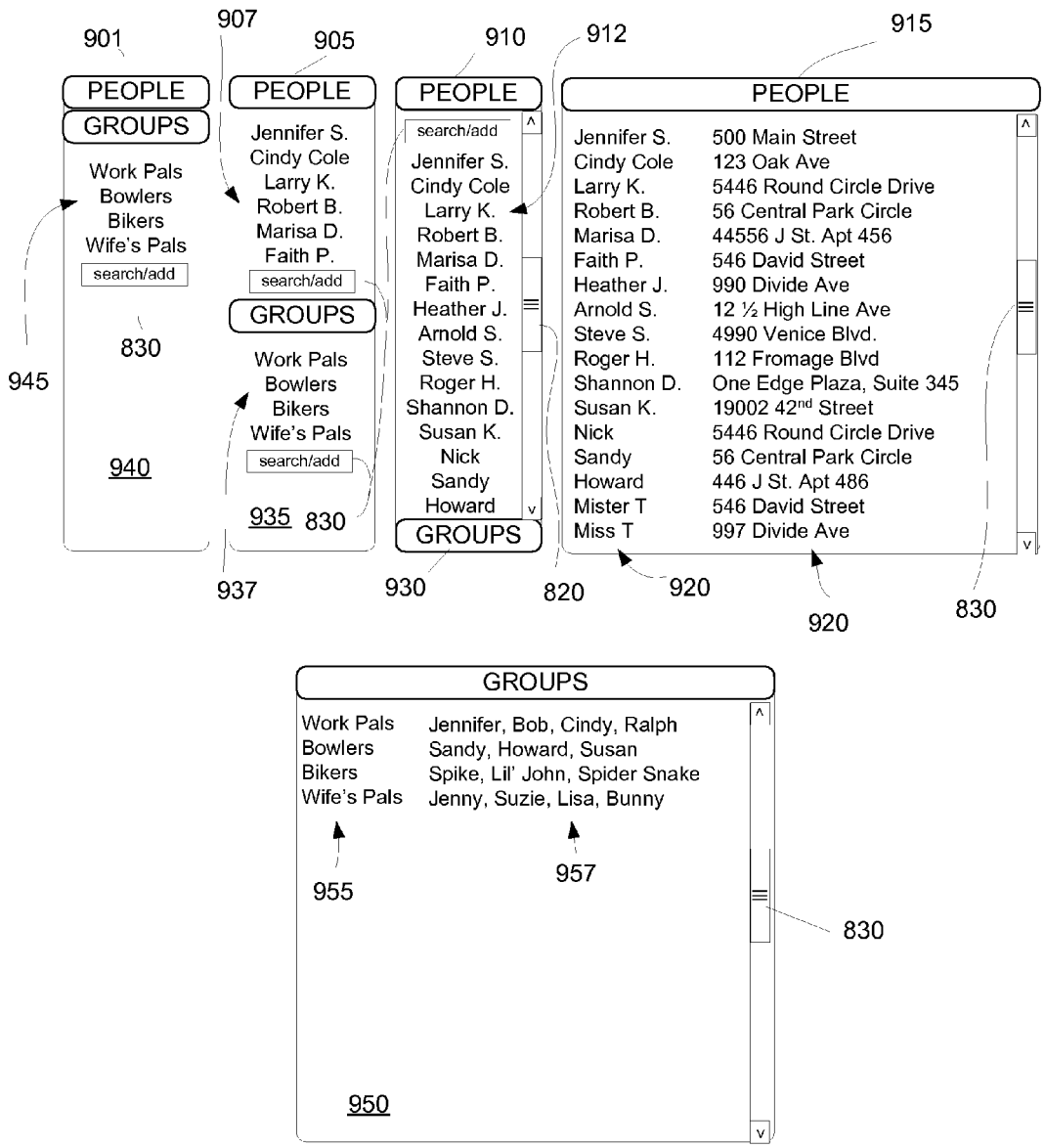
FIG. 9 is an exemplary illustration of the WHO strip.

FIG. 9 shows examples of the WHO strip 731 of the user interface which is used to create, maintain, and access a user's contact information. In FIG. 9 the reciprocal relationship between a small, a medium, and a large people and a small, a medium, and a large groups lozenge is shown.

The small people lozenge 901 includes a title bar "People."

The medium people lozenge 905 includes a list 907 of a subset of a user contacts. In one example, the medium lozenge includes a list of the most popular and/or the contacts most recently communicated with. The list of contacts may include a visual indicator and label, such as stars and the word popular (not shown). The list 907 may include up to ten contacts; however, other numbers of contacts may be provided. While connected to the service provider system 110, the web server 143 in conjunction with the applications server 144 monitors the user's interaction with the user interface to populate the list with the most relevant contacts of interest to user. The medium people lozenge 905 also includes a search/add data entry field 820. The search/add field 820 may be used to search for a contact within the user's contact database. As a user enters characters within the field, the system automatically provide a list of contacts (not shown) matching those letters typed by the user. The user may select any contact from the list at any time or continue adding characters. If a contact entered in the field is not in the database, the system asks the user if they wish to add the contact to the database.

The large people lozenge 910 includes a configurable list 912 of a user's contacts. A navigation aid 830 (e.g., a scroll bar or slider) may be provided for use in conjunction with a user input device to configure, manipulate, and/or sort the contacts displayed by the list 912. For example, the configurable contact list 912 may be sorted by: recently accessed contacts, a first name, a last name, those contacts with whom a user is currently communicating, those contacts with whom a user has planned events, appointments or activities on the calendar, those contacts for whom a user has extended an invitation, those contacts with whom a user owes a response to a message, a specific letter in a contact name, and those contacts in order of proximity to a location selected on or inputted to the "Where" strip. The desired sort option may be selected from a menu or corresponding input (e.g., a button or check box). If there are more names in a list than may be displayed within the area provided by the people lozenge, a navigation aid (e.g., a scroll bar, a slider bar, direction arrow keys, grab and move pointer, or a pointing device) may be used to navigate through or see the remaining portion of the list. Items within the list also may be rearranged by a user selecting a name with a user input device and dragging the name within the list. The large people lozenge 910 also includes a search/add field 820.

The extra large people lozenge 915 includes a full list 920 of all user contacts with a navigation aid 830 (e.g., scroll or slider bar) that may be sorted by: a contact first name and a contact last name. In addition, inputs (not shown) may be provided to jump to a specific letter of a contact's name in the list. A number of fields of data for each contact are also displayed. For example, fields for a contact address 921, a contact phone number, and a contact email address may be provided for each contact. Information in the displayed fields also may be edited. The extra large people lozenge 915 occupies roughly three times the size of a normal strip.

Four additional inputs (not shown) are provided to interact with the displayed lists of the extra large people lozenge 915: select, edit, add, and aggro. Using the "select" input or directly selecting a name from a list using a user input device (e.g., using a mouse to single click on any contact name) causes the name to be visually indicated (e.g., highlighted, bolded, outlined, etc.). In addition, selecting a name causes the other strips to focus on or present content associated with the selected contact, as explained in further detail below. Selecting the "edit" input or a name directly from a list using a user input device (e.g., by double-clicking on the name) allows the user to update the contact information. Selecting edit provides a pop-up area (not shown) with information fields populated with a selected contact's information that is stored in the contact DB. The user may edit any of the fields and save the edited contact information. Selecting the "add" input creates a pop-area including a number of blank data fields which may be populated with a new contact's information. Selecting the "aggro" input causes the contact aggregator to verify the contact information stored for the selected contact in the contact DB.

A number of symbols and indicators (not shown) may be used in association with the names listed in the people lozenge to provide additional information to a user. For example, a tiny email envelope next to a contact name may be used to indicate, at a glance, that a new message has been received from the contact. A tiny calendar/clock icon next to a contact name may be used to indicate a new calendar event has been established for the contact. A tiny clock next to a contact name may be used to indicate that the contact aggregator is in the process of aggregating this contact's information. Colors (e.g., red, blue, purple, or green) may be used to display the contact name of the list to indicate the type of contact if the contact has been indicated to be one of personal, work, friend, or family contact.

FIG. 9 also shows examples of a small, a medium, a large, and an extra large "groups" lozenge of the WHO strip 731. The groups lozenge allows the user to define and select groups in order to organize their communications with multiple contacts. A color (e.g., red, blue, or green) may be associated with each group name to indicate the type of group based on the types of contacts the group is composed of, such as, for example, personal, work, or family. A group name listed in black indicates a group of contacts from multiple groups. If there are more group names than space in the tab a scroll bar or slider may be provided to navigate the list.

The small groups lozenge 930 includes a title bar "Groups."

The medium lozenge 935 includes a list 937 of a subset of a user groups contacts. In one example, the medium groups lozenge 935 includes a list of the most popular and/or the groups most recently communicated with. The list 937 may include the names of the top ten groups; however, other numbers of groups may be provided. While connected to the service provider system 110, the web server 143 in conjunction with the applications server 144 monitors the user's interaction with the user interface to populate the list with the most relevant group names of interest to user. The medium groups lozenge 935 also includes a search/add field 820.

The large groups lozenge 940 includes a full list 945 with a navigation aid 830 (e.g., a scroll bar or slider) that may be sorted by: the most recently selected group, a group name, a groups with whom the user is currently communicating with, a group with items that are on the calendar, a group that has been invited to an event, a group size (e.g., number of members), a group's creation date, and an RSVP or a not RSVP group. Any person, group, or activity may be tagged by the user as an RSVP. This means that any activity that includes the RSVP person or RSVP group must have all contacts or groups of contacts tagged as RSVP agree to attend the activity before the service provider system 110 identifies the activity as booked. If a person, a group, or an activity is not so tagged, then the activity may be booked regardless of how many invitees agree to attend. The large groups lozenge 940 also includes a search/add field 820.

The extra large groups lozenge 950 includes a full list of all groups names 955 associated with the user and a navigation aid 830. For each group a list of contacts 957 in the group is provided. In addition, a number of fields associated with each group may be presented, such as, for example, a first name, a last name, an email address, an address (e.g., house number and street name) 958, a city, a state/province, a zip code/postal code, a country, a home land line phone number, a mobile phone number, a work land line phone number, a relationship to the user (e.g., friend, family, or business), and a RSVP flag (either yes or no). All fields may be selected and edited by the user. Five additional inputs (not shown) are provided on extra large groups lozenge 950: select, edit, create a group, add a person, and aggro. Using the "select" input or directly selecting a group name from the list using a user input device (e.g., using a mouse to single click on any group name) displays the names of all contacts within the group (e.g., highlighted, bolded, outlined, etc.). In addition, selecting a group name causes the other strips to focus on or present content associated with the selected group. Focusing is described in further detail below. Selecting the "edit" input or a group name directly from the list using a user input device (e.g., by double-clicking on the name) allows the user to edit the contacts listed in the group. Selecting the "create a group" input allows a user to create or define a group. Selecting the input "add a person" allows the user to add a new contact to an existing group. Selecting the "agro" input causes the contact aggregator to verify the contact information of the contacts listed in the group.

A user also may create a group using the add/search field 820. The user may type in a new group name in the field 820 using a user input device. The new group name is then displayed in the list of groups 937 or 945. The user may then drag and drop one or more names of contacts from the people lozenge to the group name in the groups lozenge to automatically add those people to their groups. Similarly, a user may automatically add a new contact to any existing group by dragging a name of a contact from the people lozenge to the group name in the groups lozenge.

In addition, the size of the people and groups lozenges have a reciprocal relationship with each other. For example, when the people lozenge is small, the groups lozenge is large. When either the people or groups lozenges are medium the other lozenge also is medium. When the group lozenge is small, the people lozenge is large. When either the people or groups lozenges are extra large, the lozenge occupies the entire WHO strip 731.

The WHAT strip 733 provides content and functionality regarding a user's daily communications and activities. The WHAT strip 733 helps the user manage and organize these communications and activities through use of five lozenges: activities, to-do, shopping, read, and send.

Figure 10:
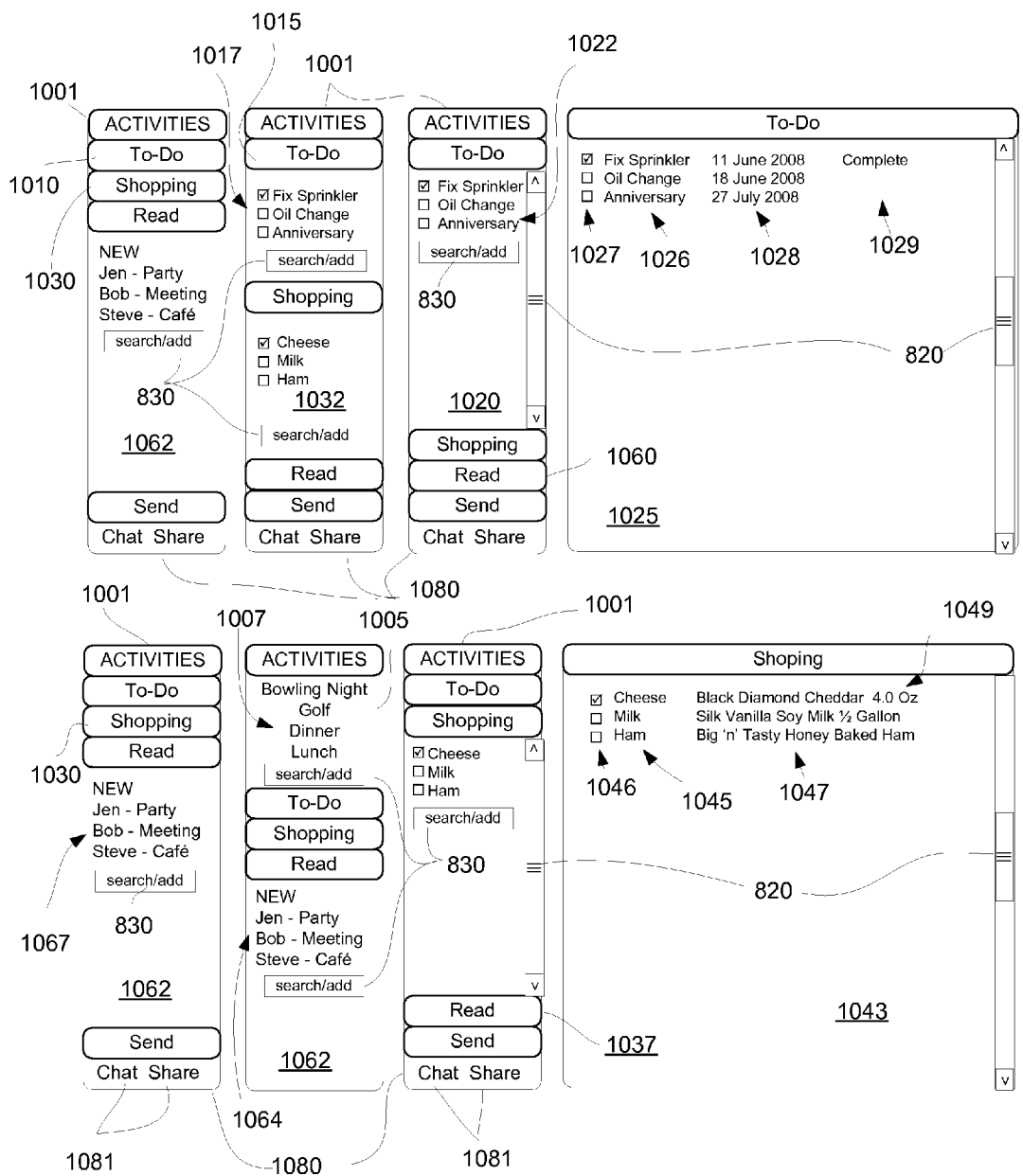
FIG. 10 and FIG. 11 are exemplary illustrations of the WHAT strip.

As shown in FIG. 10, the activities lozenge provides a list of activities that a user frequently engages in order to help a user plan events. The activities lozenge may be small or medium. The small activities lozenge 1001 just includes a title "Lozenge." The medium activities lozenge 1005 includes a list of activities 1007, for example, a top-ten list of activities. The top-ten list is automatically populated based on a combination of the most recently used user activities combined with activities that have been most frequently repeated. A search/add data 820 entry field also is provided. The data entry field 820 may be used to search through a list of a user's prior activities or add a new activity to the list. Adding a new activity causes a pop-up window to be shown with fields that the user may choose to fill to further define the activity.

In addition, the user interaction with the other lozenges affects the list of activities provided through focusing. For example, when a person or group's name is selected on the people or groups lozenge, the activities lozenge shows the top-ten activities that have been scheduled in the past with that person or group. When a location is selected from the locations lozenge, the activities lozenge is populated with up to ten activities that have most frequently occurred at or in the vicinity of the location. When a calendar date is selected, the activities lozenge is populated by the most common activities that occur on that date. For example, if a user selects Sunday morning, "Go to Church" might appear in the activities list. If the user selects the evening of February 14th, then "Valentines Day Dinner" may appear in activities list. If a user selects their own name from the people lozenge, then the activities lozenge is populated with the top ten activities attended by the user. A user may select an activity from the list 1007 with a user input device, and drag the activities onto the calendar lozenge to a particular day and/or time to create a calendar event for that activity, as explained in further detail below.

FIG. 10 also shows an example of a small, a large, and an extra large a To-Do lozenge. The To-Do lozenge helps keep of list of items that a user wants to complete and keep track or be reminded of.

The small To-Do lozenge 1010 just includes the title "To-Do." The medium To-Do lozenge 1015 includes a list of up to the ten oldest To-Do items 1017. Each To-Do item on the list 1017 may include a user selectable input to indicate completion of the item, such as a check or tick box. Using a user input device the user may select the input to cause a visual mark to appear in the box (e.g., a check mark or x) to indicate that an item has been completed. In addition, the marked item may be visually distinguished (e.g., highlighted or low lighted or grayed out) moved to the end of the list and marked as "done." A search/add data field 820 may be provided to search for a particular To-Do item from the list and to add a new item to the To-Do list.

The large To-Do lozenge 1020 includes a complete list 1022 of all a user's To-Do items. In addition, a navigation aid 830 is provided to navigate or scroll through the entire list if there are more items on the list than may be displayed in the space provided. A search/add data field 820 also is provided.

The To-Do items may have associated with them information fields about chores and/or tasks that a user wishes to remember and complete, such as a name field, a description field, a start date/and or time field, a reminder field, and an indication of completion of the item (e.g., "Done" or a completion date and/or time). When open to the large or extra large lozenge, To-Do items may be created by the user directly typing a new item in the list. The To-Do list items may be re-ordered, edited, checked off by the user. Items may be reordered simply by selecting an item and dragging it to another position on the list. Each item may include a user selectable input to indicate completion of the item, such as a check box. Using a user input device the user may select the input to cause an indication to appear in the box (e.g., a check mark or x) to indicate that an items has be completed. In addition, the checked item may be visually distinguished (e.g., highlighted or low lighted or grayed out), moved to the end of the list and marked as "done."

The extra large To-Do lozenge 1025 also includes a complete list 1026 of all To-Do items and the various information fields, such as, a completion indicator 1027, a date added 1028, a date completed 1029, and a reminder date (not shown). The items may be re-ordered, edited, checked off. The list may be sorted by: due date, reminder date, when added, letter or alphabetically, and done and/or completion date.

FIG. 10 also shows examples of the shopping lozenge. The shopping lozenge may be used to keep track of all items to be purchased by a user. FIG. 10 shows a small, a medium, a large, and an extra large shopping lozenge. The small shopping lozenge 1030 just includes the title "Shopping." The medium shopping lozenge 1032 includes a list 1034 of up to ten oldest shopping or highest priority shopping items. Each shopping item on the list 1034 may include a user selectable input (e.g., a check or tick box) to indicate the item has been purchased. Using a user input device the user may select the input to cause a visual mark to appear in the box (e.g., a check mark or x) to indicate that an item has been purchased. In addition, the marked item may be visually distinguished (e.g., highlighted or low lighted or grayed out) moved to the end of the list and/or removed. A search/add data field 820 may be provided to search for a particular shopping item from the list and to add a new item to the list.

The large shopping lozenge 1040 includes a complete list 1042 of all a user's shopping items. The complete shopping list 1042 may be re-ordered, edited, checked off. Items may be reordered simply by selecting an item and dragging it to another position on the list. Each item may include a user selectable input to indicate purchase of an item, such as a check box. Using a user input device the user may select the input to cause an indication to appear in the box (e.g., a check mark or x) to indicate that an items has been purchased. Alternatively, purchased items may be removed from the list. In addition, a navigation aid 830 is provided to navigate or scroll through the entire list if there are more items on the list than may be displayed in the space provided. A search/add data field 820 also is provided to add items or items may be added by directly typing them in the list.

The extra large shopping lozenge 1043 also includes a complete list 1045 of all shopping items in addition to various information fields, such as, a user selectable input to indicate purchase of an item 1046, a description 1047, a date added, a date purchased, and an amount 1049. Shopping items may be created and added to the shopping list by the user directly typing a new item in the list. The items may be re-ordered, edited, checked off. The list may be sorted by: description, date purchased, amount, date added, and by letter or alphabetically.

FIG. 10 also shows an example of a small, a medium, a large, and an extra large read lozenge. The read lozenge also a user to receive and manipulate various communications directed to the user.

The small read lozenge 1060 just includes the title "Read."

The medium read lozenge 1062 includes a list of identifiers 1064 for the most recent, unopened, new messages and/or threads that have been received by the service provider system 110 directed to the user. The list may include an indicator of the contact from whom the message was sent and a subject indication.

The large read lozenge 1065 includes a complete list 1067 of identifiers for all new messages and/or threads stored by the service provider system 110 which have not yet been responded to by the user. The identifiers may include a name of the contact sending the message and a topic of the thread. In addition, an indication (not shown) of the number of new messages associated with the thread or topic may be provided. If there are more message indicators than may be displayed in area of the lozenge a navigation aid 830 (e.g., a scroll bar, a slider bar, direction arrow keys, grab and move pointer, or a pointing device) may be used to navigate through or see the remaining portion of the list. In addition, search/add field 820 may be provided to search for a message.

Figure 11:
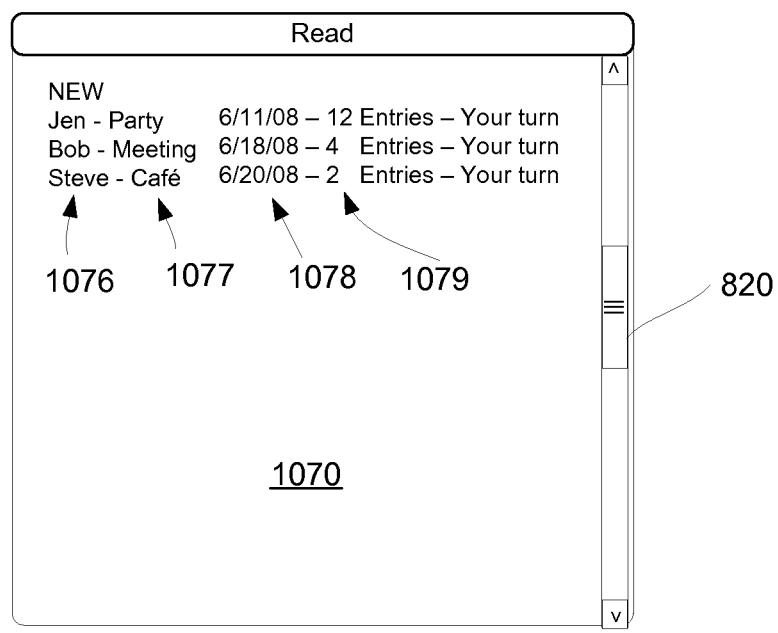

FIG. 11 shows and example of the extra large read lozenge 1070. The extra large read lozenge 1070 includes a complete list 1075 of identifiers messages and/or threads stored by the service provider system 110 in addition to various information fields, such as, a contact sending the message 1076, a topic of the message 1077, a date the message was received 1078, a number of entries in the message thread 1079, and who is to respond to the message 1080. Next to each identifier (not shown) an indication of how long (e.g., minutes, hours, days) the sender of a message has been waiting for a response. The user may select any identifier of any thread to read, edit responses, add responses, and perform other actions. Five input filtering options selections are provided for these threads: current subjects, by person, by date, by lateness, and archived. The current subjects input may be selected to display indicators of threads that are current. Current may be defined as a period of time set by the user's preferences and/or may include indicators of threads that have not been responded too. The by person input sorts the list of thread indicators alphabetically by contact name. The by date input sorts the list of threads indicators by date listing the newest threads first. The by lateness input sorts the list of thread indicators by respondent lateness. The archived input opens a complete list of indicators of archived threads that have previously been closed by the user.

Figure 12:
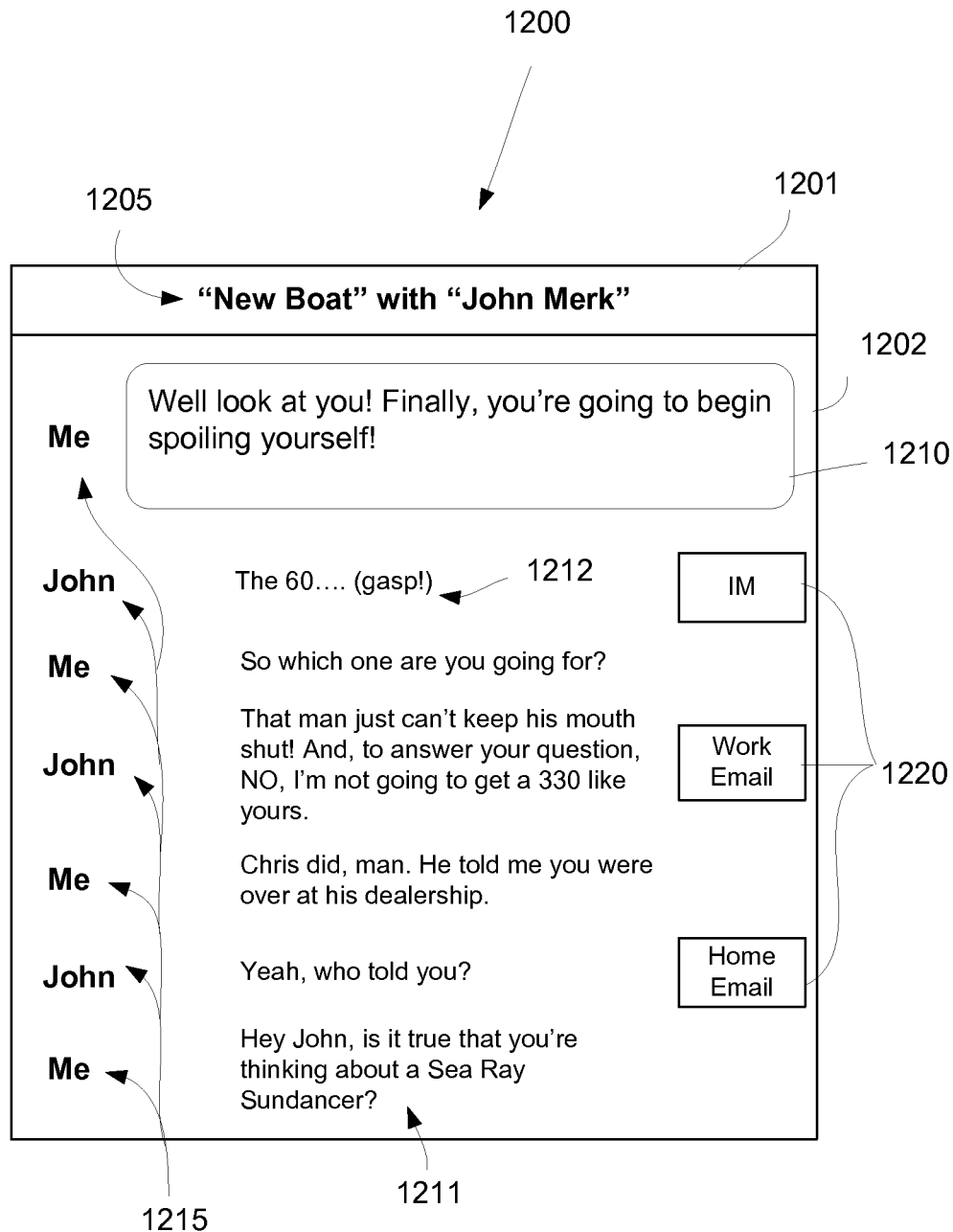
FIG. 12 is an exemplary illustration of a message pop-up window.

As shown in FIG. 12, selecting any thread or message indicator from either the list with a user input device (e.g., using a cursor or pointer or highlighted area controlled by a mouse, keypad/board, pointing device, touch-screen/pad to select the thread indicator) opens the thread in a popup window 1200 for viewing by the user. The window 1200 may include an informational area 1201 and a message area 1202. The informational area 1201 includes the type of message (e.g., personal, business, group) (not shown), the message thread identifier 1205, a start time of the message thread (not shown), and a time of last response (not shown). The message area 1202 includes an area 1210 (e.g., a rounded box) at the top of the message thread 1211 where the user may enter or type their response to the latest received message 1212. Below the box is the text of each piece of the message thread 1211 and an indicator 1215 of whom the piece text of the thread was generated by. A message type/link icon 1220 may be provided in the window next to each received text which notifies the user which account or media type (e.g., POP3 work, POP3 home, virtual fax, IM, SMS, site specific email, etc.) that was used to send the text associated with the message. Selecting the icon 1220 with a user input device opens another window (not shown) to display the original message in its full original format.

FIG. 10 also shows an example of the send lozenge. The send lozenge is used to send messages to contacts. The send lozenge may be locked at the end of the WHAT strip 733 and is provided in only as a small send lozenge 1080. In one example, the small send lozenge 1080 may be slightly larger than other small lozenges to accommodate one or more inputs 1081. In one example, the inputs are share, chat, and organize (not shown).

To send a message the user simply selects a name of a contact from the people lozenge, or the name of a group from the group lozenge of the WHO strip 731 using a user input device. After selecting the name, the user drags the name from the list of the WHO strip 731 onto any one of the buttons: share, chat, and organize. Alternatively, the user may select one of the inputs 1081 with a user input device. Selecting one of the send inputs 1081 causes the service provider system 110 to create a pop-up window for display as a screen on the user device. The screen (not shown) includes the message "Who shall I send the message to?" The screen also includes a window in which the user may type the contact or group name or select a name from a drop down menu.

The share button may be used to share pictures, videos, web sites, computer documents (e.g., PDF, MS Word, etc.), FYI, change of address, newsletter, and a vacation notification) and other content with contacts and groups. The chat button may be used for personal talk, group talk, polls, and event creation. The organize button may be used to create an event (one-time or repeating), such as, an appointment, a meeting, a party/group event; an RSVP party (e.g., a wedding or a birthday), a potluck or any other gathering of contacts. Each input causes a popup window to request information typically specific to that type of communication. If the name of the group or contact is dragged to the button, the popup window is automatically populated with the contact information for the type of message. Once the user enters the requested information, the message is sent by the service provider system 110 using the selected format and/or protocol for the type of message. In addition, the threader adds the message to the message archive.

Figure 13:
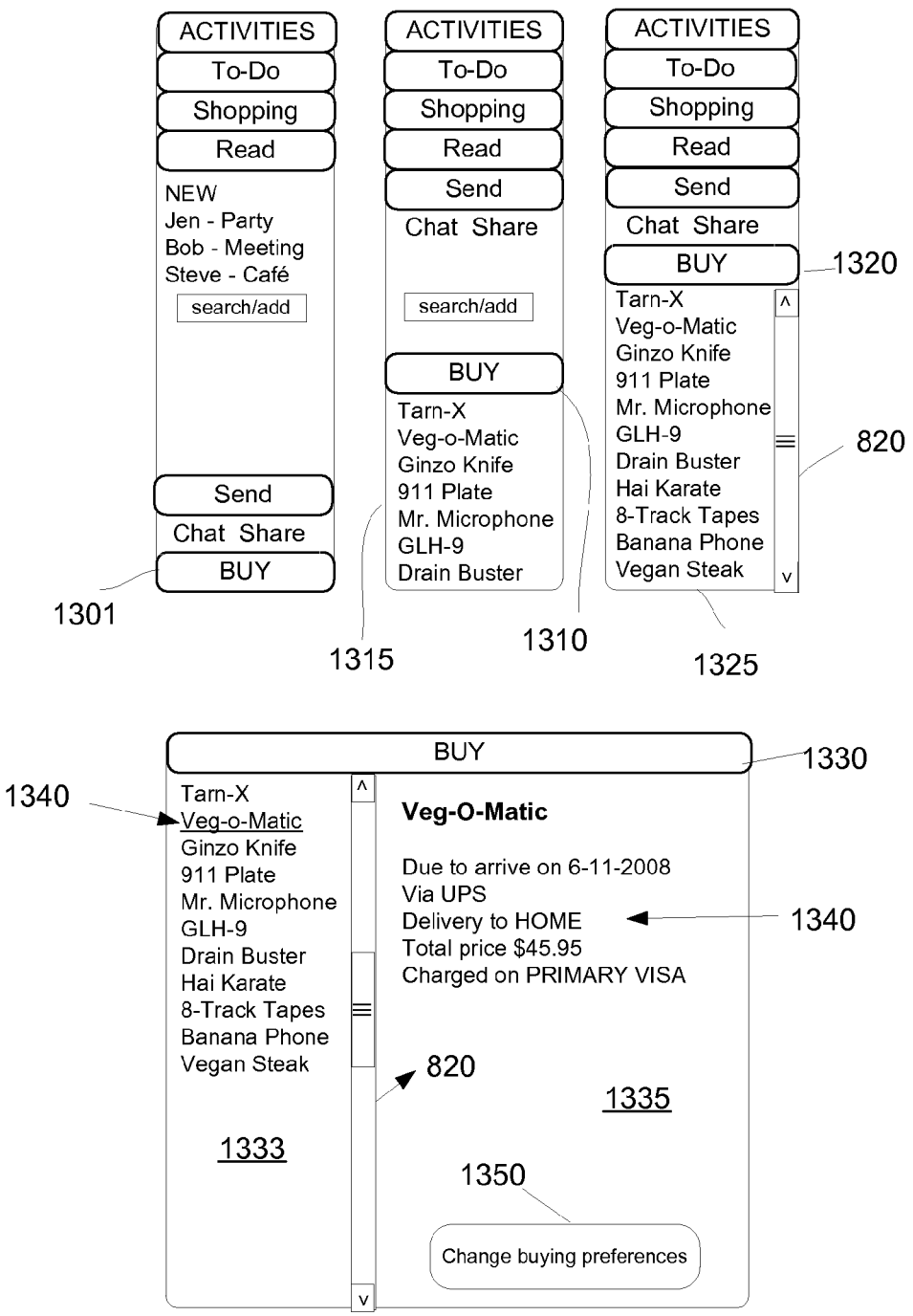
FIG. 13 is an exemplary illustration of the WHAT strip.

The WHAT strip 733 also may include a buy lozenge as shown in FIG. 13. The buy lozenge may be small, medium, large or extra large. The WHAT strip 733 also may include a buy lozenge. FIG. 13 shows examples of the small, medium, large or extra large buy lozenge. The small buy lozenge 1301 just includes the title "buy." The user can drag any item to the buy lozenge to instruct the service provider system 110 to purchase the item. The medium buy lozenge 1310 includes a list 1315 of the top five items that the system is currently trying to buy for a user. The large buy lozenge 1320 includes a complete list 1325 of all items being purchased by the system. The extra large buy lozenge 1330 provides a complete list 1333 of all items being purchased by the system. If there are more items that can be displayed, a navigation aid 820 is provided. A description area 1335 provides information 1340 about a selected item 1345 from the list. The information may include a name, delivery date, delivery location, total price, account payment was made by. In addition, a change buying preferences button 1350 is provided to access various fields that store user preferences allowing a user to specify price ranges for products, payment information, delivery addresses and other instructions pertinent to making a purchase.

The personal profile allows a user to specify specific items and types of items the system service provider 110 may automatically buy for the user. The user may specify what price ranges (e.g., a maximum, a minimum or both) that are okay for the system service provider to user in determining whether to make a purchase. The user profile buy information may include payment information, such as credit card, debit card, paypal, online banking information, a single purchase spending limit, a monthly purchase spending limit, and a card balance limit. The user also may specify shipping preferences, such as carrier preference (e.g., UPS, Fed-X, USPS, etc.), transit preference (e.g., overnight, 2 day, "slow and cheap"), shipping address, special shipping instructions (e.g., doorbell inoperative), and instant delivery preferences.

The buy lozenge may be withheld or not appear on the WHAT strip 733 until a user provides their user buy information. Once set up, the user can drag any item to the buy lozenge to instruct the system service provider to purchase item. For example, a user has a To-Do item that identifies "Replace flapper valve." The user drags the item to the BUY button. The service provider system 110 determines the best price available online for a toilet flapper valve, orders it using the provided customer buy information, and places an item or event on the user's calendar with the expected arrival date.

In another example, the user has an item, or items on the shopping list that they are unable to find time to buy, or would prefer not go shopping for the item at this time. The user drags the entire shopping list, or individual items to the BUY button, and the service provider system then buys those items for the user. In another example, a user has a calendar appointment, such as BBQ. In this example the user drags that item to BUY causing the service provider system 110 to look up a user profile and determine a user's identified foods associated with an event, such as a BBQ. The service provider system 110 then purchases the user's identified BBQ foods. Similarly, a calendar appointment "ski trip" causes the service provider system 110 to book transportation (flight from local air port to destination), lodging (e.g., hotel for nights specified by trip event in calendar), and activities (e.g., advance purchase of lift tickets for closest ski resort). In yet another example, the user drags a contact name onto the BUY button. The service provider system 110 identifies any dates, events, or activities associated with the contact (e.g., birthday, Christmas, retirement party). The service provider system 110 may purchase a gift for the specified contact. If the contact is a user of the service provider system 110, the system may use receiver's profile in determining a suitable gift.

Figure 14:
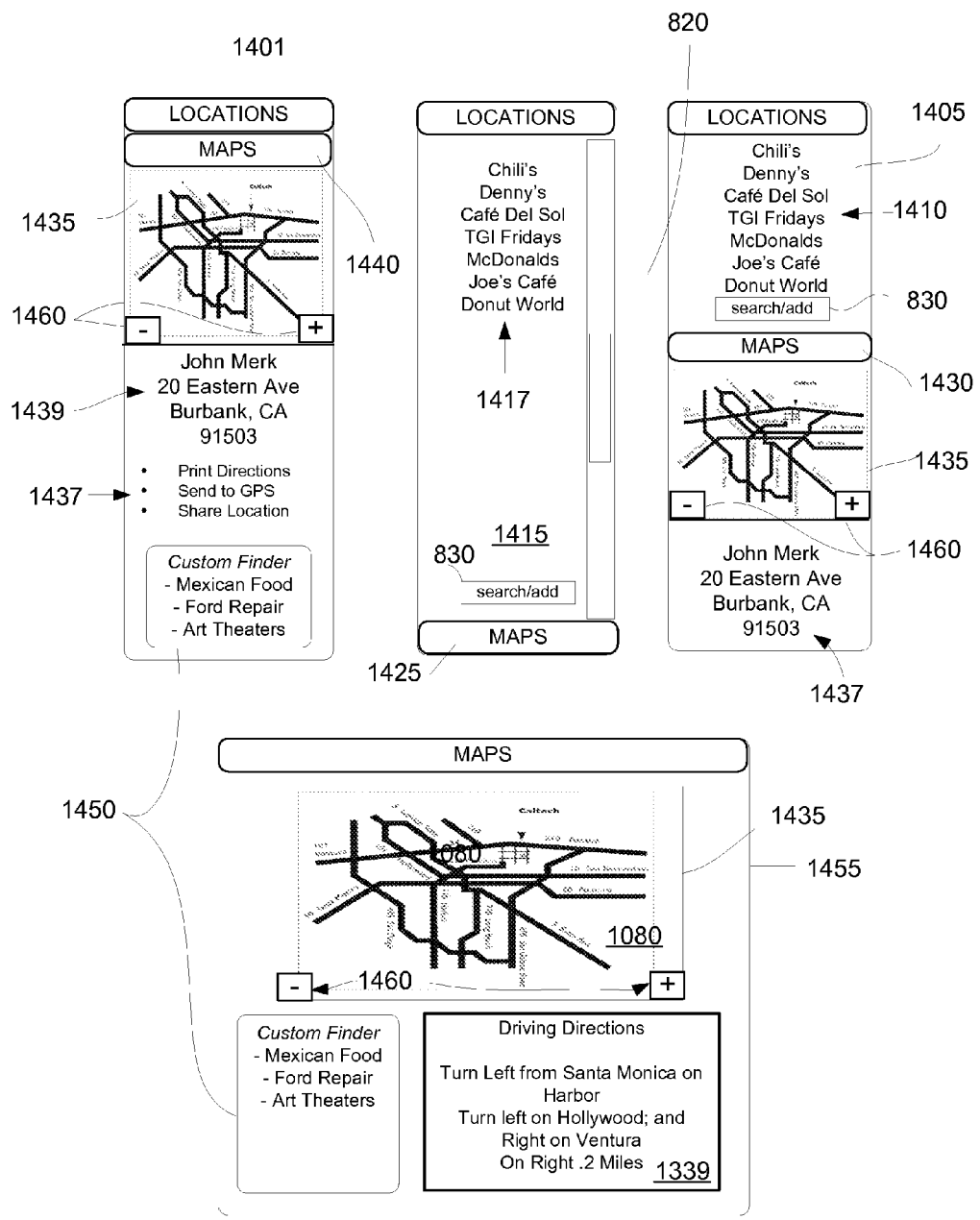
FIG. 14 is an exemplary illustration of the WHERE strip.

The WHERE strip 735 provides information above a user's favorite places (e.g., restaurants), locations, destinations, addresses, and other information such as maps and navigation aids. The user may look at or create instant maps to link any locations together and/or receive point-to-point directions. The WHERE strip 735 includes two lozenges: maps and location. FIG. 14 shows examples of small, medium, large and extra large maps and locations lozenges.

The locations lozenge includes locations of interest to a user. The small locations lozenge 1401 just includes a title "locations." The medium locations lozenge 1405 includes a short locations list 1410 of up to ten locations that may be interest to a user at any particular moment. Examples of locations: may be restaurants, businesses the user frequents (stores, malls, markets), contact's address, institutions frequented by the user (schools, DMV, church, parks). In particular, the system service provider 110 focus the locations provided in the list 1410 based on the user's interaction with the other lozenges of the user interface. For example, when the user selects a contact from the people lozenge, the list 1410 is populated with the "Top Ten" locations associated with that person. When a user selects a group from the group lozenge, the list is populated with the "Top Ten" locations associated with that group. When an activity from the activities lozenge is selected, the list 1410 is populated with the "Top Ten" locations associated with that activity. When any time and date in the calendar is selected, the list 1410 is populated with the "Top Ten" locations associated with that day at that time. The medium locations lozenge 1401 also includes a search/add data entry field 820. The search/add field 820 may be used to search for a location within the user's database of locations associated with the user. As a user enters characters within the field, the system automatically provide a list of locations (not shown) matching those letters typed by the user. The user may select any location from the list at any time or continue adding characters. If a location entered in the field 820 is not in the database, the service provider system 110 asks the user if they wish to add the location to the database. If so, the system saves the location in a database of locations associated with the user.

The large location lozenge 1415 includes a complete list of user locations 1417. If there are more locations than may be displayed in area provided by the lozenge, a navigation aid 830 (e.g., a scroll bar, a slider bar, direction arrow keys, grab and move pointer, or a pointing device) may be used to navigate through or see the remaining portion of the list. In addition, search/add field 820 may be provided to search for or add a location.

FIG. 14 also shows the maps lozenge. The maps lozenge provides an easy to use interface to allow a user to search for and find information about a location.

The small maps lozenge 1425 just includes a title "locations." The medium maps lozenge 1430 includes small map window 1435 for a selected location. An address 1437 for the location also may be displayed along with several inputs (not shown), such as print directions, send to mobile device, and share location.

The large maps lozenge 1440 also includes a map window 1435, a location address area 1437, user inputs 1439, and a custom finder 1450. The extra large maps lozenge 1455 has the same functionality as the large map lozenge but includes a larger map window 1435 and a driving directions window.

The map window 1435 shows a map of a location. The maps lozenge location is focused based on a person selected from the people lozenge or an activity selected from the activities lozenge, or as a result of selection a location or using the input field 820 to look up an address on the locations lozenge. The map displayed by the map window 1435 may be scalable to zoom in and out from a birds-eye-view using a user input device. For example, user inputs (not shown) neighborhood, city, county, state, and region may be provided to adjust the area displayed by the map, a slider bar may be selected to zoom in and out, or buttons 1460 may be selected to increase or decrease the scale of the map. In addition, the user input device may be used to control the zoom feature (e.g., a scroll wheel provided on a mouse). The map may include an indicator of the location within the context of the map.

Using a screen position indicator (e.g., a cursor or a pointer) in conjunction with a user input device (e.g., a key pad/board/buttons or a mouse) or using input directly from a user input device (e.g., a stylus or finger touching a touch screen) the user may select a point on the map. Maintaining selection on the map, the user may manipulate the position indicator or stylus in along one or two axis to draw a box or rectangle on the map. After drawing the box, the system automatically populates the area outlined by the box with information and/or indicators of all contacts and/or events that have addresses stored by the system databases that correspond to the location on the map within the user drawn box. Position of a cursor or pointer on the indicators causes a pop address (not shown) to appear associated with the indicator.

The maps lozenge includes several user selectable inputs 1537: directions to this location, find near this location, and transfer data to GPS/Smartphone. Selecting directions to this location provides directions to the selected location from a current location of the user (as determined from the user database or GPS data provided by the user device 101). Additionally, the user may provide a start location to manually configure a desired route.

The find near this location inputs include a dynamic list of a number of inputs that are most likely to be desired by a user viewing the location information. The service provider system may determine the dynamic list based on data stored in the user profile (e.g., favorites and dislikes provided by the user) and/or empirical information of data found most useful by users. For example, the inputs fuel stations, restaurants, and WIFI hotspots may be selected. Selecting any one of the inputs causes a visual indicator to appear on the map of the locations associated with the selected input. Placing a cursor, a pointer, or other user controllable selection mark over the indicator causes a small popup to display in association with the indicator giving more details and a dynamic hyperlink to a webpage for the entity represented by the indicator. In addition, selecting the indicator allows the user to obtain directions to the address associated with the displayed entity.

The transfer data to GPS/SMART phone input allows a user to transfer information, such as directions or files stored by the system service provider 110 to a user's mobile device. As a result, the user may access the directions or files using the mobile device.

The custom map finder 1450 provides a window that includes a number of inputs 1466 that may be selected by the user to populate the map with information. The service provider system 110 automatically populates the list with inputs based on the user's profile and interaction with the system. The list shown in the example of FIG. 14 includes inputs for Mexican food, pizza, Ford parts, and Art Theatres. Selection of in input, for example, fuel stations, causes the map to display indicators for fuel stations within the displayed area of the map window. The list of inputs is dynamic and is automatically populated at any particular time by the system to display those inputs to be of most use to a user. For example, the system may use time of day (e.g., lunch time or diner time) to display inputs for food choices based on the user profile stored in the system DB. Other inputs may be chosen based on information provided by the user questionnaire and user profile stored in the database, for example, indicated interests and hobbies of the user. The system may also search a user's upcoming events to populate the list with inputs. For example, if a task on the To-Do list includes "Get oil changed for Car" the dynamic list may be populated with the input service stations. If the user has an event scheduled, the list may provide an input "hotels" to suggest places to stay based on the event location.

The search/add window 820 may be provided to allow a user to manually enter in a location, name, contact, or business using a user input device. The input is provided to the system (e.g., by selecting an enter button or selecting and icon such as a magnifying glass). The system performs a search based on the input information and displays a result. The user selects an item from the list. The address is then displayed as the location and the map is automatically adjusted to display the location based on the selection.

The WHEN strip 737 keeps track of time sensitive or related information for the user. The WHEN strip 737 includes a single lozenge: a calendar lozenge. The calendar lozenge displays information for a user including indicators, identifiers, and data for all activities, to-do items, appointments, and other data items having a time based element that the system 110 tracks for the user to allow a user to manage and organize their daily events. The size of the days and weeks dynamical adjust based on user interaction with the calendar lozenge, as explained in further detail below. The calendar lozenge may be large and extra large. FIG. 15 shows an example of the large calendar lozenge 1501. The large calendar lozenge 1501 provides an agenda area 1510 and a mini calendar 1515. The agenda area 1510 shows a list of the user's next ten events. The mini calendar is a smaller calendar that shows busy and free times but no details. The large calendar is two columns wide.

Figure 16:
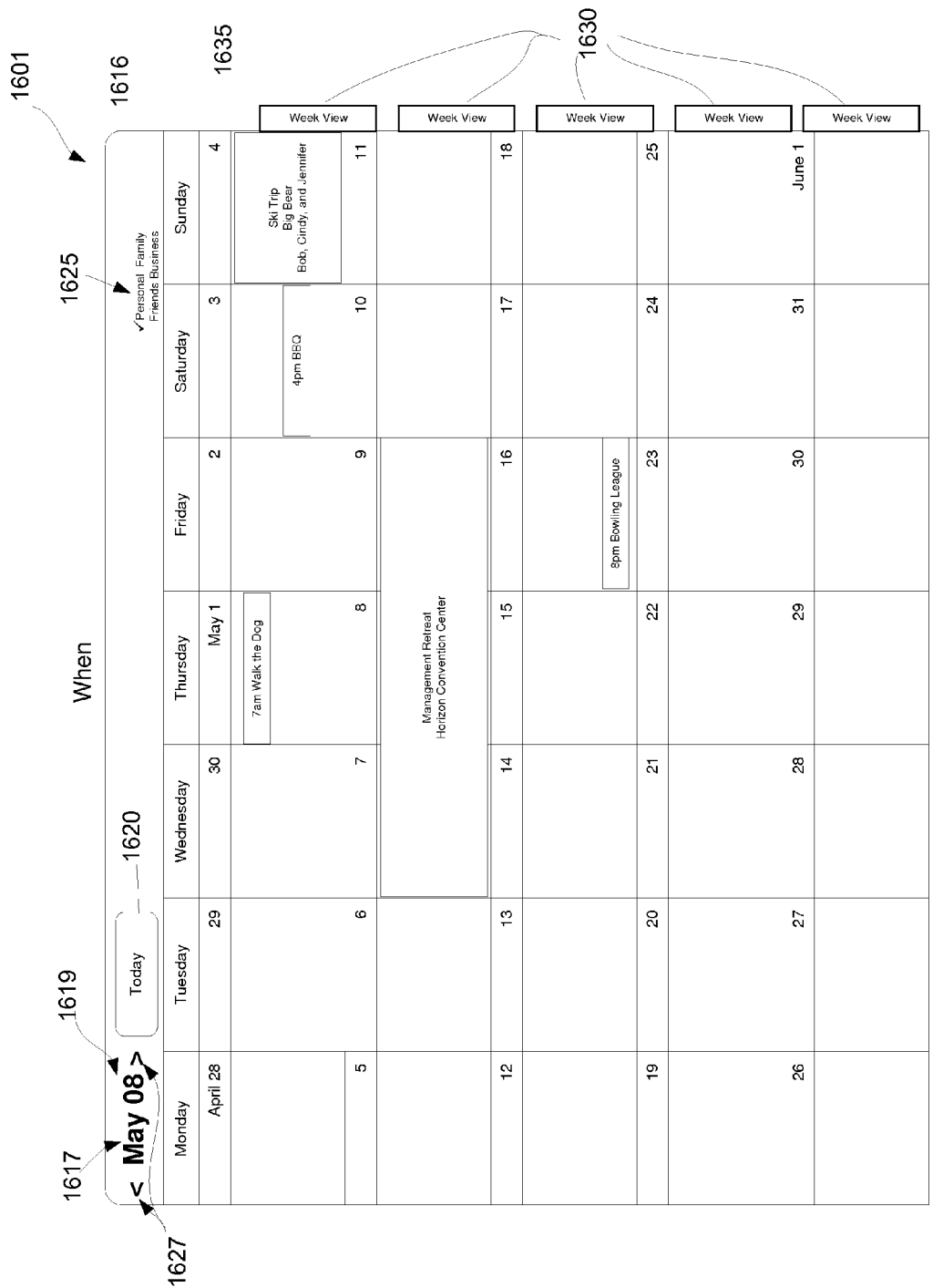
FIG. 16 is an exemplary illustration of the WHEN strip.

FIG. 16 shows the extra large calendar lozenge 1601. The extra large calendar lozenge 1501 is approximately three columns wide. The extra large calendar lozenge 1601 includes a calendar indication days of the week (e.g., Sunday-Saturday) and days of the month (e.g., 1-28, 1-29, 1-30, and 1-31). The calendar also includes an information bar 1615. The information bar 1615 includes an indicator of the month 1617, the year 1619, a today button 1620, and inputs 1625 personal, family, friends, and business to control display of items within the calendar to present events associated with a selected input. The month indicator 1617 displays the month (e.g., May) currently displayed by the calendar. The month may be changed by selecting the arrow inputs 1627 to either side of the month indicator 1617 to move to the next or previous month from the month displayed. The year indicator may be selected to change the year displayed. Additional inputs week view 1630 may be used to adjust the size of any week displayed, as described below. One or more the inputs 1625 may be selected at anytime to toggle the display of events associated with the selected event category (e.g., personal, family, friends, and business). For example, selecting personal and family causes the calendar to display user events of type personal and family. Unselecting an input removes those corresponding events. In this example, unselecting family causes all events of family type to be removed leaving only personal events displayed.

Within each day displayed on the calendar are indicators for any calendar events stored by the system associated with that date for a user. As shown in FIG. 16, the calendar is focused on personal calendar events of the user. The calendar events may include To-do items or reminders (e.g., 7 am May $1^{st}$ "walk the dog"), shopping items (not shown), activities (e.g., 8 pm May $16^{th}$ "Bowling League" and "Ski Trip"), and appointments, seminars, engagement, and meetings (e.g., 4 PM may $3^{rd}$ "BBQ" and "Management Retreat"), and coupons and/or advertisements from the glad bar (not shown).

The user may create an event by selecting an item from any lozenge with a user input device and dragging the item from the originating lozenge to a date and/or time within the calendar lozenge. For example, a user can drag a name from the people or the group lozenge, an activity from the activities lozenge, a to-do item form the to-do lozenge, an email from the read lozenge, a shopping item from the shopping lozenge, and address from the maps lozenge, a location from the locations lozenge, to a calendar date to create an event. For example, the user may select contacts "Bob", "Cindy", and "Jennifer" from the people lozenge, "Ski Trip" from the activities lozenge, and "Big Bear" from the locations lozenge, and drags them all to the Sunday May $4^{th}$ to create a ski trip calendar event 1635. A calendar event popup window with data fields is then presented to the user, as shown in FIG. 17.

Figure 17:
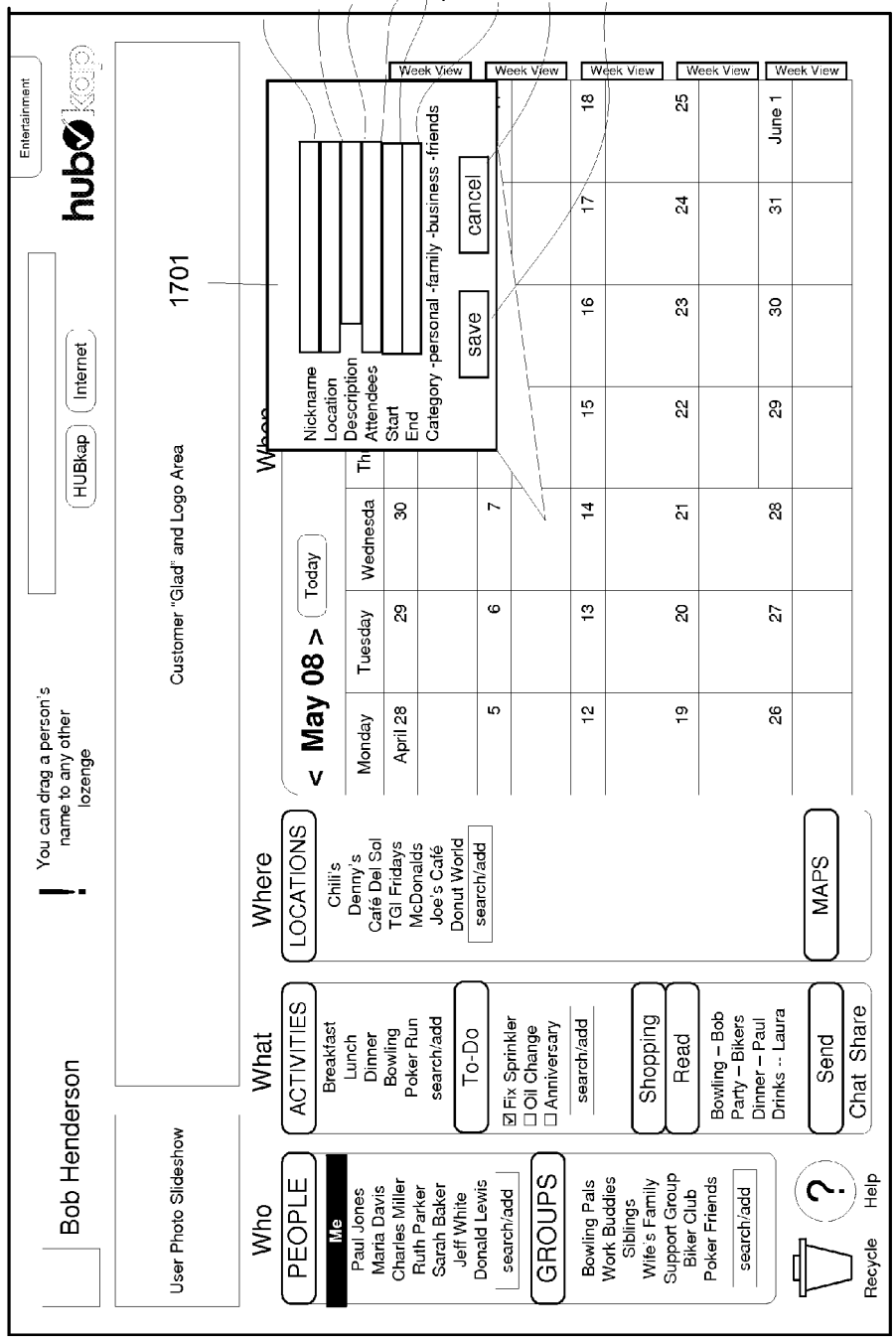
FIG. 17 is an exemplary illustration of the user interface including an event popup window.

FIG. 17 shows a user interface with the event popup window 1601. The window 1601 includes a number of data entry fields that are automatically populated with information corresponding to the items dragged onto the date (e.g., the people, the activity, and the location in this example). For example, the window 1701 may include the data entry fields nickname 1710, location 1720, description 1730, attendees 1733, start 1735, end 1737, and category 1740 (e.g., personal, family, friends, and business). Information missing from the data entry fields may then be supplied by the user. Once the information is supplied, the user may select the save button 1745 to stored information in the user database for the event and close the popup window. A cancel button 1750 may be used close the window and cancel the event. A calendar event also may be created by selecting a date and/or time directly from the calendar using a user input device causing the event popup window 1701 to be presented in which the user may enter information in any pertinent field and/or drag items from other lozenges onto the popup window.

A calendar event may be given a nickname (e.g., "Ski Trip) as the identifier displayed in the calendar for easy reading and/or identification by a user. The item name field may be used to automatically build a nickname. For example, if the nickname is left blank the system automatically picks the name of a lozenge item dragged to create the event. For example, if ski trip is dragged for the activity lozenge then the event nickname may default to ski trip. The nickname may be edited by the user to override any automatically generated nickname.

In another example, items directly dragged to a calendar date may automatically create an event. If a lozenge item is dragged to any date on the calendar in the month view, an event is automatically created at for noon on the that date with whatever content is associated with the lozenge. For example, if Bill is dragged to June 1, an event nickname Bill is provided for a 1 hour meeting with Bill at noon on June $1^{st}$. A message is sent to invite Bill. The user may select the item on the calendar to access the event and to edit or provide further details. If a lozenge item is dragged to the expanded week view or day view, then the event is scheduled for the hour time slot the item is dragged to on the calendar as a default. The hour slot is also visual highlighted or shaded to indicate the planed time of the meeting. The user may then adjust the timing of the event using a pointing user input device to select the a border or portion of the highlighted region to expand or contract the highlighted area to increase or decrease, respectively, the time scheduled for the event.

The service provider system stores the calendar event information in the user database. The database has a number of associated fields, such as a general type (e.g., appointment, activity, entertainment, travel, and meeting). In addition, the fields also provide for time and date, start and end, attendees, invitees, a location, items needed, event category type (e.g., personal, friends, family, and business), among others. Any information associated with a lozenge that is dragged to create the event is populated in the fields. This information may be changed, deleted or supplemented by the user. In addition, the fields also may be customized for information solicited based on the type of event (e.g., a particular activity, such as "BBQ" may include additional information like catering, potluck, bring an item). The information requested by the fields may be filled in by entering information in the field using a user input device. In addition, further items may be dragged from lozenges to the popup window to continue to fill out the event information. For example, additional names may be dragged from the people lozenge, a location from the location lozenge, a shopping list from the shopping lozenge. In addition to the nickname, a descriptor, a description/notes, and an advertisement or coupon from the graphic/advertising bar may be provided.

Once the information fields are filled in and provided to the system, an event may be automatically organized by the system as described in U.S. application Ser. No. 12/141,104, titled "COMMUNICATIONS SYSTEM WITH DYNAMIC CALENDAR," filed Jun. 18, 2008, which is herein incorporated by reference in its entirety.

All items shown in the calendar are color coded based on an event type, such as personal, family, business, and friends. In addition, inputs 1625 are provided to filter information displayed in the calendar. For example, inputs 1625 personal, business, family, friends may be provided to filter or overlay display of calendar items of the type selected or a combination thereof. One, several, or all of the inputs 1625 may be selected at any time. Color coded identifiers for each calendar event are shown on their respective days. If there are more identifiers than may be shown in the space provided, the identifiers shown may be filtered. For example, a priority (such as importance, time of day, next occurring, events requiring user action or providing updated information or alerts) or the types of events shown (e.g., family, friends, business, personal), or a combination thereof may be used to filter the information presented. In addition, if sufficient space is unavailable the events displayed may be periodically rotated.

Figure 18:
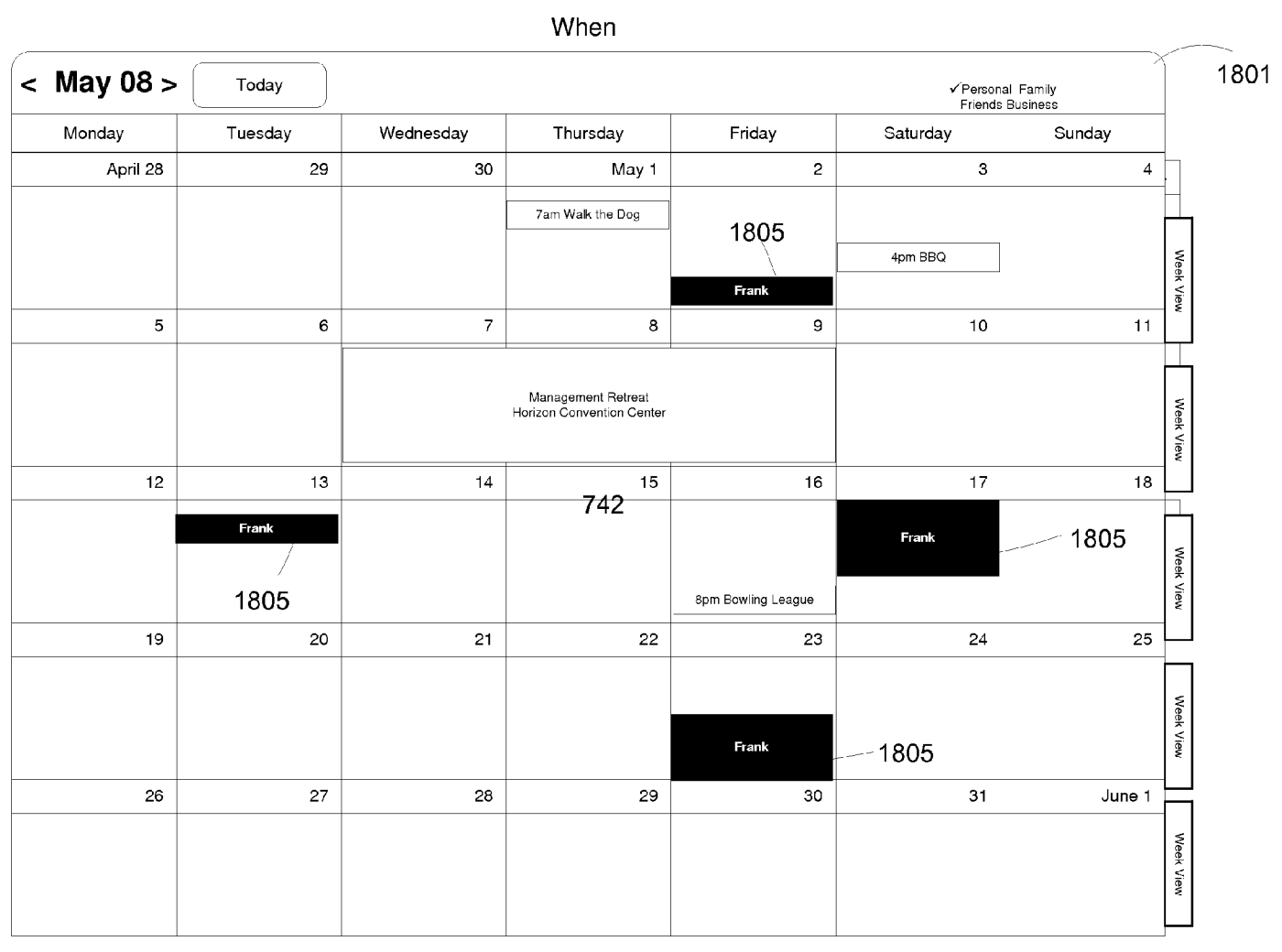

The system service provider 110 maintains calendar data for each system user. As a result, the calendar may be used to show data from other calendars which may be useful in planning events, such as meetings. For example, selecting the identifier for a system user "Frank" from a user's people lozenge causes the calendar 1601 to change to the calendar shown in FIG. 18. As shown in FIG. 18, the calendar 1801 now includes indications 1805 of periods of occupied time for which Frank has events scheduled. This is very useful for user's trying to schedule meeting. For example, looking at the calendar 1801, the user may determine the morning of May 17$^{th}$, Frank is unavailable to have a meeting. Holding a cursor/pointer over the indications 1705 causes a popup indication of the exact time period when in the month view shown in FIG. 18.

Figure 19:
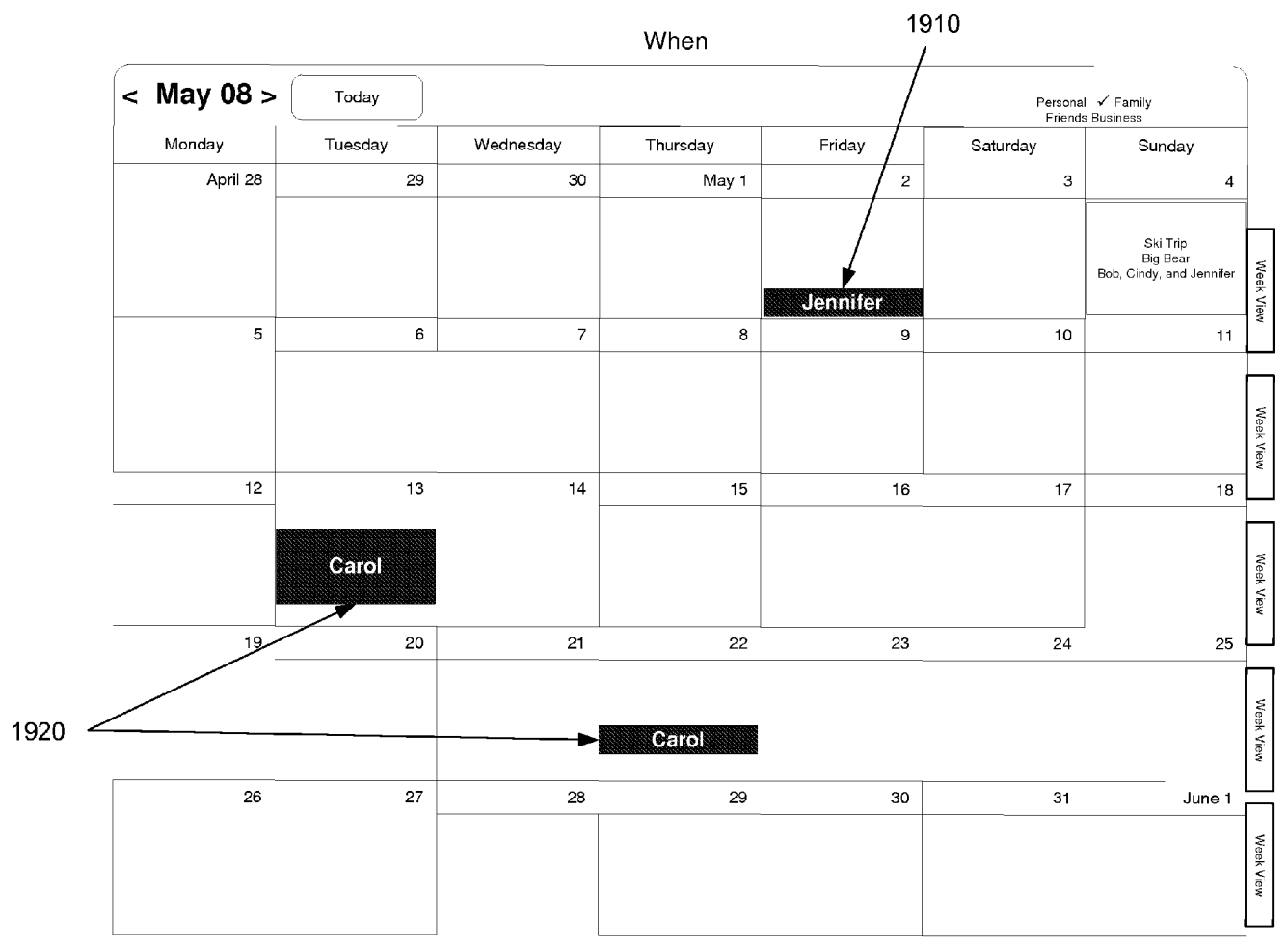

In addition, event categories also may be used to filter/display information. For example, FIG. 19 shows the user has selected the input 1625 family to display calendar 1901. As shown, the events walk the dog, management retreat, and bowling league have been removed, family event "ski trip" is shown. In addition, family members' events for Jenifer 1910 and Carol 1920 are shown.

Figure 20:
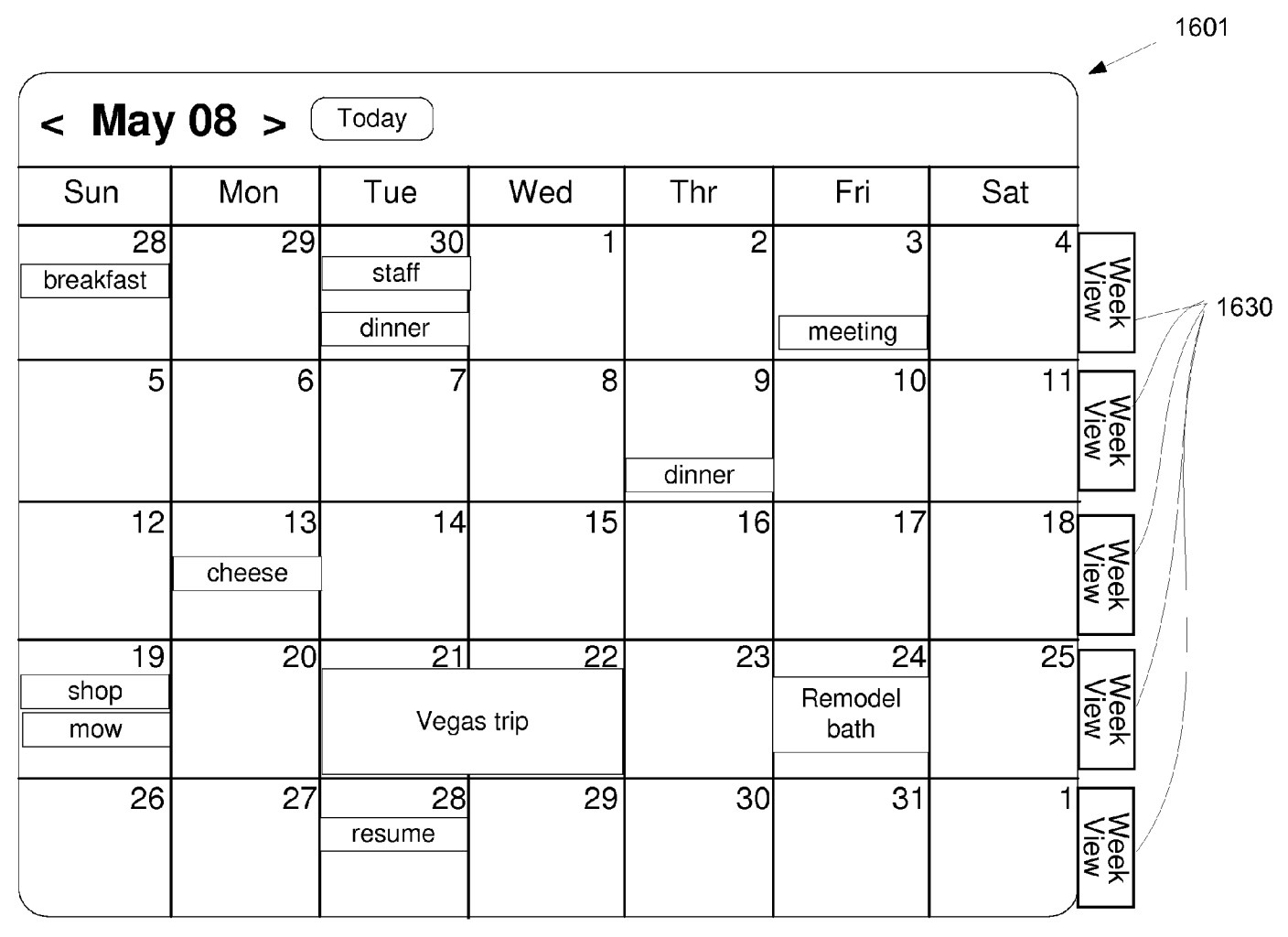
Figure 21:
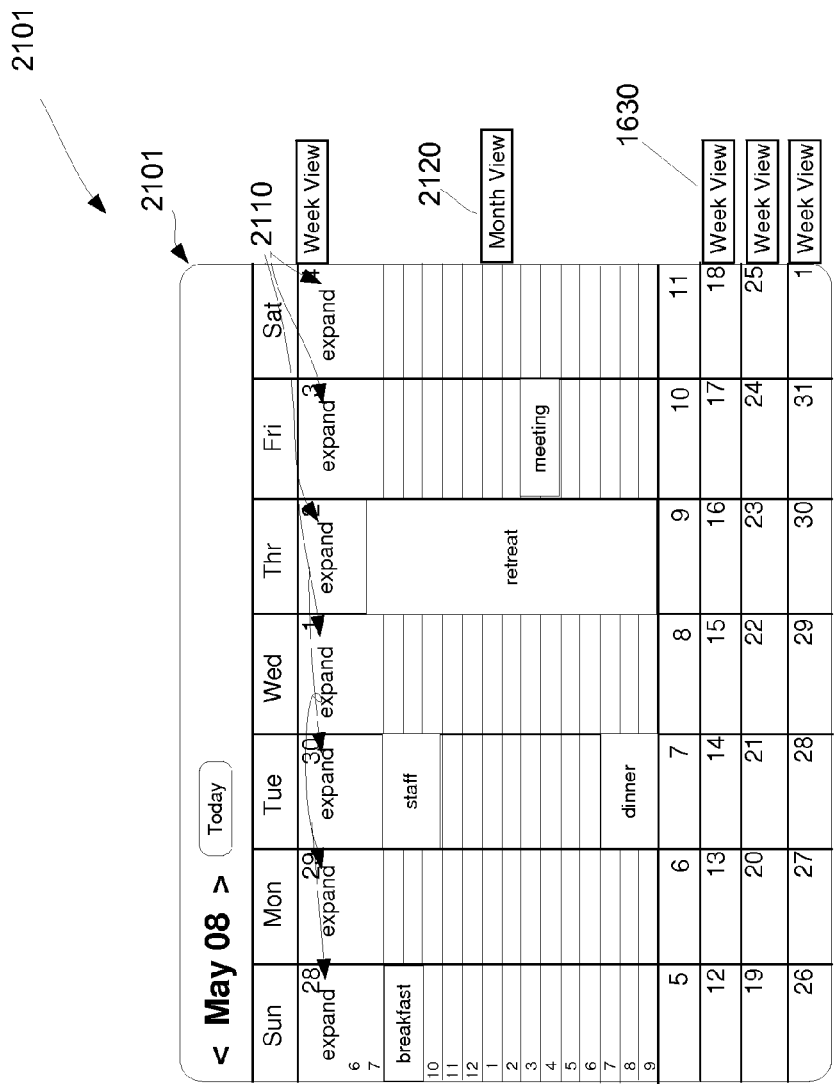
FIG. 21 is an exemplary illustration of the WHO strip with the calendar lozenge in the Expanded Week view.
Figure 22:
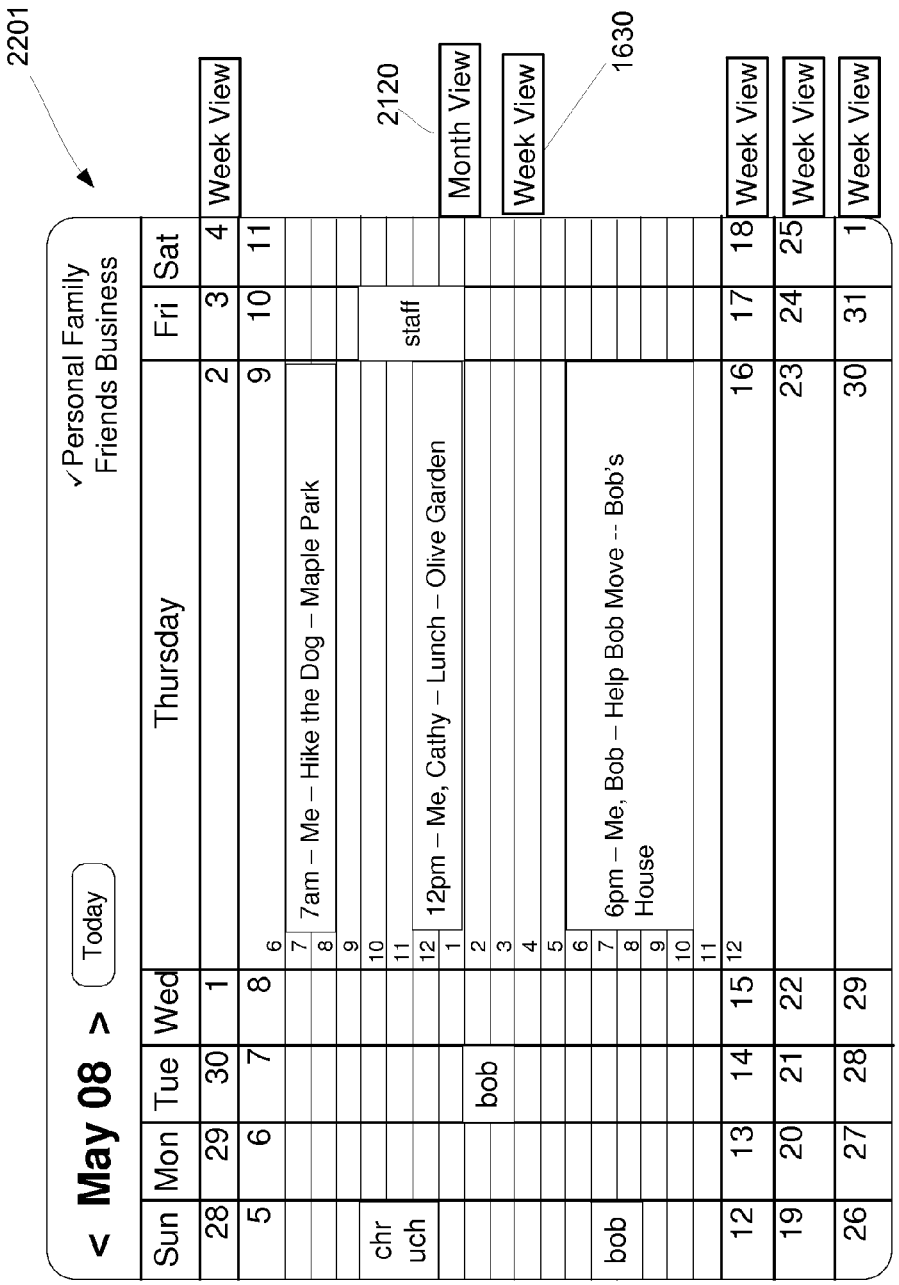
FIG. 22 is an exemplary illustration of the WHO strip with the calendar lozenge in the Expanded Day view.

A unique feature of the calendar that it dynamically adjusts the space needed to display portions of the calendar while maintaining presentation of every day in the month displayed, as shown in FIGS. 20, 21, and 22. FIG. 20 shows a calendar lozenge with the calendar in the month view 1601. As shown, a week view input 1530 is provided for each week displayed in the month view 1601.

Selecting the week view input 1630 for the week of May 5$^{th}$ though the 11$^{th}$ expands the area used to display the selected week on the screen while reducing the other weeks presented by a corresponding amount, in the expanded week view as shown in FIG. 21. In the expanded week view 2101, more event identifiers may be displayed concurrently and other event details and information in addition to the event identifier (e.g., a time of event) may be presented. Additionally, segments for the hours during each expanded day or a timeline may be presented. At the same time, all other days outside the expanded week shrink to a smaller size. In this mode, the small days use color codes in combination with a number indicate events for that day. The color indicates the type of event that day and the number indicated the number of events of this type on that date.

Two additional inputs are also provided. An expand input 2110 is provided for each day in the expanded week and a month view input 2120 is provided for the expended week. Selection of the month view input 2120 causes the screen to return to the month view 1601 shown in FIG. 20.

Selection of the expand input 2110 for any day in the week causes the area for the selected day to expand with a corresponding reduction in the area of the remaining days in the expanded week as shown in FIG. 22. The expanded day view 2201 may include a time line, larger fonts, and addition information provided for each event (such as identifier, time, location, attendees, and notes). In addition, a today button 1620 is provided on all of the views (2001, 2101, and 2201) to automatically expand the calendar to the expanded day view 2201 open to the current date. The expanded day view 2201 also may include a week view input 1630 to return the week to the expanded week view 2101, and a month view input 2120 also is provided to cause the screen to return to the month view 1601 shown in FIG. 20.

Item Dragging

Figure 23:
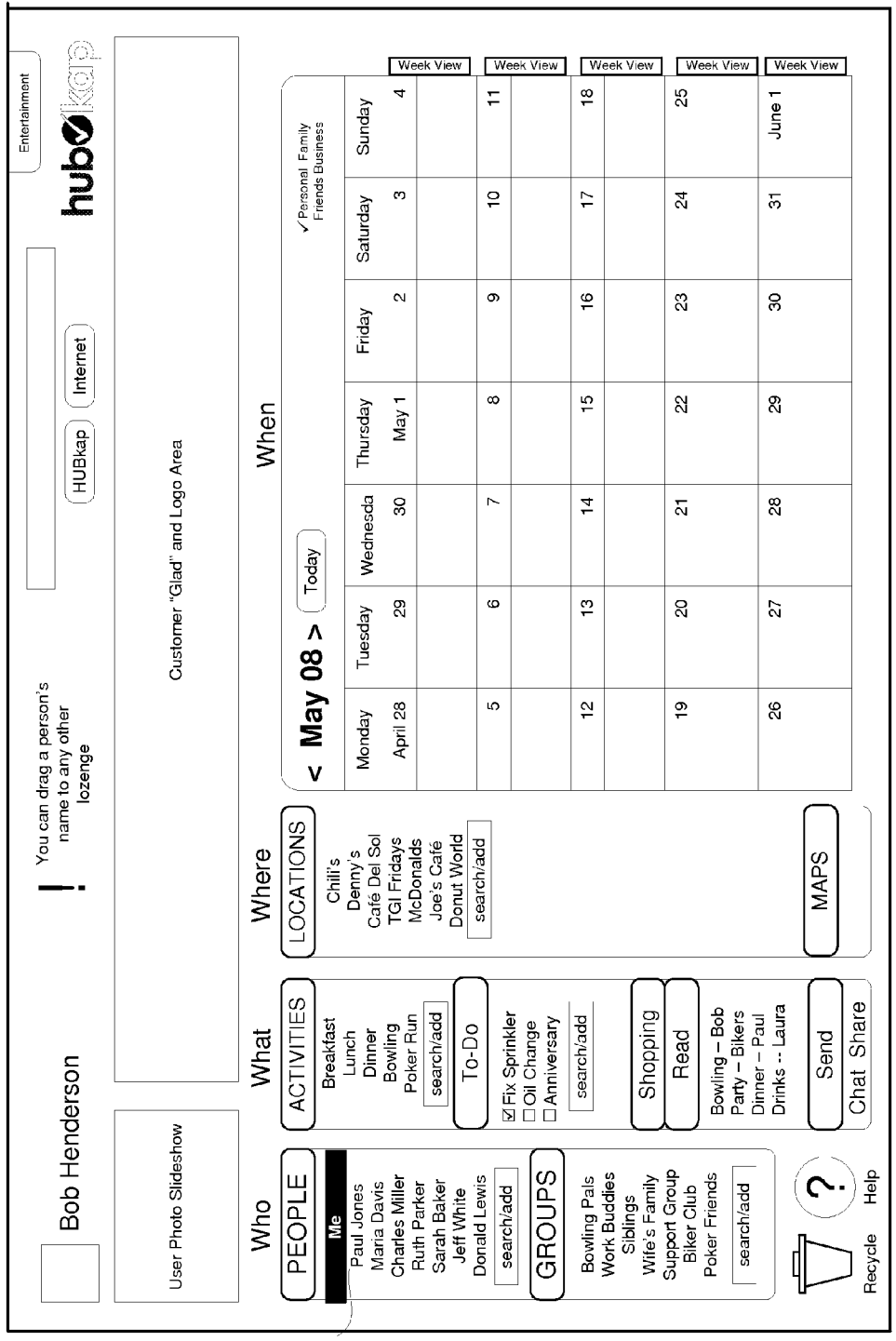
Figure 24:
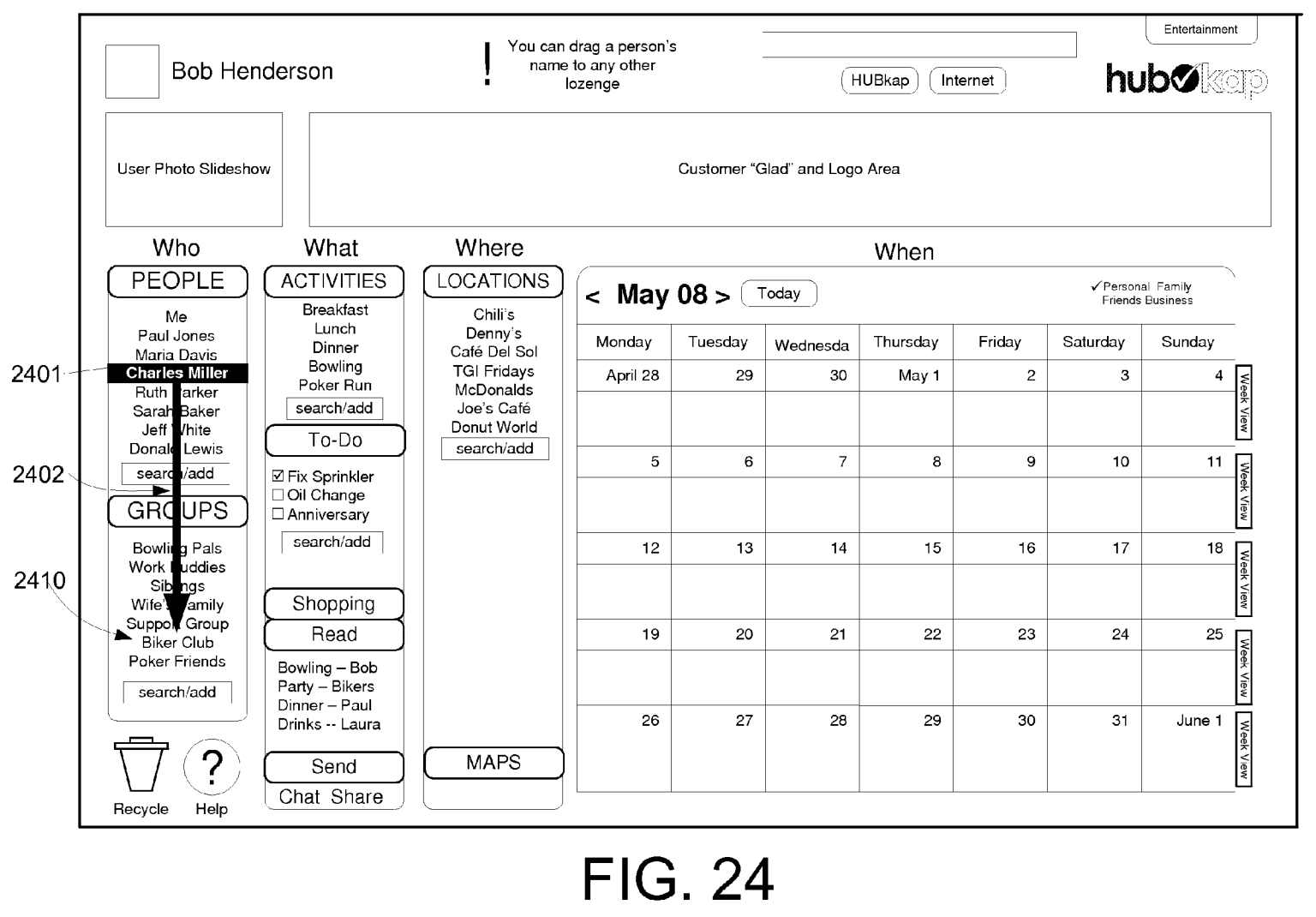
Figure 25:
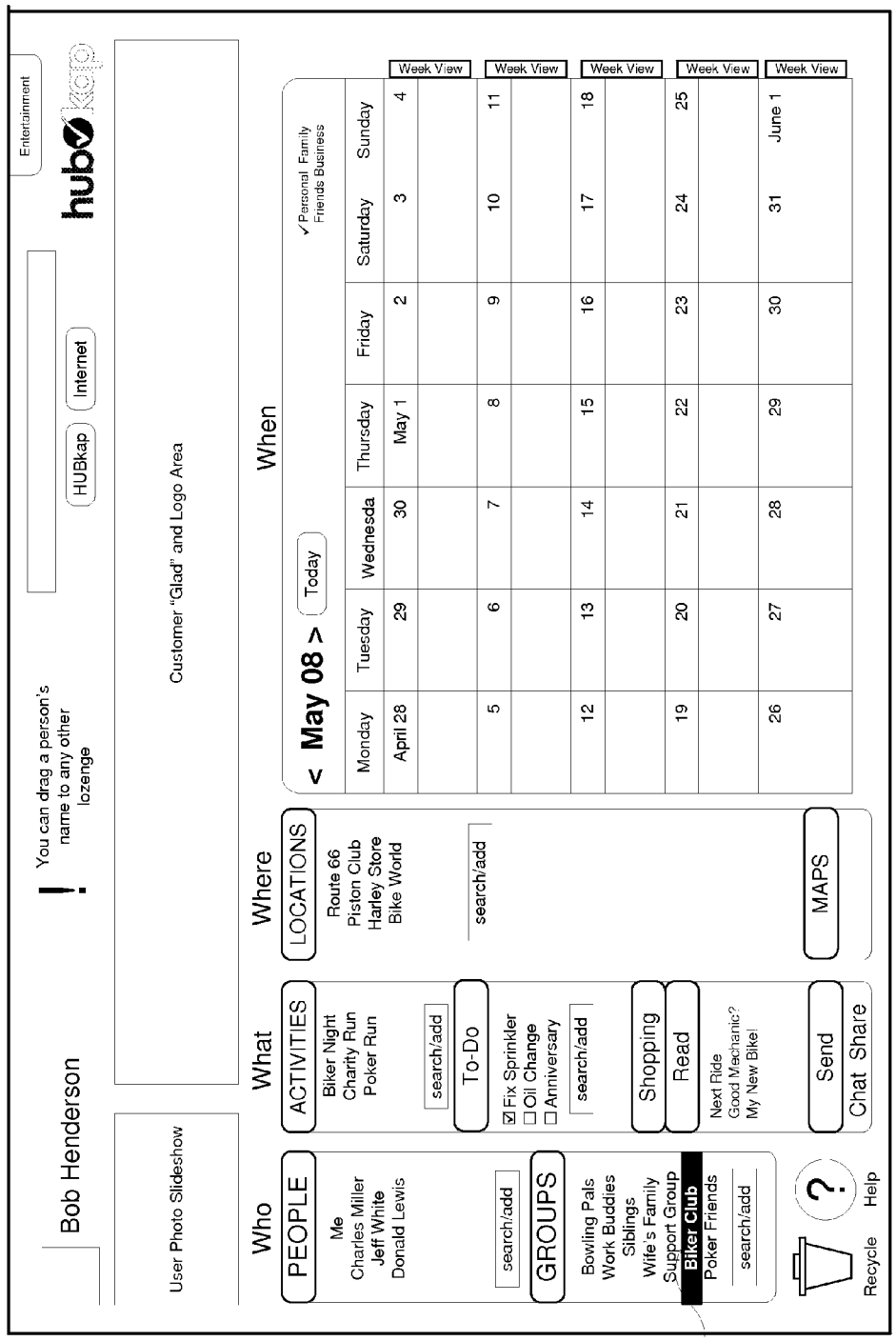

Because the service provider system 110 dynamically maintains all system user data, any item from a lozenge may be selected by a user input device and moved to another lozenge (e.g., dragging a selected item in one lozenge to the area of the user interface defining or occupied by a second lozenge) to cause the system to automatically perform an actions and services. This allows a user to harness the information stored by and the automation provided by the system to perform tasks for the user in a straight forward and easy manner. For example, a user may select and drag a person or a group from the people or groups lozenge to: the calendar to create an appointment or to the send lozenge to send a message to the person or group FIGS. 23-25 show an example of adding a user to a group. FIG. 23 shows the user has selected "me" 2301 from the people lozenge. The selection 2301 causes the groups lozenge to focus on groups the user belongs to. FIG. 24 shows that Contact "Charles Miller" 2401 is selected from the people lozenge and dragged 2402 to the group "Biker Club" 2410. In response, the service provider system 110 automatically accesses the user database and adds an indication for "Charles Miller" to group "Biker Club." FIG. 25 shows the "Biker Club" 2510 is selected causing the people, activities, read, and locations lozenges to focus on the biker club related items. For example, people is focused to contact in the Bike Club (e.g., Me, Charles Miller, Jeff White, and Donald Lewis), activities is focused to bike activities (e.g., biker night, charity run, poker run), the read lozenge includes message sent by Bike Club members (e.g., Next Ride, Good Mechanic, and My New Bike), and locations to bike related locations (e.g., Route 66, Piston Club, Harley Dealership, Bike world).

In another example, items directly dragged to a calendar date may automatically create an event. If a lozenge item is dragged to any date on the calendar in the month view, an event is automatically created for noon on that date with whatever content is associated with the lozenge. For example, if Bill is dragged to June 1, an event nickname Bill is provided for a 1 hour meeting with Bill at noon on June 1st. A message is sent to invite Bill. The user may select the item on the calendar to access the event and to edit or provide further details. If a lozenge item is dragged to the expanded week view or day view, then the event is scheduled for the hour time slot the item is dragged to on the calendar as a default. The hour slot is also visual highlighted or shaded to indicate the planed time of the meeting. The user may then adjust the timing of the event using a pointing user input device to select a border or portion of the highlighted region to expand or contract the highlighted area to increase or decrease, respectively, the time scheduled for the event.

Figure 26:
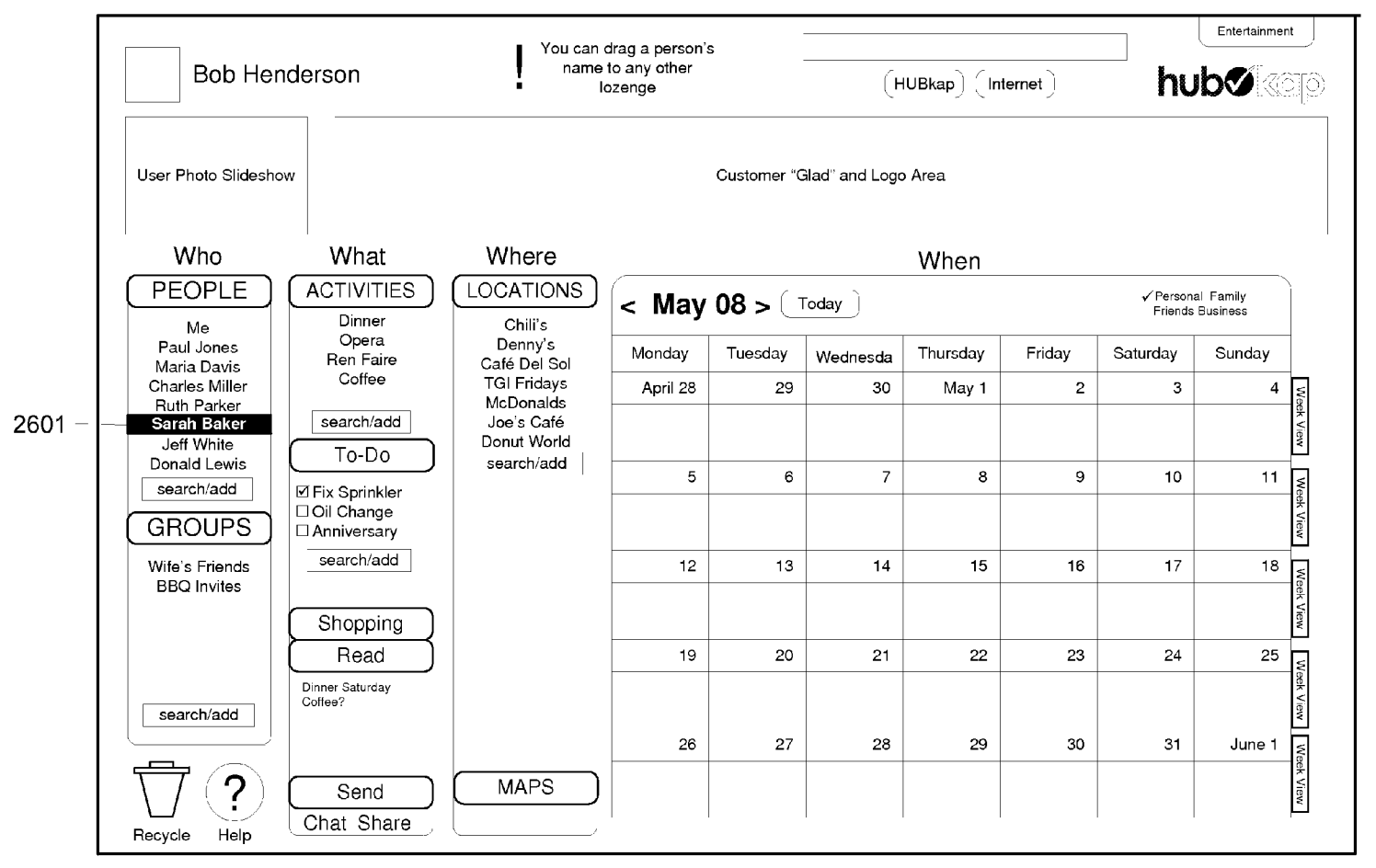
Figure 27:
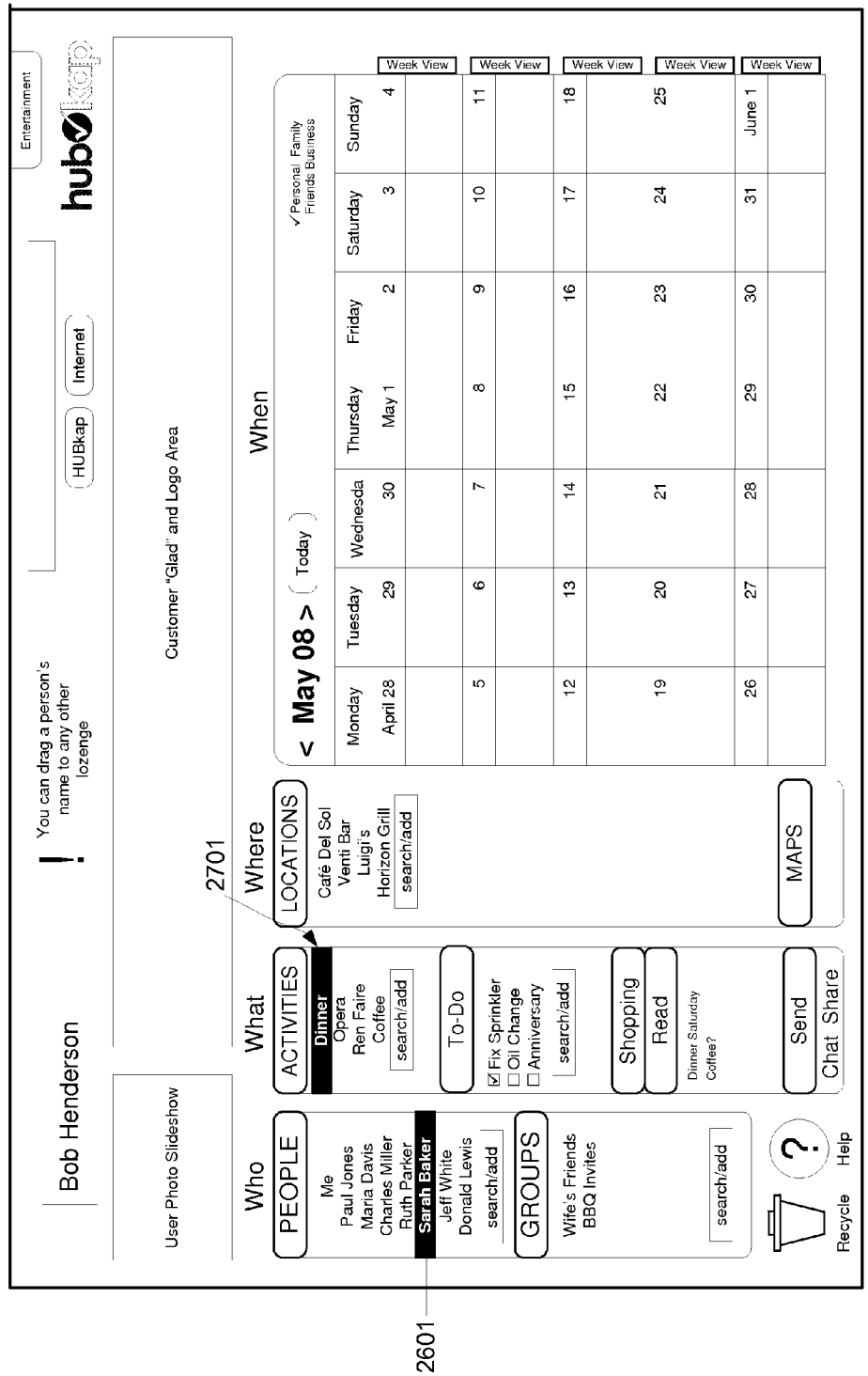
Figure 28:
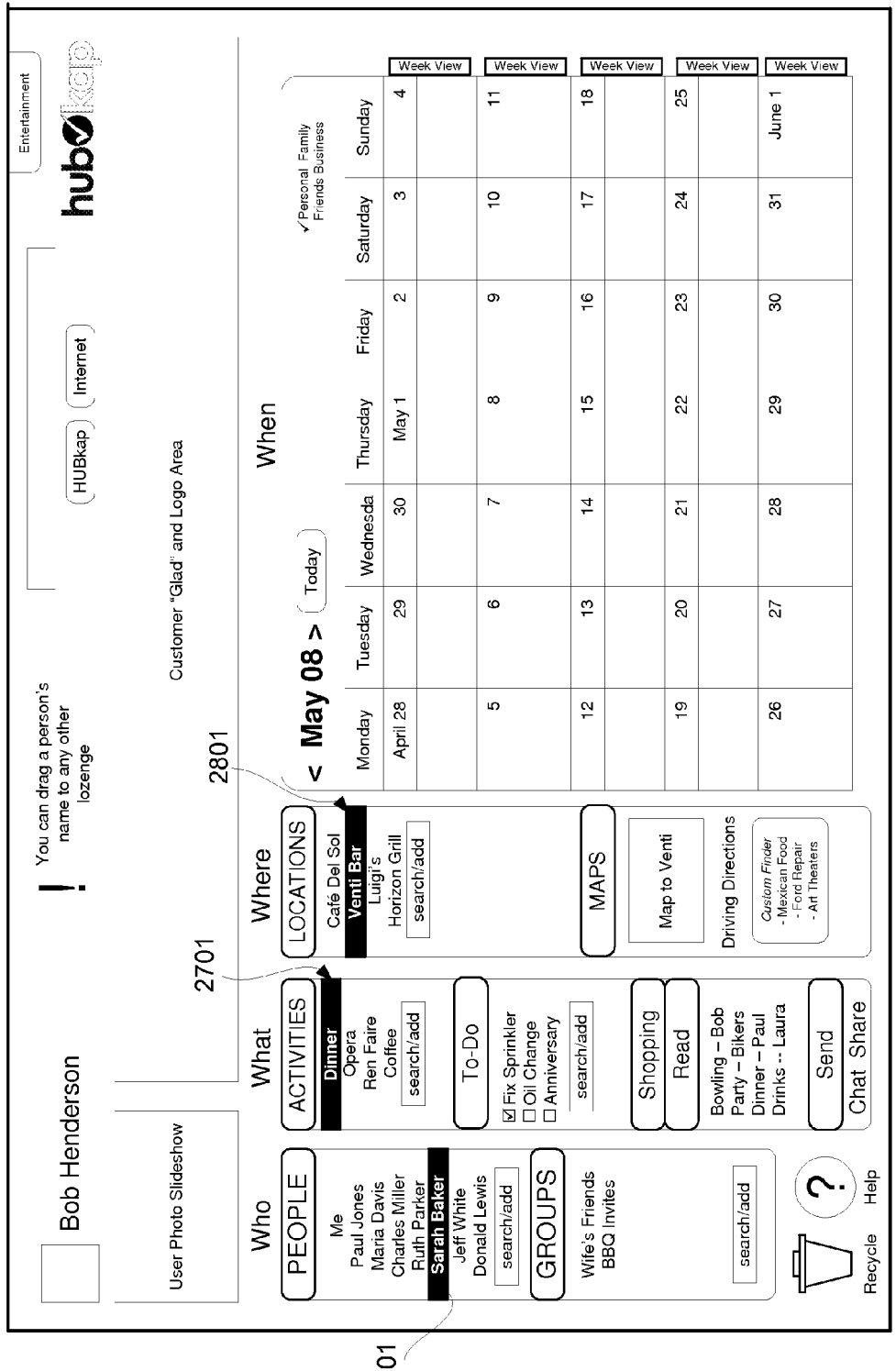
Figure 29:
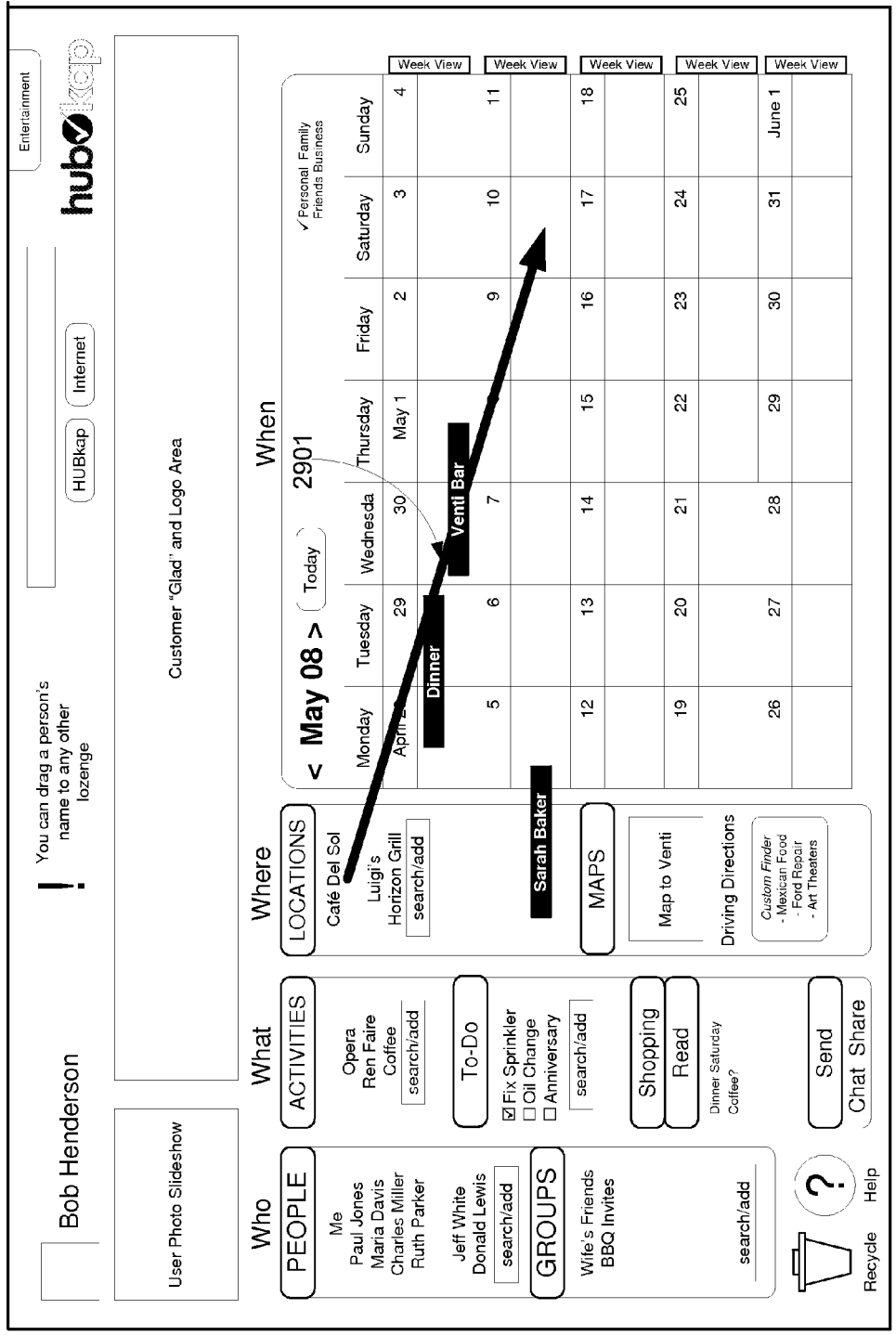
Figure 30:
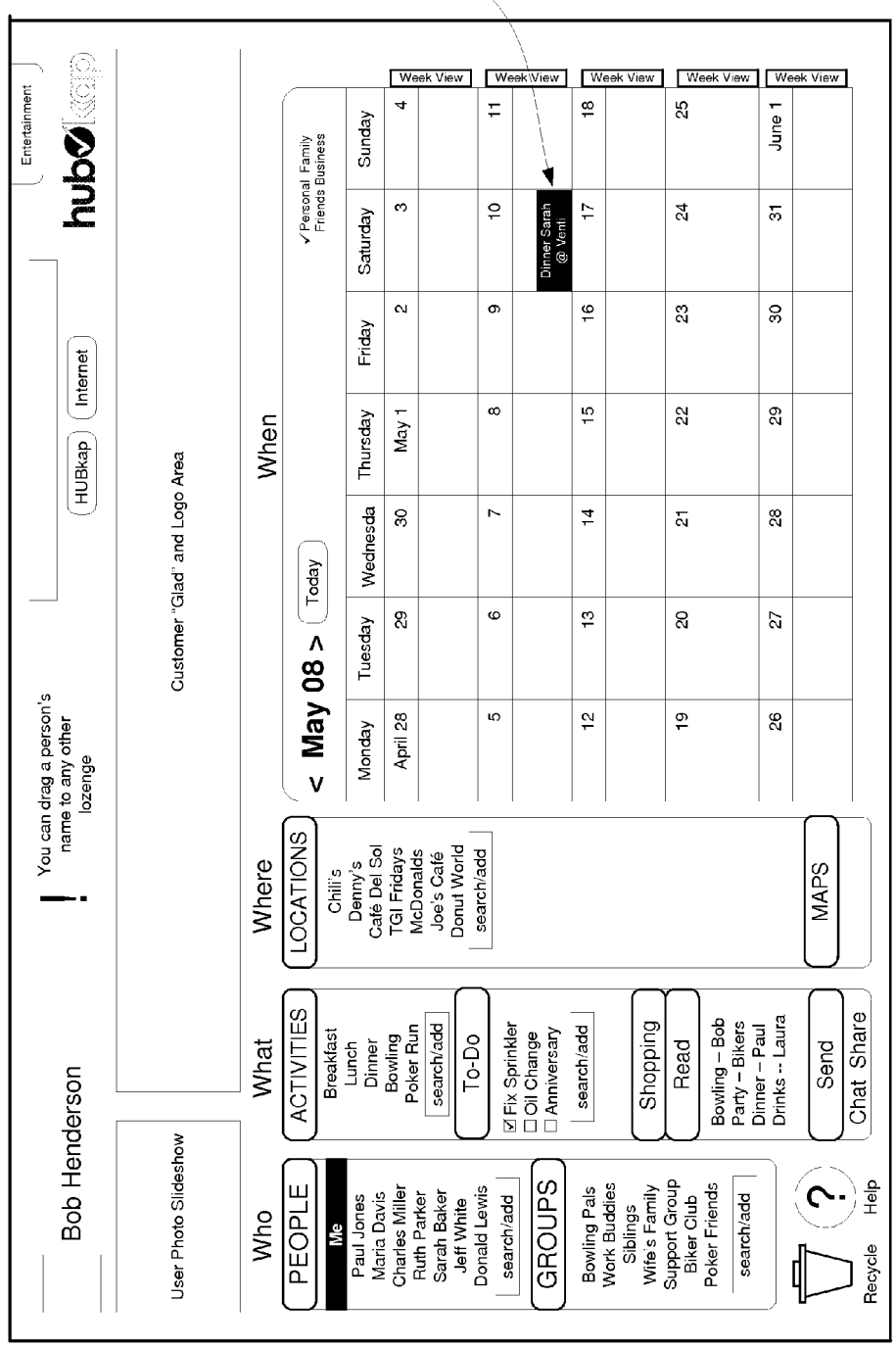

Combinations of items also may be dragged and dropped as shown in FIGS. 26-30. For example, FIG. 26 shows a contact "Sarah Baker" 2601 is selected from the people lozenge causing the other lozenges to focus based on Sarah Baker. FIG. 27 shows the user has selected "dinner" 2701 from the activities lozenge causing the locations lozenge to focus on dinner locations. FIG. 28 shows the selection of a location "Venti Bar" 2801 from the locations lozenge. FIG. 29 show the user drags 2901 the selected items to Saturday May 10$^{th}$ on the calendar lozenge. The system then automatically creates an event in the calendar for dinner at the Venti Bar with Sarah on May 10$^{th}$ and displays a corresponding indicator 3001 as shown in FIG. 30. Of course, many other combinations are possible.

Figure 31:
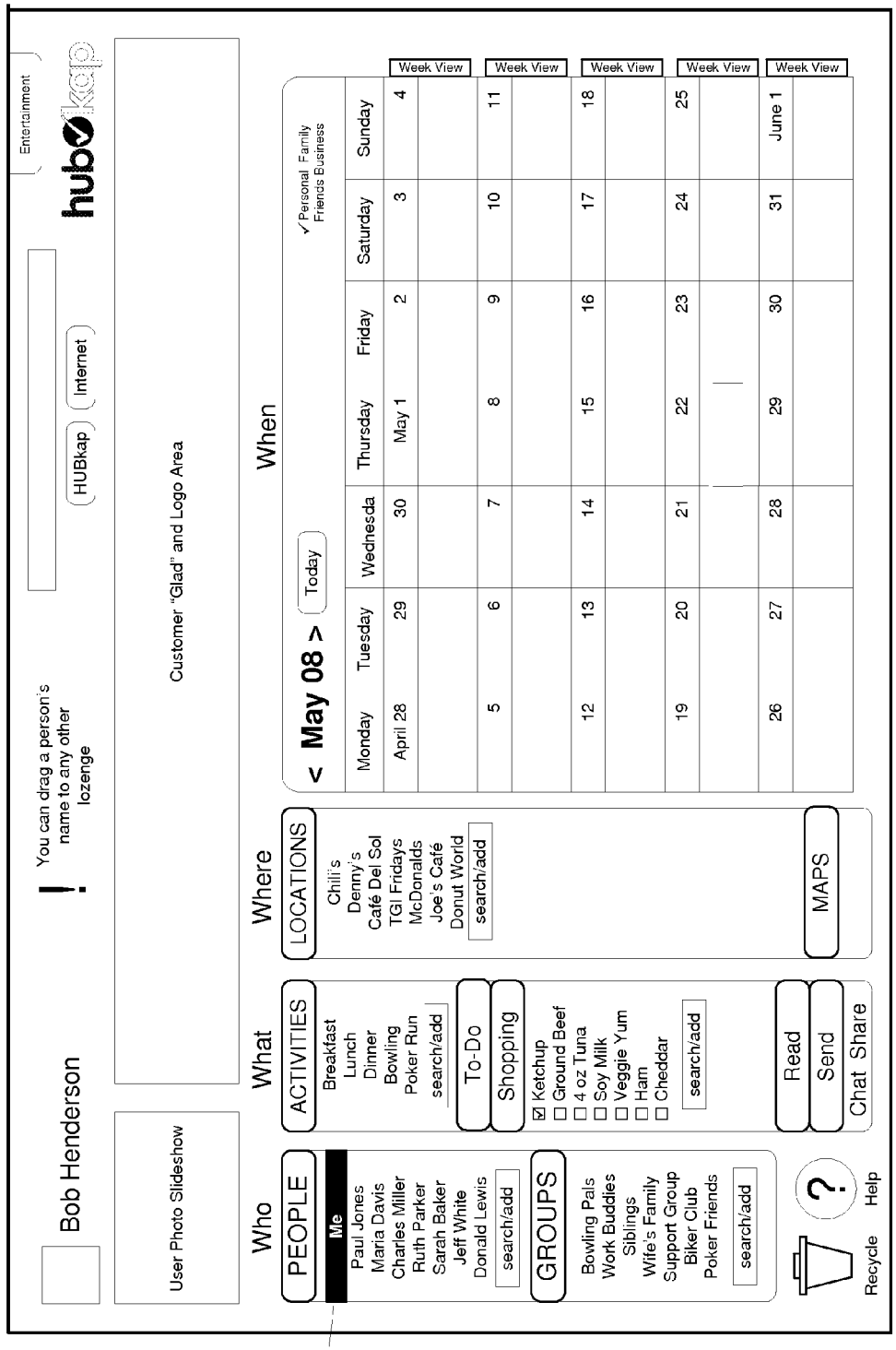
FIGS. 31, 32, 33, and 34 illustrate an exemplary sequence of create an event by dragging a location to the calendar lozenge.
Figure 32:
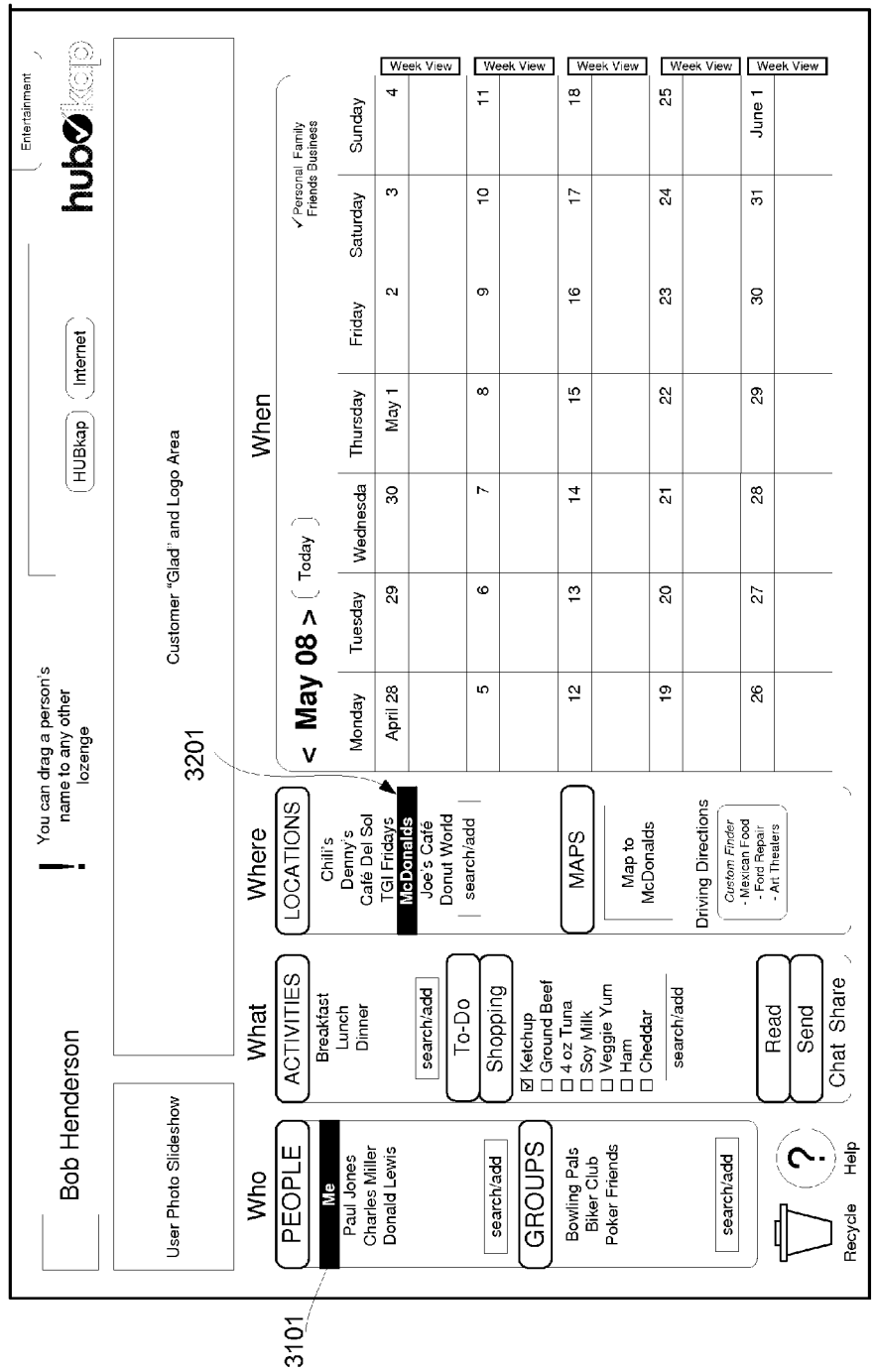
Figure 33:
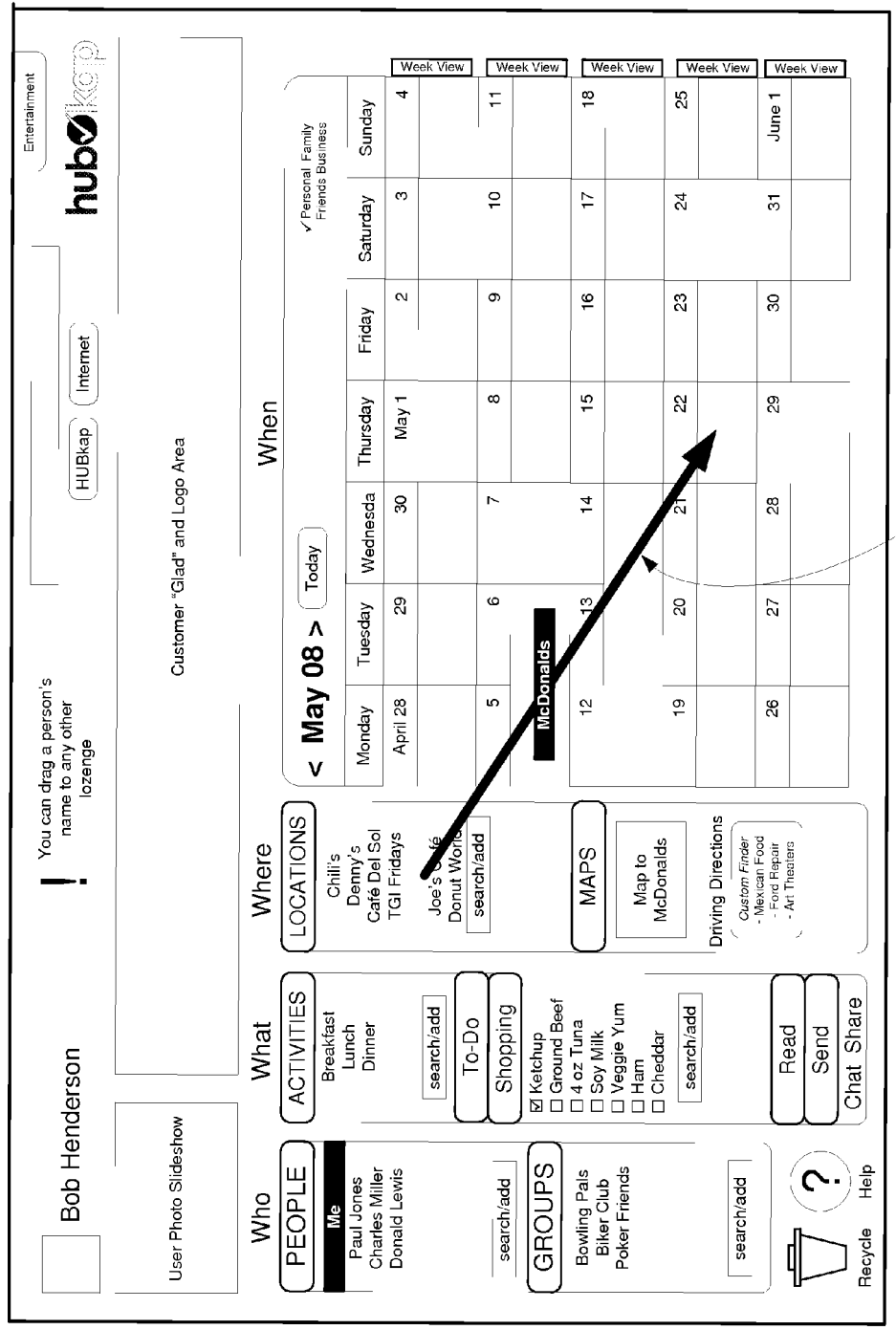
Figure 34:

In another example shown in FIGS. 31-34 a user creates an event using a location. As shown in FIG. 31, the user selects themselves 3101 in the people lozenge to focus on the user. As shown in FIG. 32 the user then selects a location "McDonalds" 3201 from the locations lozenge causing the people lozenge to focus on people the user goes typically invites to McDonalds, groups which go to McDonalds, activities that take place at McDonalds, a map to a McDonalds. FIG. 33 shows the user drags 3301 the location to a date on the calendar lozenge (e.g., May 22$^{nd}$). FIG. 34 shows the service provider system 110 then creates an event in the user's database for the user at McDonalds on the Thursday May 22, 2008 and displays an identifier 3401 for the event on the calendar.

Table 1 table gives some examples of other actions that may be performed by selecting items displayed in the lozenges and dragging them to other lozenges.

TABLE 1

| Lozenge | Action Lozenge | Action |
| --- | --- | --- |
| Help | any | any item dragged to help? or ? dragged to any item opens context sensitive help |
| Combos (after click to highlight) | | |
| who + what | when | creates cal event with those item fields populated |
| who + where | when | creates cal event with those item fields populated - prompts for event name |
| who + what + where | when | creates cal event with those item fields populated - prompts for event name |
| where + what | when | creates cal event with those item fields populated |
| Single Items | | |
| People | Groups | adds person to group |
| People | Blank Group | adds person to group, prompts for new group name |
| People | To Do | creates empty to do with text "with FN LN" |
| People | Shopping | creates empty shopping item with text "for FN LN" |
| People | Read | Same as select/highlight - shows all messages from the dragged/selected person's name |
| People | Send - Share | Open a "new share" box, user may drag files (using the computer's OS) or select them with a BROWSE button, then click SHARE |
| People | Send - Discuss | Open a "new message" box, user may type a message then click SEND |
| People | Calendar (blank area) | creates event that includes that person (prompts for event name, etc.) |
| People | Calendar Appointment | adds person to event attendee list |
| People | User Picture | adds contact image to slideshow |
| People | Family | changes relationship of contact to family |
| People | Business | changes relationship of contact to business |
| People | Friends | changes relationship of contact to friends |
| People | A Glad | Sends that Glad to that person via email |
| People Groups | People | adds person to group |
| Groups | To Do | creates empty to do with text "with <group name>" |
| Groups | Shopping | creates empty shopping item with text "for <group name>" |
| Groups | Read | Same as select/highlight - shows all messages from the dragged/selected group name |
| Groups | Send - Share | Open a "new share" box, user may drag files (using the computer's OS) or select them with a BROWSE button, then click SHARE to share them with that entire group |
| Groups | Send - Discuss | Open a "new message" box, user may type a message then click SEND to send that message to that entire group |
| Groups | Calendar (blank area) | creates event that includes that group (prompts for event name, etc.) |
| Groups | Calendar | adds group to event attendee list |
| Groups | A Glad | Sends that Glad to that group via email |
| Activities | To Do | creates to do item with activity name |
| Activities | Read | Same as select/highlight - shows all messages associated with the dragged activity |

TABLE 1-continued

| Lozenge | Action Lozenge | Action |
|---|---|---|
| Activities | Send - Discuss | Opens a requester "Who would you like to discuss this activity with?" |
| Activities | Calendar (blank area) | creates event (cal event name = activity) |
| Activities | Calendar Appointment | changes name of event to new activity (cal event name = activity) |
| To Do | People | appends to do item with text "with <FN LN>" |
| To Do | Groups | appends to do item with text "with <group name>" |
| To Do | Shopping | To-Do list is moved to Shopping List |
| To Do | Send - Discuss | Opens a requester "Who would you like to discuss this To-Do List item with?" |
| To Do | Calendar (blank area) | creates cal event (to do item = cal event name) |
| To Do | Calendar Appointment | changes name of event to new activity (cal event name = to do item) |
| To Do | Locations | Creates to do item "go to <location name>" |
| To Do | | |
| Shopping | People | Opens an email to that person, subject is "Shopping for <item>", then the user may continue to type a message and click the SEND button. |
| Shopping | Groups | Opens an email to that group, subject is "Shopping for <item>", then the user may continue to type a message and click the SEND button. |
| Shopping | To Do | creates to do "go shopping for <shopping list item>" |
| Shopping | Send - Discuss | Opens a requester "Who would you like to discuss this Shopping List item with?" |
| Shopping | Calendar (blank area) | create cal event "go shopping for <shopping list item>" |
| Shopping | Calendar Appointment | Changes name of event to "go shopping for <shopping list item>" |
| Read | People | Open a "new message" box, user may type a message then click SEND to send that message to that person |
| Read | Groups | Open a "new message" box, user may type a message then click SEND to send that message to that entire group |
| Read | To Do | Adds message title to To-Do list |
| Read | Shopping | Adds message title to Shopping list |
| Read | Send -Share | Open a "new share" box, user may drag files (using the computer's OS) or select them with a BROWSE button, then click SHARE to share them with that addressee list found in that message |
| Read | Calendar (blank area) | Opens an event with the activity set to the message title, with the attendee list set to the addressee values. Missing will be a location. |
| Read | Calendar Appointment | Adds message title to "comments" section of the existing appointment |

Focusing

The user interface also provides a unique feature called "focusing." Focusing intuitively connects all of the interface's basic functionality and content to provide the features and the content that are generally the most useful to a user at any particular moment in time. For example, whenever a user selects an item provided by one of the four strips WHO 731, WHAT 733, WHERE 735, and WHEN 737, the other strips and lozenges automatically react by providing the user with the content and features within the context of each strip that the user may most likely desire based on the user's selection.

Whenever a user selects a contact name for a person or a group the other strips automatically adjust the information displayed based on the selection. For example, if the user selects "John Merk" in the People lozenge of the WHO strip 731, then the Read lozenge of the WHAT strip 733 also displays all current message threads between the user and John Merk. Similarly, the Calendar lozenge of the WHEN strip 737 displays all upcoming appointments with John Merk and all events that the user is coordinating with him; and the maps lozenge of the WHERE strip 735 displays an address and associated map for John Merk.

Focusing may be initiated by selection of content, inputs, or features from any of the strips of the user interface. For example, if the user selects a new message "John Erikson about Fishing Trip," the People lozenge displays a list of the contacts associated with the Fishing Trip, and the Calendar tab displays the event on the calendar which is being referred to, and the locations lozenge of the WHERE strip 735 displays the boat company chartered for the trip and a map of the area surrounding the boat launch. In another example, if the user selects an event "Weekend Away" from the activities lozenge, the conversational thread regarding this event opens automatically in the Read lozenge of the WHAT strip 733, and the People lozenge opens to show Sharon's contact information.

Figure 35:
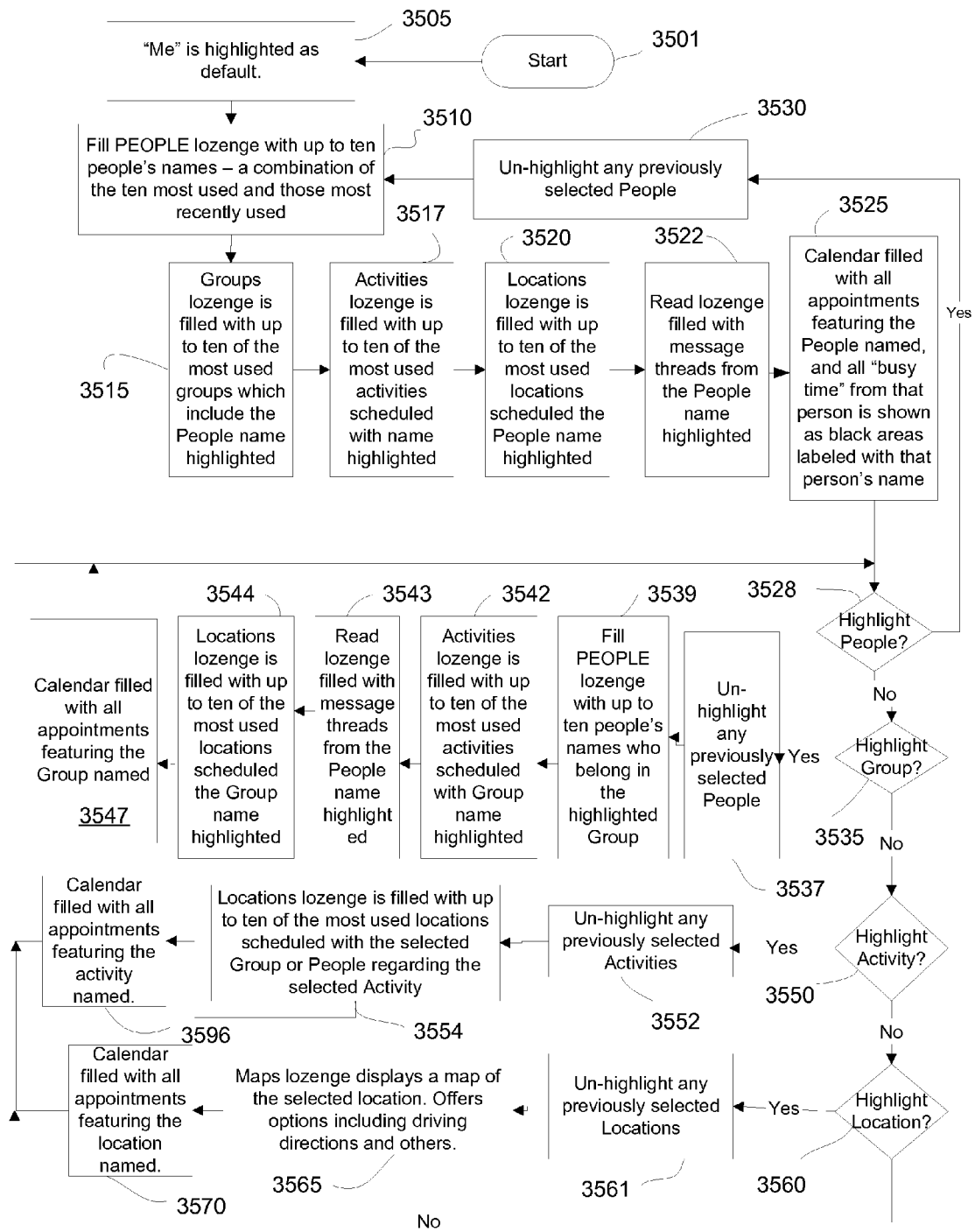
FIG. 35 shows an exemplary focusing process for items displayed in the lozenges of the WHO, WHAT, WHERE, and WHEN strips.

FIG. 35 shows an example of a process 3500 for focusing of the lozenges. The process starts 3501 when a user accesses the user interface. The server initially populates the people lozenge with "Me" which is automatically highlighted as default in the initial startup of the user interface 3505.

The applications server determines up to ten contacts from the user contact database for the highlighted name in the peoples lozenge. The server selects the contacts based on the ten most frequently used contact, the ten most recently used contacts, or a combination of both. The server uses the determined contacts to fill the contact list of the people lozenge 3510.

The applications server determines up to ten of the most used groups which include the name of the contact highlighted in the people lozenge (in the first instance it is the default "me"). The determined groups are then used to fill the group contact list of groups lozenge 3515.

The applications server determines up to ten of the most frequently used activities scheduled with name highlighted in the people lozenge. During an initial period of use, or if there are few activities the user has actually participated in, the system may select activities from a default list of activities based on the user profile in conjunction with the time of day, the weather, any nearby holidays, the user's location, and the time of year. The server uses the determined activities to populate the list of activities display in the activities lozenge 3517.

The applications server determines up to ten of the most used locations scheduled for the contact name highlighted in the people lozenge. The server uses the determined locations to populate the list of locations provided by the locations lozenge 3520.

The applications server determines message threads involving the contact highlighted in the people lozenge. The server selects up to ten message threads and populates the read lozenge with the thread identifiers of the selected message threads 3522. The server selects the newest threads over older or unanswered threads.

The applications server determines all events including the contact highlighted in the people lozenge. The server populates the calendar with the determined events including the highlighted contact and the user 3525. If the highlighted contact is not the user (i.e., "me" is not highlighted) and the contact is a user of the service provider system 110, the calendar displays any "busy time" from that person within the calendar lozenge (e.g., black areas labeled with that person's name).

The system monitors the user interaction with the user interface and determines whether any people are highlighted 3528. If a user selects a new contact from the people lozenge, the previously selected contact is un-highlighted and the processes 3510, 3515, 3517, 3520, and 3522 are repeated for the newly highlighted contact. The system also monitors the user interaction with the user interface to determine whether a group is selected from the groups lozenge 3535.

If a group is selected, any contact previously selected in the people lozenge is un-highlighted 3537. The applications server determines up to ten contacts in the group. The determined contact then use to populate the contact list of people lozenge 3539.

The applications server determines up to ten of the most frequently used activities scheduled with group highlighted in the group lozenge. The server uses the determined activities to populate the list of activities display in the activities lozenge 3542.

The applications server determines message threads involving the contact highlighted in the people lozenge. The server selects up to ten message threads and populates the read lozenge with the thread identifiers of the selected message threads 3543. The server selects the newest threads over older or unanswered threads.

The applications server also determines up to ten of the most used locations scheduled for the group name highlighted in the groups lozenge. The server uses the determined locations to populate the list of locations provided by the locations lozenge 3544.

The applications server determines all events including the group highlighted in the groups lozenge. The server populates the calendar with any of the determined group events. 3547

If no group is selected, the server monitors whether any activity is selected 3550. If so, any previously selected activities are un-highlighted 3552. The server also determines up to ten of the most used locations previously scheduled with the selected group or contact regarding the selected activity 3554. In addition, the calendar is filled with all events featuring the activity named 3596.

If no activity is selected, the server determines if a location is selected by the user 3560. If so, any previous locations are un-highlighted 3561. The server determines a map of the selected location, and the server populates the maps lozenge with the determined map 3565. The server also determines options including driving directions and others appropriate for the location and provides them on the maps lozenge 3565. In addition, all events featuring the location are highlighted on the calendar 3570.

The server monitors to see if any people are selected 3528. If a user selects a new contact from the people lozenge, the processes 3530, 3510, 3515, 3517, 3520, and 3522 are repeated. If not, the server determines if any group is selected 3535. If the user selects a new group from the groups lozenge, the processes 3537, 3539, 3542, 3543, and 3544 are repeated for the newly highlighted group. If not, the server determines if any activity is selected 3550. If the user selects a new activity, the processes 3552, 3554, and 3556 are repeated for the newly highlighted activity. If not, the server determines if a location is selected 3560. If so, the processes 3561, 3565, and 3570 are performed. The server continuously monitors the user's interaction (e.g., processes 3528, 3535, 3550, and 3560) to focus the lozenges accordingly.

Mobile User Interface

A modified user interface may be supplied for mobile platforms, such as mobile phones, smart phones, and PDA that have limited processing power and/or screens. For example, WAP cell phones may be provided with an "Agenda" that allows them to see the upcoming four hours of appointments as a default screen. The interface may be provided with a number of inputs that are most useful to a user in this environment. For example, for appointments in the agenda the user may select an appointment and be provided with user inputs for specific actions with regard to those appointment. For example, the user may selection the options: running late, can't make it, and cancel meeting (with verification). Selection of any of these options causes an automatic message to be sent all contacts associated with the appointment indicating the user is running late, can't make it, or needs to cancel. The automated message is created by the system service provider and sent to the contacts associated with the appointment. The message may be an instant message, email, automated phone message, or an alert or popup window of a system user's user interface. The user interface also may display the user's shopping list listing the user's items. A check box or other indicator may be provided to allow the user to check items off the list. In addition, the To-Do list may be provided allowing a user to see items on the list, add items to the list, and check items off the list. Conflict resolution "alerts" and resolution System wide—12 hr email and SMS notification on event change.

In addition to the features provided for WAP cell phones, smart phones may provide the additional functionality. For example, the user's agenda may also provide action notices. The smart phone also may allow a user to reorder their To-Do List. The smart phone PDA includes the dynamic calendar. The dynamic calendar also the user to filter information via persona/family/business categories. In addition, the user may be presented with day/week views. The user may add an appointment, delete Appointment, and re-order appointments in a list.

Search Tool

Figure 36:
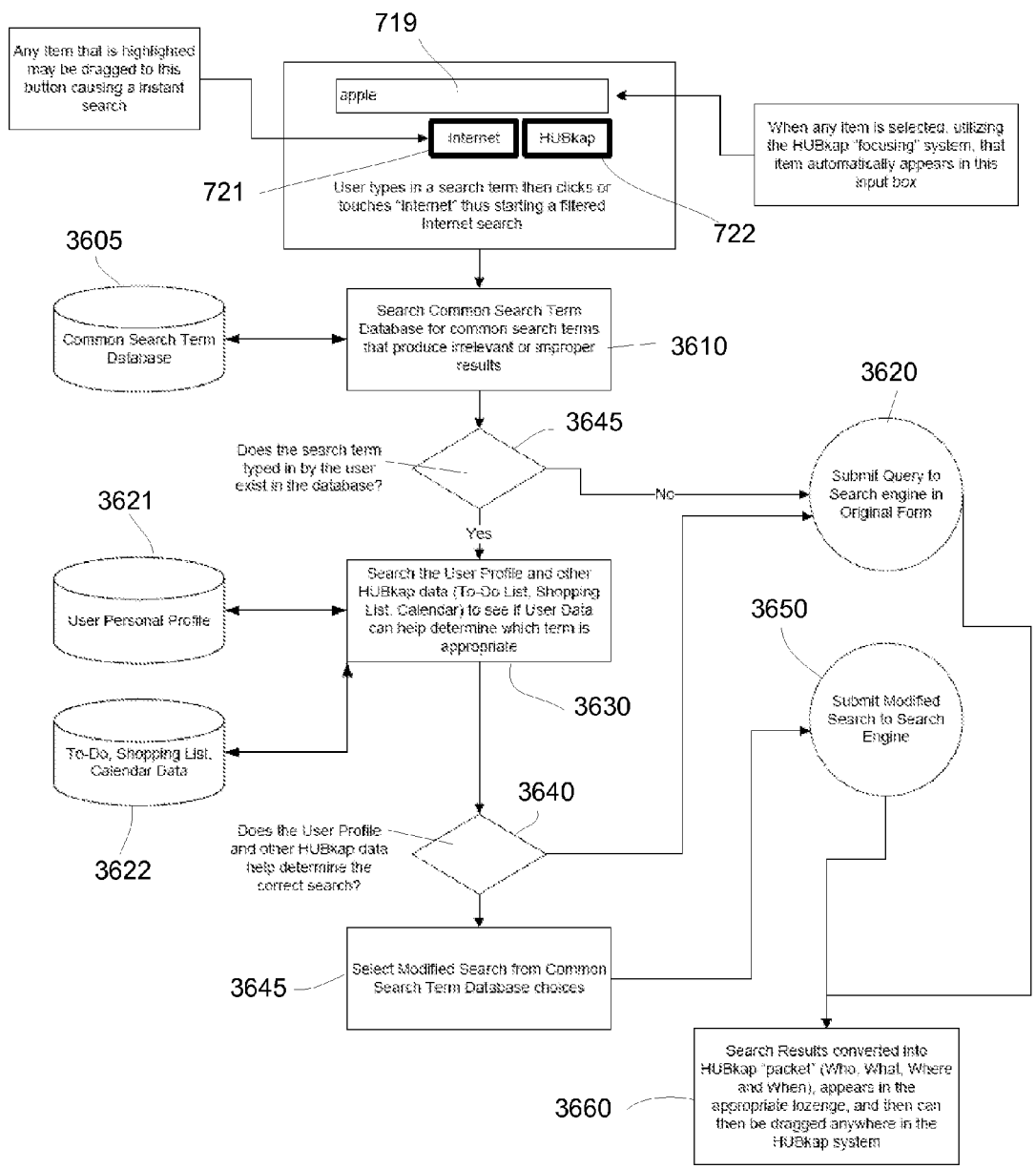
FIG. 36 shows an exemplary focused search process.

FIG. 36 shows an example of an improved search tool for use with the system. The system service provider includes a lot of information that may be harnessed to facilitate user searches. As pointed out above, items within lozenges may be focused for users depending on the actions with the user interface. Similarly, user search of the web and system data may be focused. The user interface may provide a search tool. The search tool includes a word entry field 719 to enter key words. Two inputs are provided to search the key words on the Internet 721 and within the system 722. In addition, any item may be dragged to the entry field 719 to create a search term.

The user enters a search term 3601 and selects the Internet input 721 to start a filtered Internet search. The service provider system accesses a common search term database 3605 to search 3610 for common search terms that may produce irrelevant or unwanted search results. The common term database 3605 includes a database of terms that may have common different meanings which may lead to ambiguity. For example, the term apple may be related to a fruit, a computer, a tree, bowling term, slang for drug, and a mollusk. The system determines whether the search term appears in the database 3615. If the term does not appear, the system submits the term to a search engine in its original form 3620. If the term is found in the common term database, the system searches the user profile 3621 and other db items 3622 associated with the user (e.g., the to-do list, shopping list, calendar) to see if user data provides additional information that indicates what context of the search the user actually intended 3630.

The system determines whether the user data indicates a particular meaning from among the common terms determined 3640. If the system determines a particular meaning, the system selects the modified search term 3645 and submits the modify search to the search engine 3650. For example, if user profile indicates a user is 60 year woman, shopping list includes pie crust, and has visit from arborist, terms computer company, mollusk, slang and bowling may be eliminated and a refined search of apple fruit and apple tree is provided to the search engine. Regardless of which search is performed (i.e., 3620 or 3660), the search results are converted to a system packet that appears in the appropriate lozenge which may be dragged anywhere in the system 3660.

Glads

The system service provider is able to promote marketing/advertising/sales of products and services through electronic delivery of digital media, information, and content including coupons, incentives, discounts, promotions, product information, product descriptions, product comparisons, and new product/service introductions. The marketing/advertising/sales of products and services is promoted based on user data, including user profile, history, and demographic information; timing, location, and/or activity (or any combination of these among others) about the user; and the association of the user with other system users, to provide the marketing/advertising/sales information to the user when the presentation of the digital media has a higher chance or probability of impacting a user's behavior. In addition, dynamic filters associated with the marketing/advertising/sales information may be specifically tailor by system partners to target a desired user with a degree of granularity never before possible with any online marketing system.

The digital media, information, and content used by the system service provider to promote goods and services are graphical "ads" or Glads. Glads are stored in a system Glad database and include Glad art, for presentation in the graphics bar of the user interface, and Glad filters for targeting specific users. The Glad art may include one or more of a message, an advertisement, a commercial, a description, a price, a discount, a coupon, a voucher, a ticket, a rebate, a redemption, a promotion, an offer, a slogan, a trademark, a service mark, a tag line, a company, business, or organization logo, brand, or other identification. Glad filters also include various parameters and conditions that filter the who, what, when, where of how to trigger the serving of the Glads for presentation in the products and services branding area 726 of the user interface. As a result, Glads are provided to the system users having the most likelihood of being interested in the Glad. Glads may be created by the system service provider 110 and by system partners 125 and stored in a Glad database.

Figure 37:
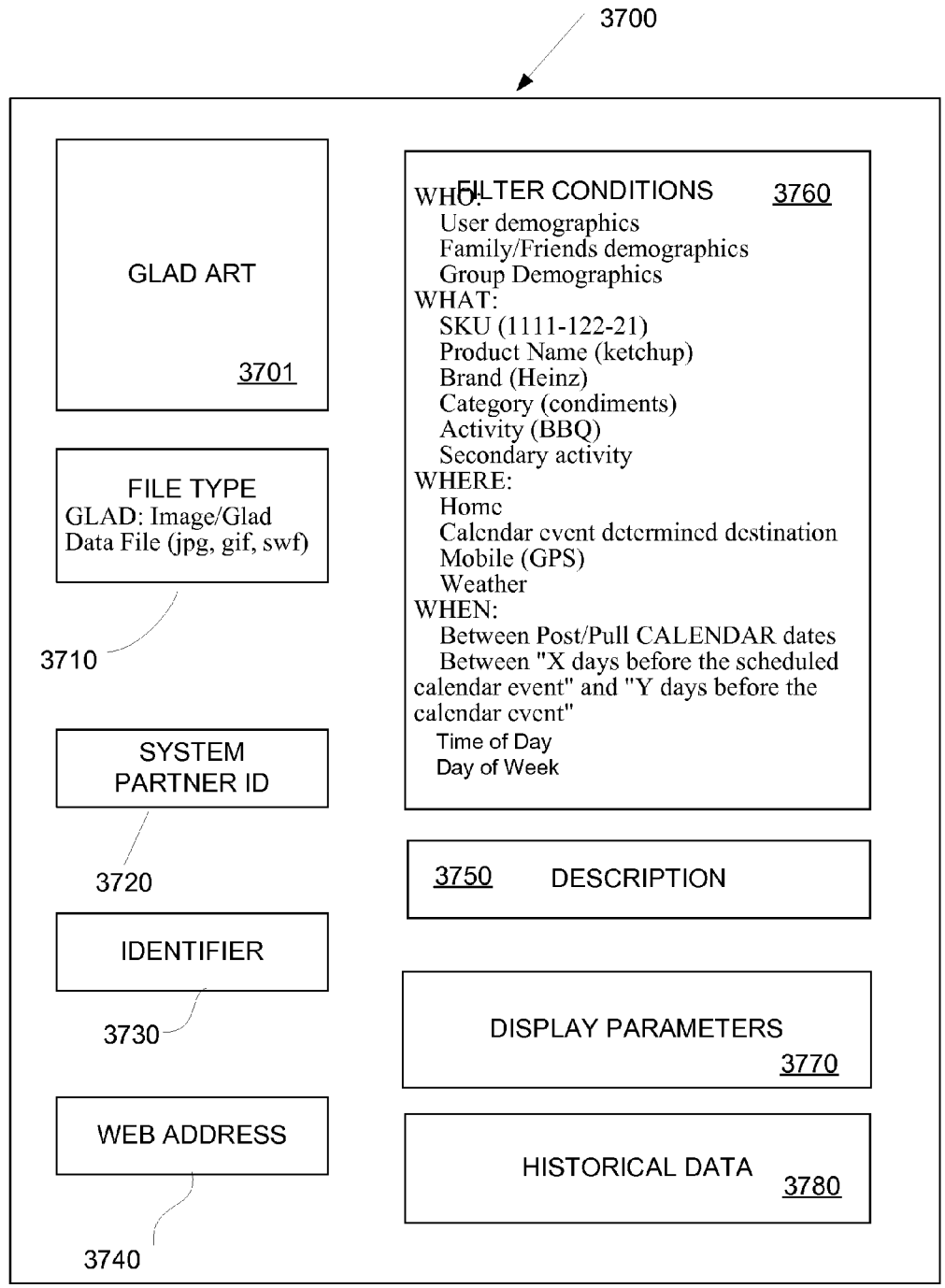
FIG. 37 show a schematic representation of information associated with a Glad

FIG. 37 illustrates an example of the information and data 3700 that may be stored in connection with a Glad in the Glad DB. Typically, a Glad many include Glad art 3701, a file type 3710, a system partner identifier 3720, an identifier 3730, a web address 3740, filter conditions 3760, display parameters 3770, and historical data 3780.

A Glad includes digital content or Glad art 3701 that is presented to users in the graphics bar 707 of the user interface. The digital content may include one or more of a graphic, an image, a picture, a video, and an audio component stored as a digital file. Some examples of the file types of digital formats that may be used include .gif, .jpeg, and .swf; however, any digital media that may be presented by a web browser and/or plugin may be used. The digital content also may include any number of characters, colors, shapes, logos, images, animations, visual and sound effects that covey a message to promote a product, a goods, and/or a service. In addition, a trademark, a service mark, a tag line, a company, business, or organization logo, and brand may be provided. It should be noted that FIG. 37 is representational and shows information associated with a Glad, but does not necessarily correspond with the actual database structure. For example, the same Glad art may be associated with multiple and different campaigns and filter conditions. As a result, instead of storing a separate copy of Glad art for each Glad, a reference or pointer to the file location of the Glad art may stored and used to access the Glad art associated with the Glad when serving the Glad art to the user interface.

An indicator 3710 of the file type (e.g., .gif, .jpeg, and .swf) may be stored in association with the Glad to direct the system to use appropriate applications to serve the Glad to the user interface. The system partner identification 3720 (e.g., a code, a name, a number) allows the system to identify any Glads with campaigns, monitor system partner operations, and to generate reports. The Glad identifier 3730 may be used by the system to identify a Glad. A web address 3730 may be used to provide a link to a specific a website or webpage associated with the Glad. For example, the web address may be used by the user's browser to display the website based on a certain user interaction with the Glad displayed in the user interface. For example, if a user selects the Glad art displayed (e.g., double selecting, such as double clicking on the Glad art 3701 on the user graphics bar), the web address may be used to navigate a popup browser to display a webpage or other online content associated with the Glad.

The description 3750 may include information about the Glad. The description 3750 may include information about a product or a service associated with the glad, such as a name, a category, a type, a SKU, and a brand. The description also may include the type of Glad, such as an advertisement, a commercial, a promotion, a coupon, a voucher, a ticket, a rebate, or an offer. The description 3750 may include an amount, a discount, or a value associated with the glad.

A number of filter conditions 3760 are associated with the Glad for use by the system logic to identify and/or trigger Glads that a user may interested in. The filters conditions include who, what, where, and when conditions and criteria that are used for comparison to user data stored in association with the WHO, the WHAT, the WHERE, and the WHEN strips of user interface and the user profile information in addition to other data associated with the user (e.g., the weather at a user's location). The who conditions filter for groups, family and friends, and the user. The most general filter is the group filter. The group filter targets contacts based on demographics of a user group. Family and friends is more specific filter targeting individuals based on demographic for individuals having a personal relation to the user, such as family members, friends, and business associates. The most specific filter is who which targets the individual user based on individual demographics, such as information stored in the user's personal profile. For example, user personal profile information that may be used to target individuals includes age, gender, income, hobbies/interests, previous shopping data, and other demographic information about individuals stored in the user profile.

The what conditions filter for a secondary activity/event, a primary activity/event, a category, a brand, a product name, and a SKU. The most general of the filters is the secondary activity/event in which a particular product/service type is specified based on the activity associated with a calendar event to which a user is invited to. The primary activity/event filter specifies a particular product type based on the activity found in a calendar event generated by the user. The category filter specifies a particular product/service category or type of product (e.g., food, grocery, meat, dairy, produce, office supply, furniture, sporting equipment, clothing, electronics, books) much like the areas in a department store that are found in association with a user's to-do or shopping list. The brand filter specifies a particular brand of product. The product name filter specifies a particular product name. The most specific filter is a SKU number or code that specifies a particular product Stock Keeping Unit (SKU) (e.g., found on a user's shopping list).

The where conditions filter for location, such as weather, a mobile location, a destination, and a home location. The most general filter is the weather in which an advertiser specifies a particular product/service type based on the weather conditions at the location of a user. The mobile location filter is used to specify a particular product/service type based on the GPS location of a user's mobile phone or web-enabled mobile phone. The destination filters are used to specify a particular product/service type based on the user's scheduled destination locations (e.g., a location of an event). The most specific where filter is the user's home location which specifies a particular product/service type based on the user's device's actual physical location.

The when conditions filter for a current time and a scheduled time. The current time filter allows a particular product/service type to be specified based on the current (e.g., post Glad between June $1^{st}$ and June $16^{th}$ for a Father's Day sale). In addition, the current time may filter for days of the week (e.g., Mon-Sun) and time of day (e.g., morning, afternoon, evening, late night). The scheduled time filter allows a particular product/service type to be specified based on the time of a future or past scheduled event in the user's calendar (e.g., post Glad between x days before a calendar event and y days before a calendar event or post Glad between x days after a calendar event and y days after a calendar event), such as, a discount for an airplane ticket provided two weeks before a user's scheduled trip indicated on their calendar.

One or more of the conditions filters 3760 may be specified for each Glad to tailor who the Glad is served to wherein the more filters specified the more specific the individual user targeted becomes.

Display parameters 3770 also may be provided for the Glad. For example, if there are more Glads than may be displayed in the products and services branding area 726 of the user interface, a rotation of Glads may begin so Glads are not excluded from presentation to the user. As a result, the a duration may be provided such as "present Glad for minimum of minimum x seconds or minutes per presentation.". A system partner also may customize the presentation of Glads as part of an overall marketing campaign or to prevent saturation of presentation of a particular Glad. Therefore, the Glad may include additional criteria for Glad presentation and display, such as "do not rotate this Glad" and present this Glad for "x minutes/hours/days." In addition, an parameter indicating the Glad may be automatically customize by including message that inserts the customer name may be provided.

Glad Placement Logic

The system service provider 110 uses a Glad placement application to match the appropriate Glad content with a user based on specific information stored about the user in the user database. The service provider system provides powerful Glad placement because of the detail of information that the system has available at any given time for any system user. In order to match content, the system searches the individual events, and the daily to-do and shopping lists stored in association with a user account to determine if any there are any Glads that match items a user may be looking for at that moment. While searching the system also looks at all user information and compares the information against the triggers or conditions in the Glad database to select and deliver specific advertising content/campaign to the user. At the very minimum, the Glad placement application posts targeted Glads to the user even if there are no daily events based on other conditions for the day, such as weather, seasonality, holidays, and other factors. In addition, the Glad placement application may verify that the campaign is appropriate for the demographics, date, day-of-week, and weather, of a user. If a Glad is determined to be a good match, then the Glad is presented to the user.

Figure 38:
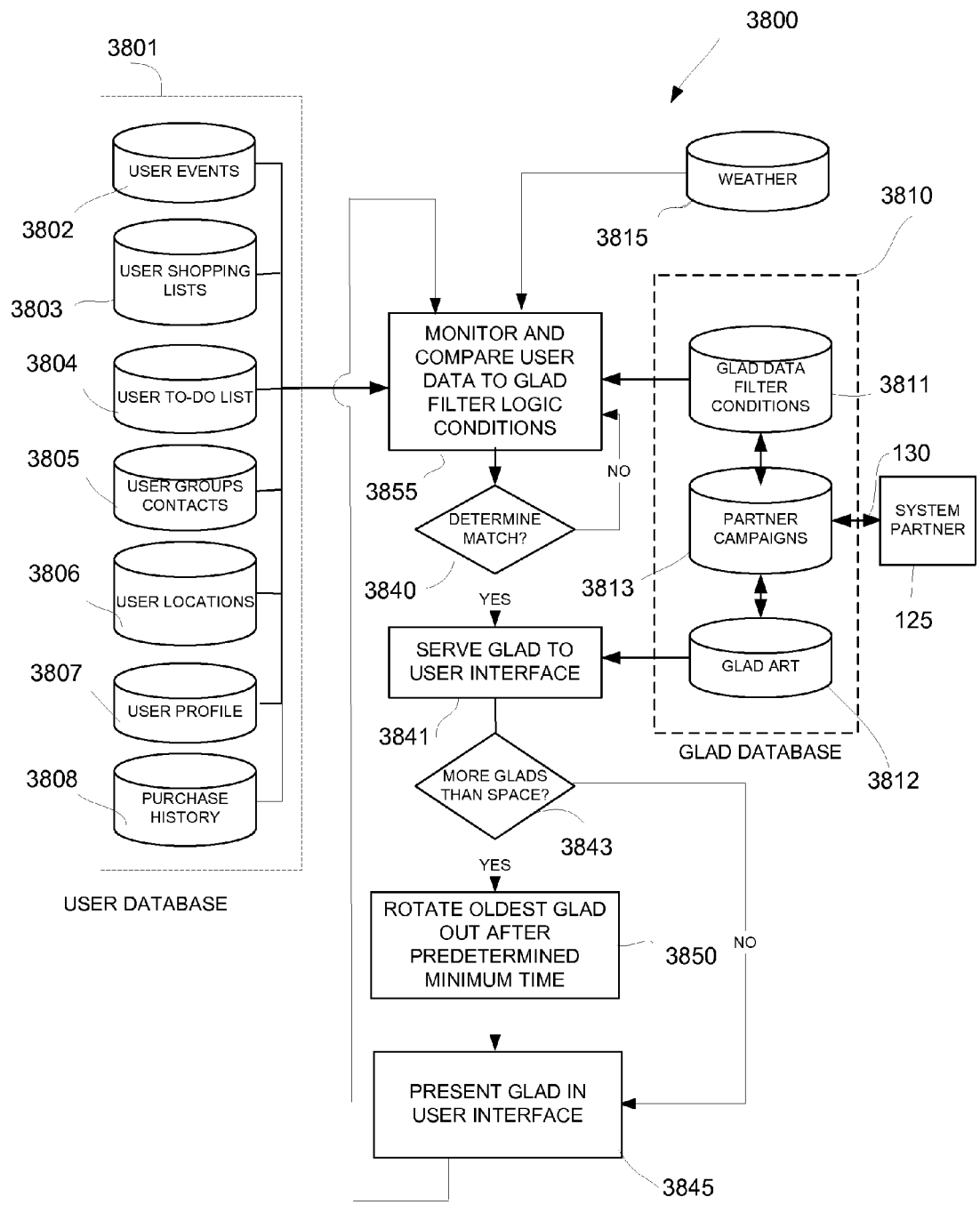
FIG. 38 shows an exemplary glad placement process.

FIG. 38 shows one example 3800 of the glad placement application process. The user database 3801 includes information on user events, shopping list, to-do list, groups, locations, and profile including a purchase history. The system also includes a database of advertisements 3810, such as, for example, Glads. The Glad database 3810 includes Glad Filters 3811 and Glad Art 3812. In addition, some of the Glads may be provided by a system partners 125 running Glad campaigns 3813, as explained in further detail below. In addition, other information sources, such as a weather database 3815 or information outlet (e.g., national weather service) may provide information to the system about weather conditions for a user. The service provider system Glad placement application continuously monitors time sensitive items from the user database 3820. In particular, the system may monitor those items of the user database having time elements, such as user calendar events, the to-do list, and the shopping list.

The Glad placement application constantly monitors the dynamic and ever changing user data stored in association with the user database to determine if any Glads are good candidates for presentation to a user 3855. In order to determine if any Glads are appropriate, the system monitors the user database 3801 and compares items in the database for each user to the filters 3811 associated with the Glads to determine any user data items matching those conditions 3855. The determination may include using a natural language interpretation (NLI) application and a search function (e.g., described above for focusing). In addition, information stored by the user database (e.g., the user profile) may be used to interpret what if any goods, products, or services are associated with an item on a shopping, to-do list, or calendar event. For example, since the system maintains a shopping/buy history database to store items purchased by the user, and since people often buy the same items over-and-over, the shopping history may be useful in aiding the system to interpret items entered on the shopping list. The determination also may include checking current or predicted weather from a weather database or nation weather service 3815. When determining a match, the system Glad placement logic uses data in the condition filters to determine if the Glad truly is a good candidate or match for a particular user. For example, the system may determine if the Glad is for the right user demographic, the right day/day-of-week, that the Glad is active, the right temperature at a user location, and that the user has not already placed an order or bought the item.

If a match is determined 3840, the Glad Art 3812 is served to the user interface for presentation in the graphic bar of the user interface 3841. The system Glad placement application also determines if there is enough space in the graphic bar to present the Glad 3843. If there is enough space, the Glad is presented 3845. If the graphics bar is already full of Glads, the system rotates out the oldest glad after a predetermined minimum period for display for the oldest Glad is met 3850, and then presents the new Glad in the vacated slot 3845.

Figure 39:
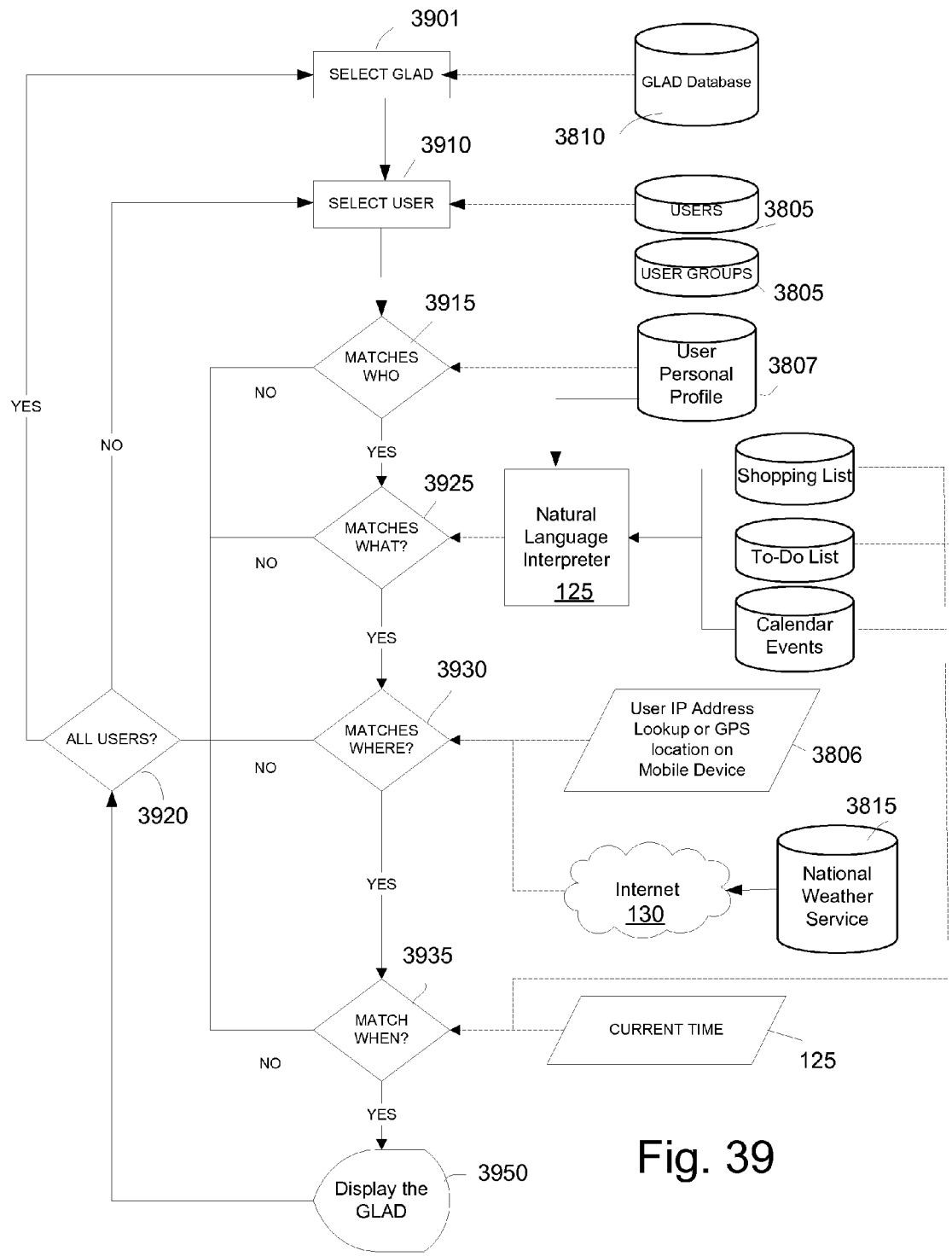
FIG. 39 show an exemplary process of application of glad filters.

FIG. 39 shows another example 3900 of the Glad placement logic for making a comparison between a user and the Glad logic filters. The Glad placement application selects a Glad from the Glad database 3901, and selects a user from user database 3910.

The application compares the who filter associated with the Glad to determine if the demographics of the conditions specified apply to the user 3915. For example, for each who filter condition specified, the system determines if the condition is met for the user. In this case all condition specified must be met. Any unspecified condition is met. If no who conditions are specified, the who filter is automatically satisfied. Examples of the conditions include user demographics, family/friends demographics, and group demographics. In order to check these conditions the system checks the user profile 3807 and the user contacts/groups 3805. If any condition is not met, then the application determines that filter is not satisfied, and the application determines if all users have been checked 3920. If not, the application selects another user for processing for the selected Glad 3910. If all users are checked, the application selects another Glad for processing 3901.

The application also compares the what filter associated with the Glad to determine if the conditions specified apply to the user 3925. For example, for each what filter condition specified, the system determines if any condition is met for the user. Any unspecified condition is met. If no What conditions are specified, the What filter is automatically satisfied. Examples of the conditions include a SKU, a Product Name, a Brand, a Category, an primary activity (a user's activity), a Secondary activity (one a user is invited to). In order to check these conditions the application determines if items in the users shopping list, to-do list, and calendar events meet the condition. To do this, a NLI may be used to determine if an item on the list corresponds to an item in the condition. In addition, the user profile and shopping history may be consulted to aid in the identification and/or provide disambiguation between multiple meanings for items. If any condition is met, then the application determines that filter is satisfied. If no what conditions are met, the application determines if all users have been checked 3920. If not, the application selects another user for processing for the selected Glad 3910. If all users are checked, the application selects another Glad for processing 3901.

The application also compares the where filter associated with the Glad to determine if the conditions specified apply to location of the user 3930. For example, for each filter condition specified, the system determines if the condition is met for the user. Any unspecified condition is met. If no where conditions are specified, the what filter is automatically satisfied. Examples of the conditions include a home location, a calendar event determined destination, a mobile (GPS) location, or weather at a user's location. If the where conditions are not met, then the application determines that filter is not satisfied, and the application determines if all users have been checked 3920. If not, the application selects another user for processing for the selected Glad 3910. If all users are checked, the application selects another Glad for processing 3901.

The application compares the when filter associated with the Glad to determine if the timing conditions specified apply to the user 3935. For example, for each filter condition specified the system determines if the condition of the timing of the Glad and the timing of the user is met. The timing conditions include a current time and a scheduled timing. The current time is a post/pull calendar dates. Unlike the other items, the post/pull dates filter condition may always be specified. In addition, day of the week and time of day (e.g., morning, afternoon, evening, late night) may be specified for the current time. A second condition is between x days before/after a scheduled timed item and y days before/after a scheduled timed item or calendar event. In this case, if the condition satisfying that What condition was a timed event (e.g., a calendar event or a shopping list/to-do item with a time specified), then the second timed condition is applied. If any condition is not met, then the application determines that filter is not satisfied, and the application determines if all users have been checked 3920. If not, the application selects another user for processing for the selected Glad 3910. If all users are checked, the application selects another Glad for processing 3901.

If all the Glad filter conditions are satisfied, the user is considered a match; the Glad is served to the user interface associated with the user 3940. The application determines if all users have been checked 3920. If not, the application selects another user for processing for the selected Glad 3910. If all users are checked, the application selects another Glad for processing 3901.

It should be noted that the matching of filters for who, what, where, and when, may be performed in any order; however, certain orders may provide faster processing speeds. Optimal orders of filters may be determined over time from empirical data and testing. In addition, parallel processing of the logic is possible. For example, multiple applications and processors may focus on a specific number, selection, or group of Glads and/or users from within the whole system.

The following example illustrates the Glad placement process.

A Glad #113 includes a .jpg file of a coupon for $5 off "Spicy Good BBQ sauce" and includes a link to the website www.spicygoodbbq.com. The Glad filter conditions are specified as follows: WHO [user demographics=men and 18-50 years old, family/friends demographics unspecified, group demographics=unspecified]; WHAT [SKU=unspecified, product name barbecue sauce, brand=unspecified, category=condiments, activity=barbecue, picnic, BBQ secondary activity=unspecified]; WHERE [home=unspecified, calendar event determined destination=unspecified, mobile (GPS)= unspecified, weather=unspecified]; and WHEN [current time=between post/pull calendar dates 06-21-08 to 09-21-08, Day of week=unspecified, and Time of day=unspecified; and scheduled time=between "x days before the scheduled calendar event" and "y days before the calendar event" x,y=30, 0].

A system user Martha a 35 year old female living in Seattle Wash. has an appointment on her calendar for Sunday, July 13th titled "BBQ." Martha's husband Bill, also a system user, is a 39 year male with the same appointment on his calendar. The Glad placement application selects Glad #113 for placement on Jun. 23, 2008. The placement application searches through system users' for placement of the Glad. Selecting Martha the application applies the Who filter. In this case, the application determines demographic filter is for men between 18-50 and compares it Martha's personal profile and determines she is female age 35. The condition is not met.

The placement application selects the next user Bill. The application applies the Who filter. In this case, the application determines the demographic filter is for men between 18-50 and compares it to Bill's personal profile and determines he is male age 39. The condition is met. The remaining who conditions are unspecified, and therefore are met.

The placement application applies the What filter. The placement application determines the Glad #113 what conditions are barbecue sauce on shopping list, any kind of condiments on shopping list, or any upcoming events on their calendars with the words barbecue, picnic, or BBQ. Comparing these to Bill the system finds BBQ in an event for Bill and the what condition is met.

The application applies the where filter. In this case, all where conditions are unspecified, so the where condition is automatically met.

The application applies the when filter. The placement application determines Glad #113 when conditions are that the Glad will run between 06-21-08 and 08-21-08" (summer) and that if it was a timed item or event that satisfied the What condition, the triggering timed or calendar event must be within the next month (30 days before to 0 days before). The current date at Bill's user device is Jun. 23, 2008 so the first condition is met. Day of week and time of Day are unspecified so they are met. In addition, the item triggering the what condition was a calendar event so the application determines the BBQ appointment is for July 13th and therefore is within the next 30 days or month so the second condition is met.

As all filters Who, What, Where, and When have been met, the application places an image on Bill's user interface of BBQ Ribs with the Text SPICY GOOD $5 dollars OFF a bottle with any purchase. Bill sees the Glad and clicks on it, and a window opens to window to the website www.spicy-goodbbq.com with the offer and a description of the product. Enticed Bill drags the Glad to his shopping list. The coupon is then offered for printing when Bill downloads or prints his shopping list.

Figure 40:
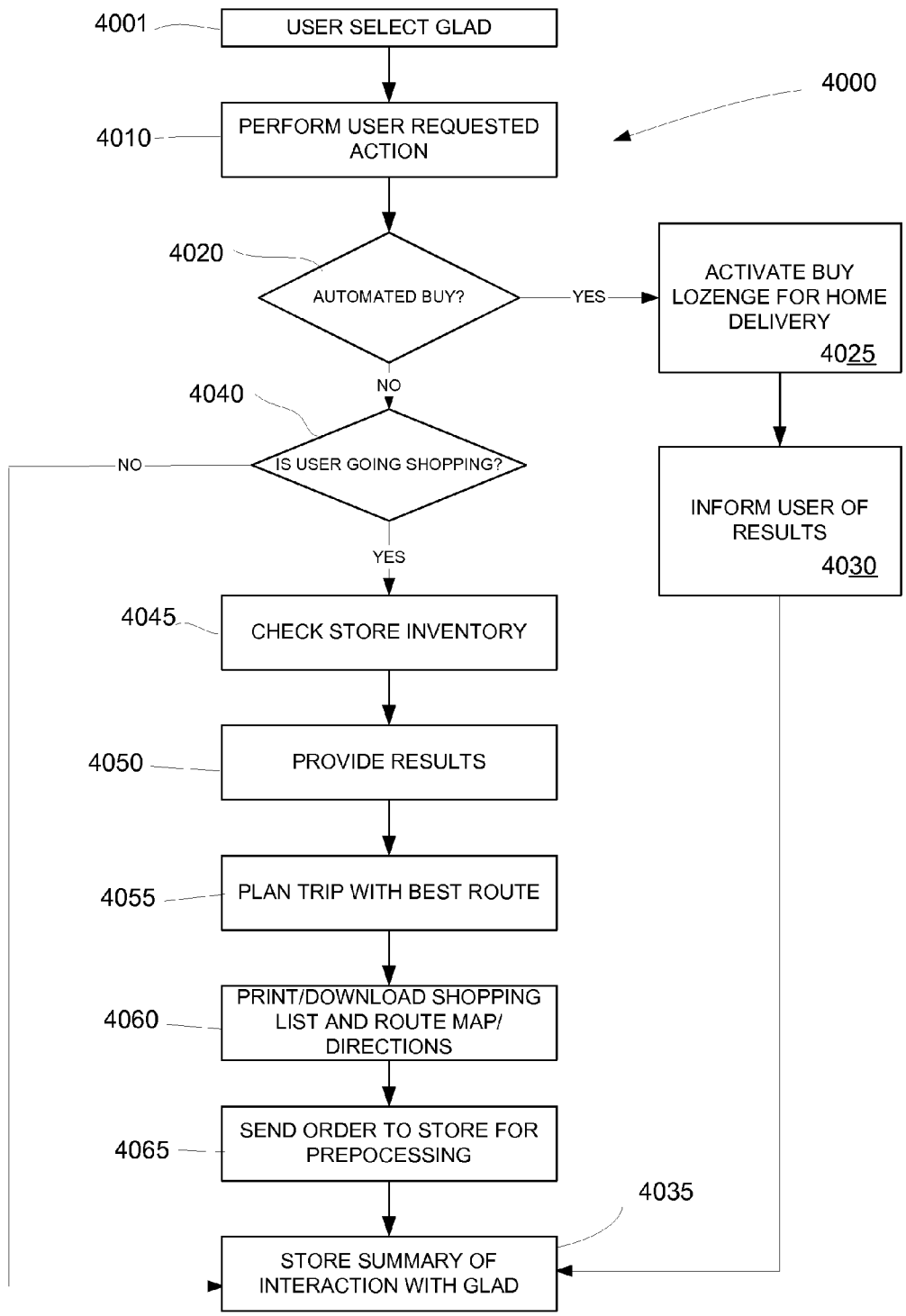
FIG. 40 shows an exemplary process for responding to user interaction with a glad.

FIG. 40 shows on example 4000 of a process for user interactions with Glads once the Glad is served to the graphics bar of the user interface. When user selects a glad 4001, the system identifies the user input and performs the desired action 4010. For example, if the user drags a glad to the calendar the system creates and event with the Glad. The system also determines if the user interaction is dragged the item to the buy lozenge to attempt to purchase the related item 4020. If the user drags the Glad to buy lozenge, the buy lozenge is activated and the system attempts to purchase the related item 4025 using the instructions provided via the buy lozenge, and apply, present, redeem any incentive or discount provided by the Glad. The system informs the user of the results the user 4030. If the system purchases the item and the Glad was triggered by an item on the user's shopping or to-do list, the system queries the user if it should tick of the item as completed. In addition, the system stores a summary of the interaction with the Glad for the campaign database 4035.

Figure 41:
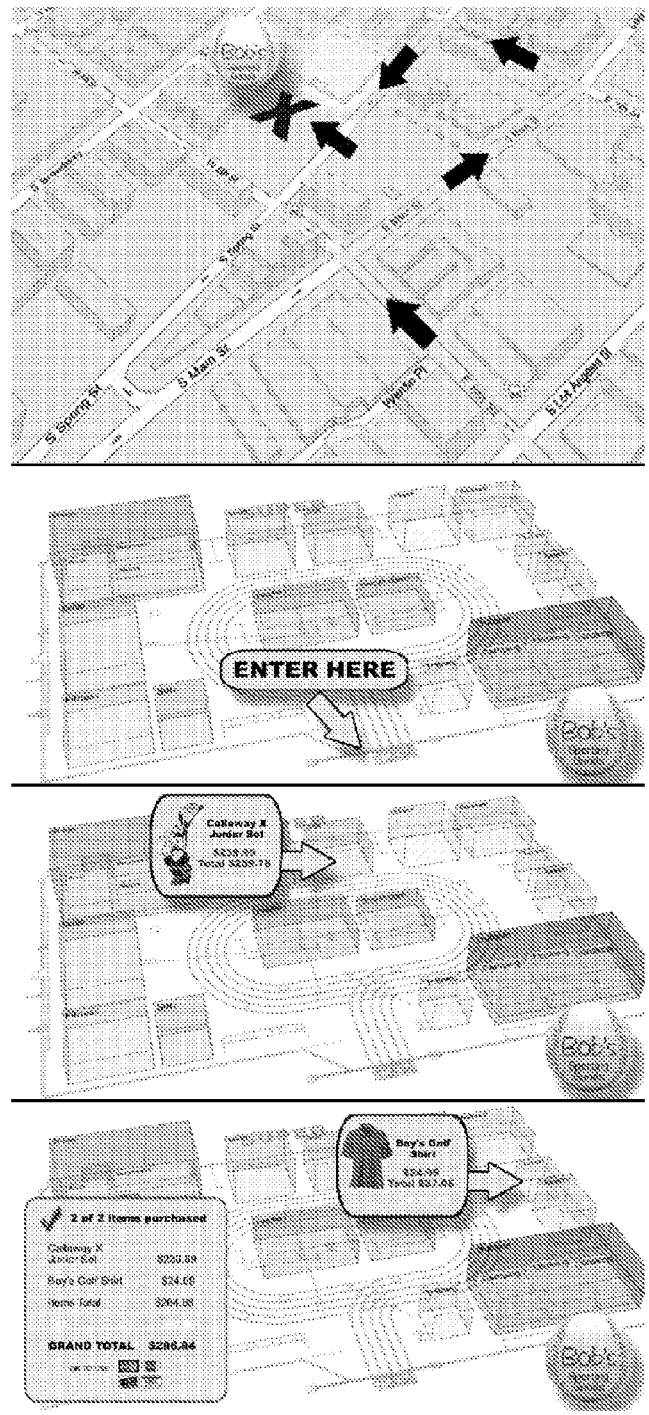
FIG. 41 shows an exemplary a shopping map route.

If the user has not engaged the system in an automatic buying of a product, the system determines whether the user is going shopping 4040. If user is not shopping, the system stores a summary of the interaction with the glad for the campaign database 4035. If the user is going shopping, the system checks local store inventors for the item and any other items on the user's shopping list 4045. If the a relationship with a local business is established to allow the system servers to access store specific information and inventory data, the system searches this information to determine if a store has existing inventory and where the items are located. The system provides the results of the inventory search to the user 4050. The system also plans the shopping trip by selecting the best route or commute for the user 4055. The system finds the best route using a mapping database to provide directions from store-to-store needed to purchase all items on the shopping list. The map, route, and direction may be presented on the Maps lozenge of the user interface. In addition, the system also may provide point-to-point driving directions and in-store maps to find the items on the list, an example of which is shown in FIG. 41. If the user is at home, a pop-up a box offering to print the Glad and or any incentives or coupons associated with the Glad is provide and a shopping agenda is provided to the user at the user's specified home device 4060. The system also offers to download the information to the mobile device to store coupons, directions, and a shopping agenda. The user also is given the option to send an order to the store for any items on the shopping list, to preprocess the order and have the user's selection waiting for them for pickup and/or payment 4065. In addition, the system stores a summary of the interaction with the Glad for the campaign database 4035.

System Partners

A system partner 125 may be any type of individual, group, or entity that provides products, goods, or services. The system partner also may be a branding company that subsidizes or sponsors a user account on the service provider system. The sponsored accounts may be offered to a user as a branded gift, a customer promotion, or incentive. The graphical user interface, described above, providing access to the service provider system via one of the sponsored accounts may be branded with logos, art, images, and advertising, and other digital media and/or content to brand the user interface and promote the system partner. In particular, a branded user interface provides a year-round targeted marketing vehicle for the system partner's products, goods, and services. The service provider system also provides the system partner with a powerful marketing/advertising tool that is able to target individual users with increasing degrees of specificity to provide the right information or incentive, at the right time and location and therefore substantially increase the likelihood of the user interacting with or using the advertisement. The service provider system 110 allows system partners 125 to design ad campaigns that market directly to users based on their interaction with the service provider system 110 and the user information stored by the system databases.

Each system partner 125 is granted access to the service provider system 110 through a communication path 130 to create and design a glad campaign, to view the results of previous and existing campaigns, and to edit campaigns. In one example, a system partner 125 may be provided with a username, a password, and an address or a locator to provide a browser with access to a website provided for system partner 125 by the service provider system 110. The system partner website provides a portal for the system partner 125 to access a glad placement application to manage a glad campaign. The glad creation application provides a system partner user interface that includes a Glad creation screen and a report screen. The Glad creation screen provides an interface to a system partner to upload information to create and edit Glads and determine how Glads are targeted to system users. The report screen provides the system partner with a tool to monitor glad placement and glad campaigns.

Figure 42:
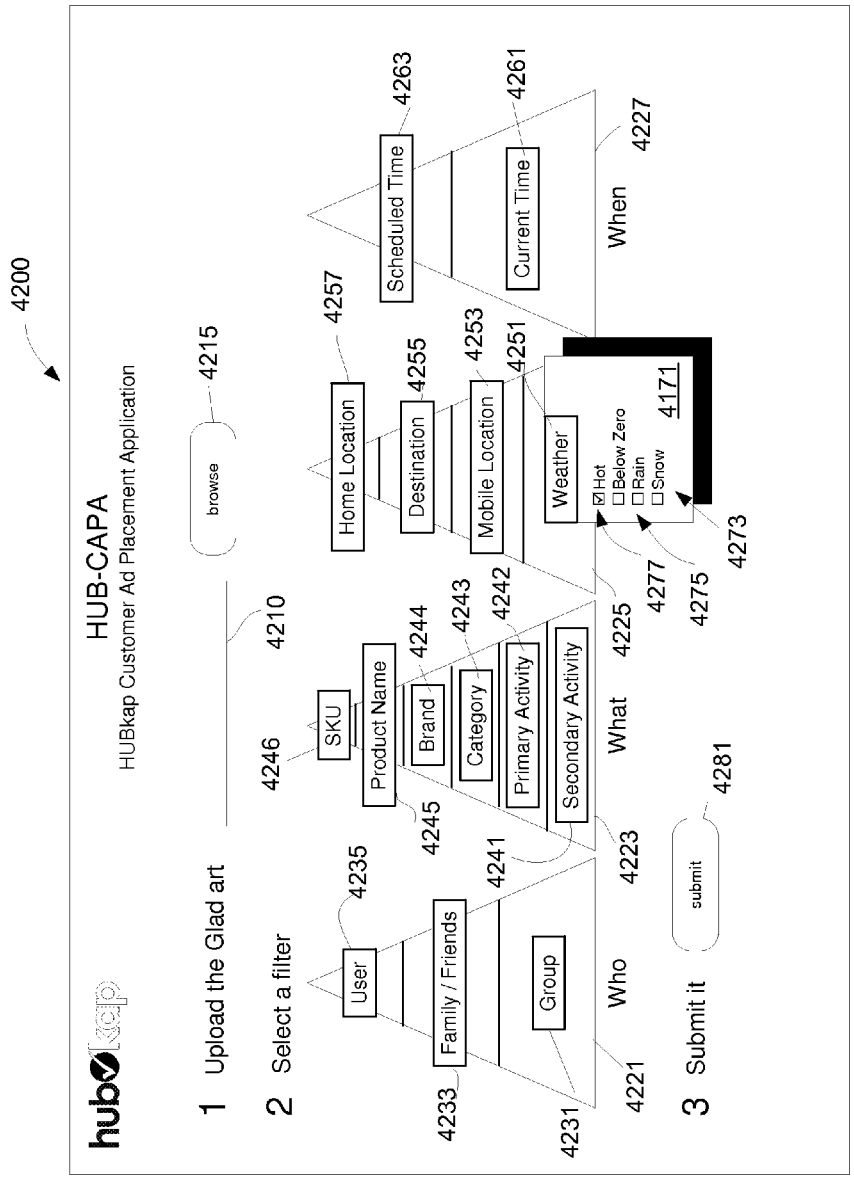
FIG. 42 shows an exemplary system partner user interface screen for Glad creation.

FIG. 42 shows one example 4200 of a Glad creation screen used to create Glads. Creating a Glad includes uploading the digital media and description that is served up to the user, selecting filters used by the service provider system for Glad placement, and submitting the Glad. The creation screen includes a file entry field 4210 and browse button 4215. The file entry field 4210 is used to enter a file location for the digital media that will be used to create the Glad. The browse button 4215 provides a convenient way to search for the file location of a glad by providing a drop down menu (not shown) of file locations and navigation buttons to help location a desired glad file. Once the file is located and/or selected the file path/location is displayed in the file entry field 4215.

The creation screen also provides a visual representation of glad filters depicted as a series of pyramids. The pyramids include inputs to set filters for serving the Glads to system users. The pyramids include a WHO pyramid 4221, a WHAT pyramid 4223, a WHERE pyramid 4225, and a WHEN pyramid 4227. The filters are used for comparison to user data stored in association with the WHO, the WHAT, the WHERE, and the WHEN strips of user interface. The each pyramid includes two or more filters that range from general (bottom of the pyramid) to specific (top of the pyramid) that may be used by a system partner to tailor a Glad campaign and how any Glad is served to a system user.

The who pyramid includes filters for groups 4231, family and friends 4233, and the user 4235. The most general filter is the group filter. The group filter targets contacts from a user group. Family and friends is more specific filter targeting individuals having a personal relation to the user, such as family members, business associates, and relationships (e.g., wife/husband, parent/child). The most specific filter is who which targets the individual user via information stored in the user's personal profile. For example, user personal profile information that may be used by the system partner to target individuals includes age, gender, income, hobbies/interests, and other demographic information about individuals stored in the user profile.

The what pyramid includes filters for a secondary activity/event 4241, a primary activity/event 4242, a category 4243, a brand 4244, a product name 4245, and a SKU 4246. The most general of the what filters is the secondary activity/event in which a particular product/service type is specified based on the activity associated with a calendar event to which a user is invited to. The primary activity/event filter specifies a particular product type based on the activity found in a calendar event generated by the user. The category filter specifies a particular product/service category or type of product (e.g., food, grocery, meat, dairy, produce, office supply, furniture, sporting equipment, clothing, electronics, books) much like the areas in a department store that are found in association with a user's to-do or shopping list. The brand filter specifies a particular brand of product. The product name filter specifies a particular product name. The most specific filter is a SKU number or code that specifies a particular product SKU (e.g., found on a user's shopping list).

The where pyramid includes filters based on location, such as weather 4251, a mobile location 4253, a destination 4255, and a home location 4257. The most general filter is the weather in which an advertiser specifies a particular product/service type based on the weather conditions at the location of a user. The mobile location filter is used to specify a particular product/service type based on the GPS location of a user's mobile device. The destination filters are used to specify a particular product/service type based on the user's scheduled destination locations (e.g., a location of an event). The most specific where filter is the user's home location which specifies a particular product/service type based on the user's device's actual physical location.

The when pyramid includes filters for a current time 4261 and a scheduled time 4263. The current time filter allows a particular product/service type to be specified based on the specific time at the user location (e.g., a current time, a day, a day-of-week, and a time-of-day). The scheduled time filter allows a particular product/service type to be specified based on the time of a future scheduled event in the user's calendar.

The system partner selects a particular step of the pyramid to activate the particular filter. Multiple filters on each pyramid may be selected and filters on one of more different pyramids may be selected. A pop up window 4271 is presented to solicit additional information about specific condition within the filter if necessary. The popup window 4271 may include a list of items 4273 (e.g., hot, below zero, rain, snow), an input 4275 (e.g., a check box) to select the item, and an indication 4277 (e.g., a check mark) of selected items. Filters and conditions within filters may be left unspecified.

Examples of specific conditions that may be solicited by who pyramid are as follows. For example, the user filter a popup window may request "Provide information on the type of user you wish to target?" Options may include age range, income range, hobbies/interests, gender. For the family/friends filter the system may indicate "the item or service is not for the user, but for someone they know. What is their relationship to the user?" Options provided may include husband, wife, son, daughter, niece, nephew, grandson, granddaughter, grandmother, grandfather, mother, father, friend, and business associate. The group popup window may solicit information based on the subjects derived from system data stored for groups allowing the advertiser to specify a general subject area for groups that the user might be involved in. Subjects may be determined or drawn from actual user data broken into groups, such as recreation, sports, scholastic, hobbies, activities, outdoor, nature, etc.).

The SKU filter popup window may solicit a specific product identifier, such as a UPC code(s) (e.g.: 792850110991 for Burt's bees beeswax lip balm). The product name popup window solicits a product name (e.g., lip balm). The brand popup solicits a brand name (e.g., Chap Stick). A category popup window solicits a product category which may be selected from a pre-made list or via a data entry field (e.g., personal care products). The primary activity/event window may solicit a particular product type based on a user created activity found on calendar event generated by the user (e.g., beach, skiing, boating) and activities drawn from actual user data, such as recreation, sports, scholastic, hobbies, activities, outdoor, etc. The secondary activity/event popup window solicits the same information as primary event except that it specifies activities that the user is invited to.

The weather popup window solicits information about weather at the user's location, such as hot (over 90°), warm (over 60°), cold (below 40°), freezing (below 0°), rain, and snow.

The scheduled time window solicits information about when to deliver the glad based a date range and on a future or past date. The window may provide a date entry field and/or mini calendar to enter a date range for the glad. The current time popup window provides inputs for specific times that may be provided specified to deliver the glad based on a current time, such as days of the week, time of day (e.g., morning, afternoon, evening, late night).

Once the file location of the glad digital media has been specified and the filters have been determined, the system partner may select the submit button 4281 to upload the Glad digital medium to the glad database and save the select filters in association with the glad. The browser uploads the file using any of the available automated file transfer protocols. The glad digital and the proposed filter setting are stored in a database in a package called a Glad Pack. The system service provider may review the Glad Pack to assure that the content meets the minimum standards (e.g., file type, graphics, content, and decency) and the filter settings provided. Once approved the Glad Pack data is provided to the customer incentive database, or they contact the system partner to make changes or adjustments to the Glad Pack info.

In one example, a system partner Big Time Golf wants to create a glad for upcoming father's day sale of 20% Supreme golf clubs. Big Time golf uploads an image of a man receiving a card from his son with his wife looking on and a big bow around a set of new Supreme golf clubs including Big Time Golf logo and the indication 20% off all Supreme Clubs. Setting the filters, Big time golf specifies who (family and friends=father, son, daughter, wife, grandfather), what (product name=golf clubs; brand=supreme; category=sports primary activity=golf; secondary activity=golf), and when (scheduled time=June $1^{st}$ through June $16^{th}$).

The service provider system continuously checks the glad database to determine if any Glads are presented via the user interface. The system searches through data stored for each user in association with the who, what, where, and when strips and the user profile. In particular, the system searches the items in the lozenges associated with each strip to compare the data stored for each user lozenge to the filters provided for the glad in the system partner campaign database. For example, the system searches items stored for the To-Do and Shopping lists, and interprets the items for comparison against the contents of the conditions in the glad database to trigger any specific glad for presentation to a user. When the system determines the user data meets the conditions stored in association with the glad, then the glad is presented via the user interface.

Figure 43:
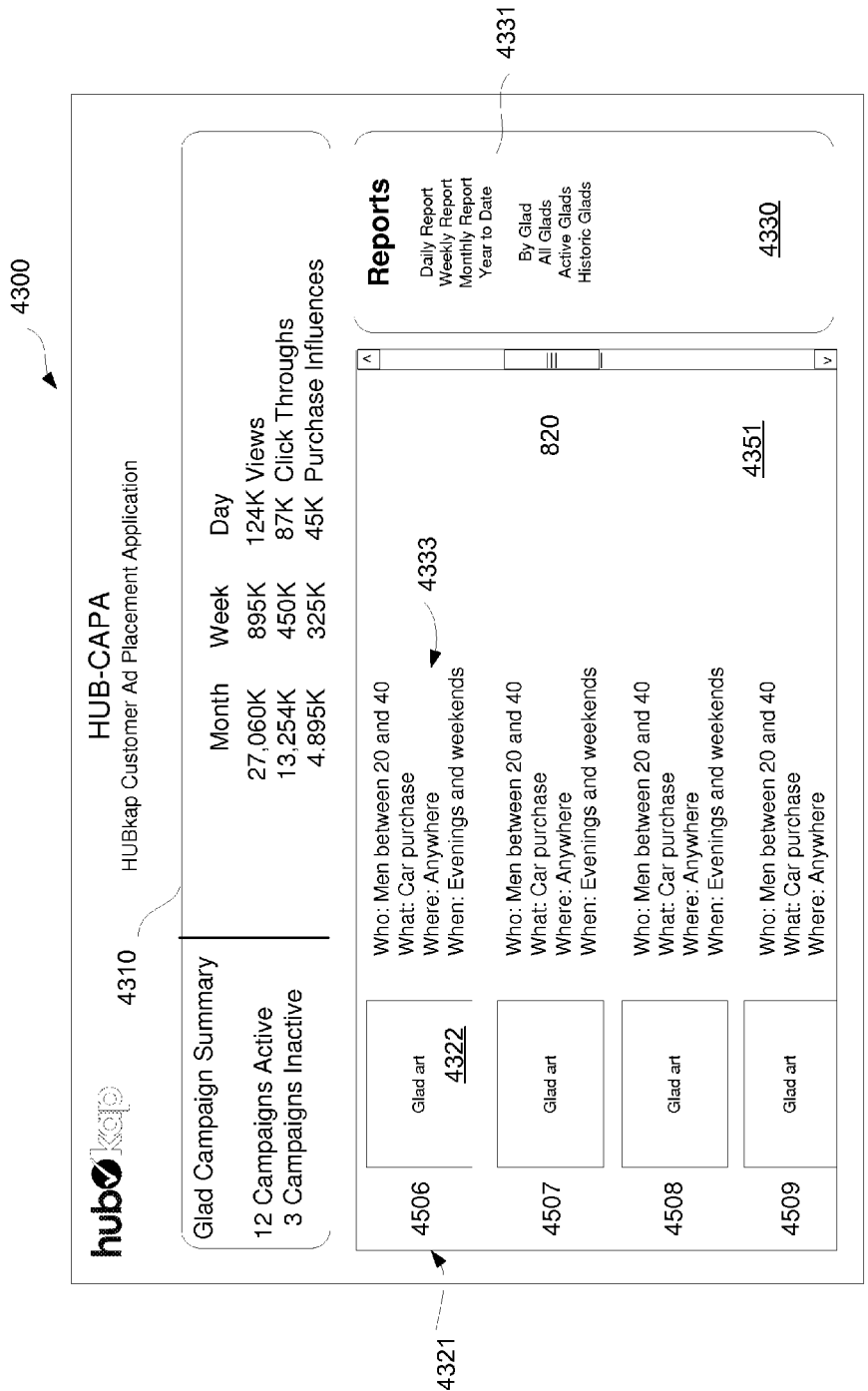
FIG. 43 shows an exemplary system partner user interface to monitor Glad campaigns.

FIG. 43 shows an example 4300 of the report screen. The report screen displays a summary of a Glad campaigns, detailed information, and reports for each Glad campaign that has been created by a system partner. The screen includes a summary window 4310, a details window 4320, and a report window 4330. The summary provides an indication of how many Glads campaigns are active and inactive. In addition, the summary provides overall information of how many Glads have been presented, how many Glads have been selected or otherwise viewed, and how many Glads have been associated with product purchases by time periods, such as month, week, and day.

The detail window 4320 presents individual information for each Glad campaign. The window 4320 includes a system identifier of the Glad 4321, a thumbnail representation/preview of the Glad 4323, associated filter information (e.g., under which conditions it is shown) 4324 and specific information for how many times a Glad has been displayed, interacted with by a user (e.g., viewed, manipulated, selected, dragged, and/or clicked on), and how many times a Glad has been associated with or influenced a purchase. A navigation aid 820 is provided to navigate the list of Glads if there insufficient area within the detail window 4320 to display all Glads at any one time.

A reports window 4330 is provided to automatically compile and generate reports from system data regarding the Glads. The window 4330 provides various inputs 4331 that may be selected by the system partner to generate a desired report. The inputs 4331 specify a time period and types of Glads. The time periods that may be selected include: a daily report, a weekly report, a monthly report, and a year to date report. The types of Glads for which reports may be run include: by individual Glad, by all Glads, by active Glads, and by Historic Glads. Examples of other information an data which may be stored, tracked and presented include a campaign number, a campaign name (not shown), a campaign preview (e.g., a graphic), a number of views by users (not show), seconds on screen (not shown), number of "clicks" or "hits" (not shown). System partners also may review specific user's "clicks" in an archive history of user matches. Partners also may use the data to determine a level of interactivity, a level of user response to promotion, and to analyze hits by user locations and geography and other real time information to change or "fine tune" content or a campaign.

Drag and Drop Glads

Figure 44:
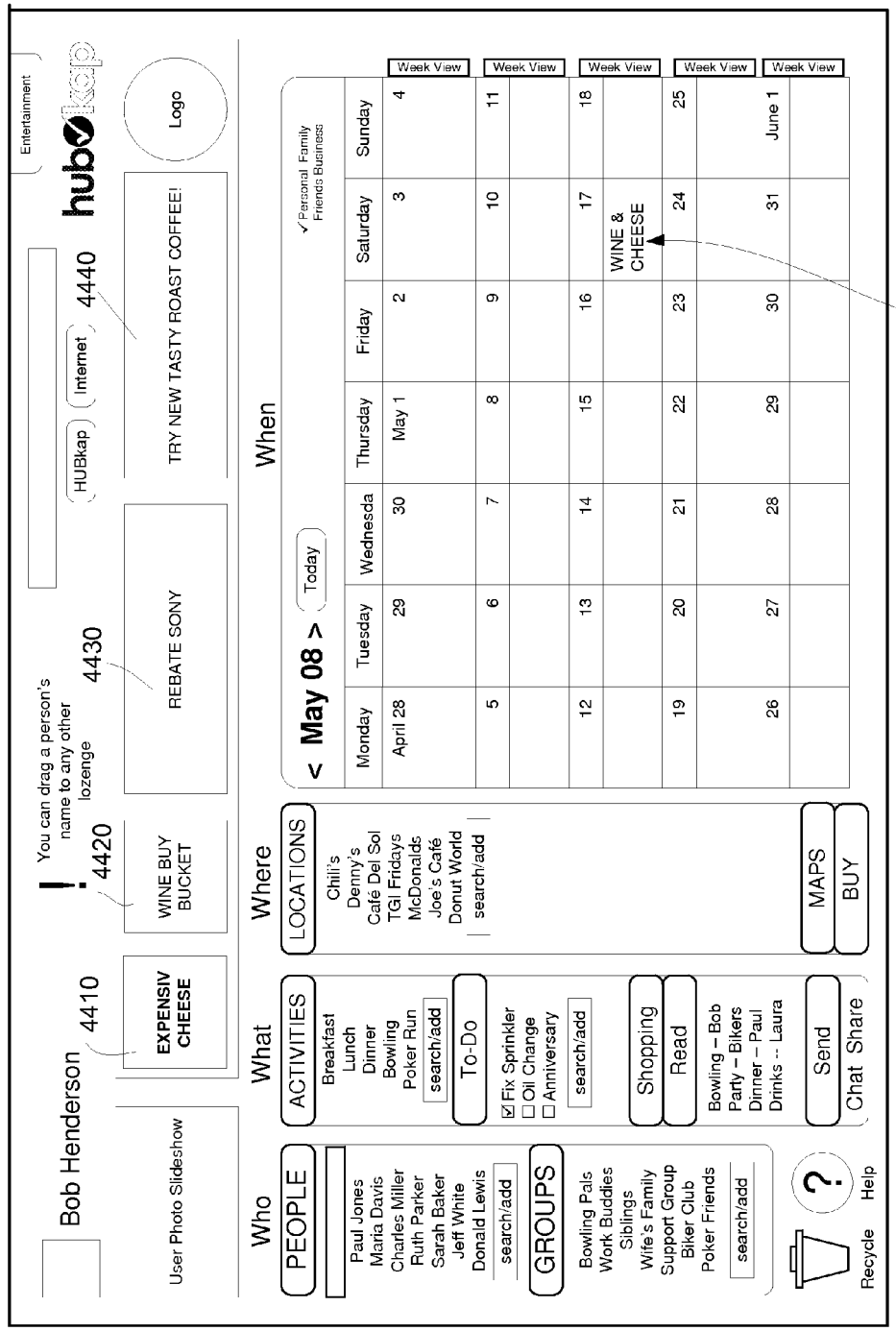
Figure 45:
Figure 46:
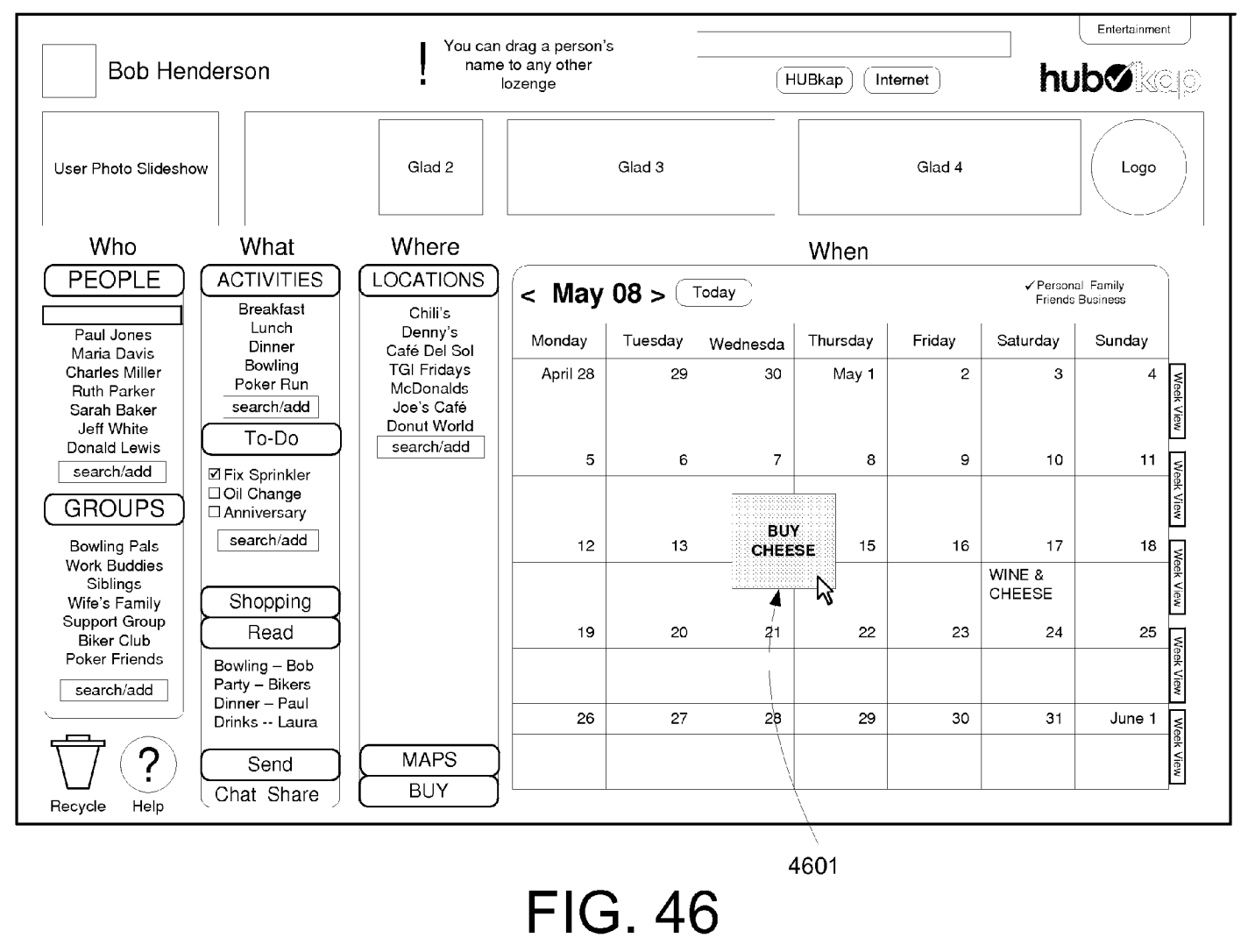
Figure 47:
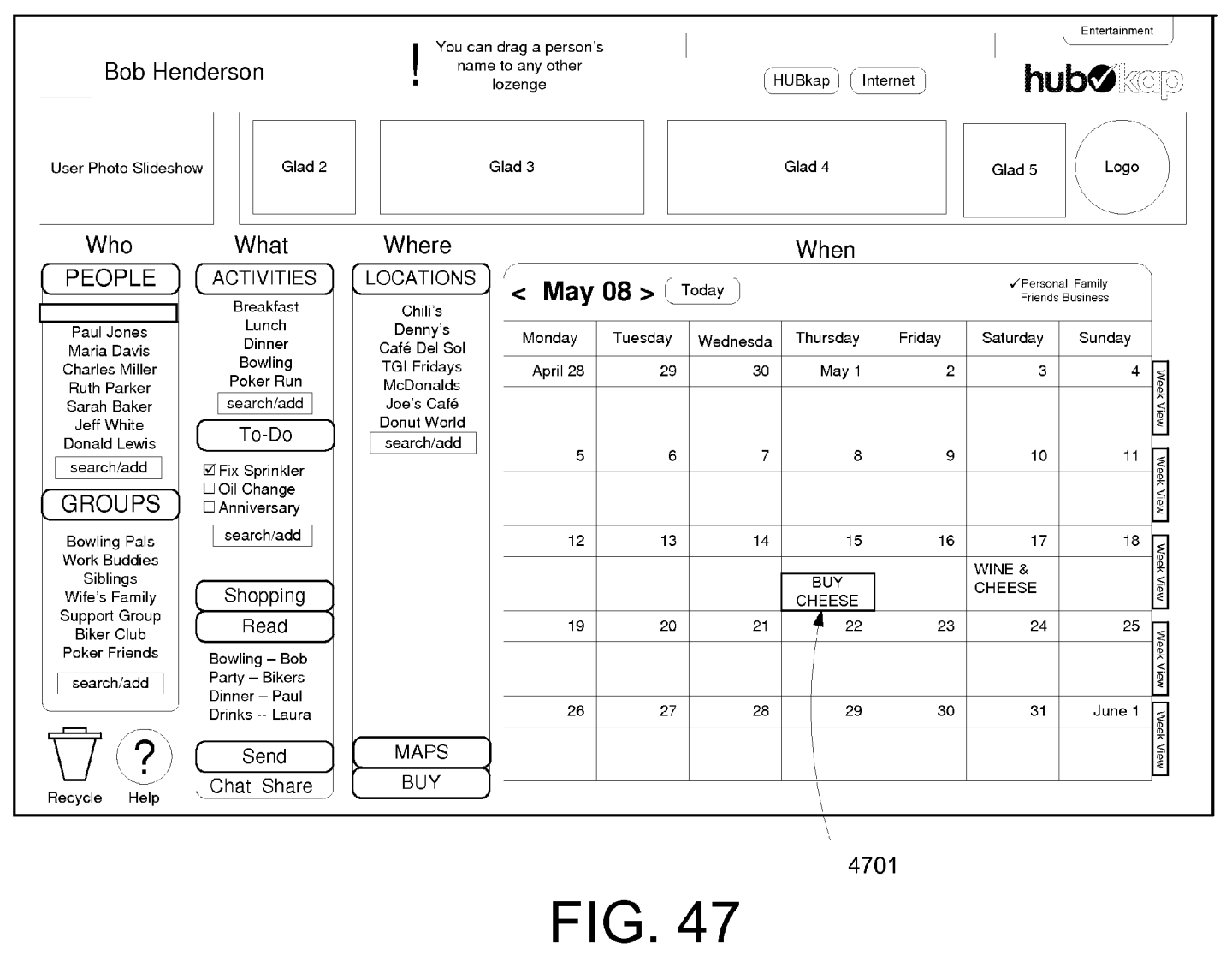

As mentioned above, when a glad is triggered or served it is placed in the graphics bar of the user interface. As shown in FIG. 44 the graphics bar 426 includes four Glads for 20% off Expensive Cheese 4410, Wine by the Bucket 4420, Rebate on All Sony products 4430, Try new coffee 4440. These Glads have been served to the user interface using the Glad placement logic. Once a Glad is displayed, a user may interact with the Glad. In particular, as described above, various items presented in the user interface may be dragged and dropped from one area to another (e.g., drag a contacts name from the group lozenge to the calendar lozenge to create an appointment with the contact). This is also true for Glads as shown in FIGS. 44-47. In an example shown in FIG. 44 a user notices a Glad for 20% off Expensive Cheese found in a Gourmet food chain with a store located in the user's town. The user is interested because they are attending a wine and cheese party this weekend (e.g., as indicated by the event "wine and cheese" event 4443 on their calendar). The user decides this coupon 4410 might be just the thing to bring to the event but is not going shopping today. Therefore, in order to save the coupon for her shopping trip Thursday morning, she places a user selection device (e.g., a pointer or a cursor) in position (e.g., over the glad) to select a glad (e.g., clicking a mouse button) for the glad coupon for cheese, as shown in FIG. 45. As shown in FIG. 46, the glad is captured and dragged 4601 to the calendar lozenge and dropped on a specific date or event. If no event on the calendar is present and event is created. If an event does exist the coupon is added to the event. In this case the service provider system automatically saves the glad coupon by creating an event 4701 associated with the user's calendar on May 15, 2008, as shown in FIG. 47. The user is automatically reminded or presented with the coupon on that date. The glad also may be accessed at any time by selecting the event. Glads also may be dragged to the top-do list, for example, a glad for lumber dragged to a to-do item build deck. Likewise, Glads may be dragged to the shopping list of the shopping lozenge to be associated with an item on the list. A glad may be dragged to an event to be stored in association with the event. A Glad may be dragged to a person on the people lozenge or group on the group lozenge to be sent by the user to the person or group. Dragging a Glad to the lozenge without direction to a particular item may be used to automatically create and item. For example, drag a glad to the shopping lozenge or to-do lozenge may be used to add the item to the shopping list or to-do list.

A number of exemplary implementations have been described. Nevertheless, it will be understood that various modifications may be made. For example, suitable results may be achieved if the steps of described techniques are performed in a different order and/or if components in a described components, architecture, or devices are combined in a different manner and/or replaced or supplemented by other components. Accordingly, other implementations are within the scope of the following claims.

What is claimed is:

1. A method of serving configurable electronic advertising content targeting a user of an online service provider system for presentation in a user interface provided in association with the online service provider system, the system including one or more user databases and one or more processing devices, the method comprising:

storing user data in at least one of the one more user databases based on a particular user's interaction with the user interface, the user data including data associated with a user calendar and a future event stored in association with the user calendar of the particular user;

accessing, by at least one of the one more processing devices, the configurable electronic advertising content including electronic advertisements stored in at least one advertising database, each electronic advertisement having at least four associated configurable filters each configured with a condition by at least one of an online service provider, system partner, or advertiser to target the electronic advertisement to a user, the four configurable filters including a first filter configured to target demographic or other data identifying who a user associated with an event is, a second filter configured to target data associated with the user calendar and the future event indicative of what the user associated with the event is going to do at the event, a third filter configured to target where a location of the event associated with the user is, and a fourth filter configured to target when the event associated with the user is going to occur;

comparing, by at least one of the one more processing devices, data of the future event associated with the particular user to each of the four configurable filters of one or more the electronic advertisements;

determining, by at least one of the one more processing devices, that a condition of each of the four configurable filters of at least one electronic advertisement matches data of the future event associated with the particular user; and serving the at least one electronic advertisement determined to match data of the future event associated with the particular user as advertising content for presentation by the user interface.

2. The method of claim 1 wherein the configurable filter condition configured to target who the user of the event is includes a condition indicating a type of relationship of the user to another person.

3. The method of claim 1 wherein the configurable filter condition configured to target where the location of the event of the user is includes a condition indicating one of a type of location or an address associated with the event.

4. The method of claim 1 wherein the configurable filter condition configured to target what the user is going to do at the event includes a condition indicating one or more of a user activity, a type of user event, a category of product or service, a brand, a product or service name, and a stock keeping unit.

5. The method of claim 1 wherein the configurable filter condition configured to target when the event of the user is going to occur includes a condition indicating a predetermined period of time before or a date relative to a time the event is scheduled to occur.

6. The method of claim 1 wherein determining that the condition of each of the configurable filters matches data of the future event includes determining that the condition of a configurable filter that is left unspecified is determined to match the future event.

7. The method of claim 1 wherein serving the at least one electronic advertisement includes providing a graphical advertisement (Glad) for presentation by the user interface.

8. The method of claim 7 wherein the Glad for presentation includes information indicating one of an incentive, a coupon, a value, a price, a discount, an offer, and a rebate associated with a product or a service.

9. The method of claim 8 further comprising monitoring indications of an interaction of a user with the Glad and storing data about the interaction.

10. The method of claim 1 wherein each of the four configurable filters includes digital data configurable from a range of conditions from general to specific that is selected by the online service provider, the system partner, or the advertiser to tailor targeting of the advertisement to a particular user associated with an event.

11. A system to serve configurable electronic content targeting a user of an online service provider system for presentation in a user interface provided in association with the online service provider system, the system comprising:

a database configured to store user data based on a particular user's interaction with the user interface, the user data including data associated with a user calendar and a future event stored in association with the user calendar of the particular user; and one or more processing devices configured to:

access the configurable electronic advertising content including electronic advertisements stored in at least one advertising database, each electronic advertisement having at least four associated configurable filters each configured by at least one of an online service provider, system partner, or advertiser to target the electronic advertisement to a user, the four configurable filters including a first filter configured to target demographic or other data identifying who a user associated with an event is, a second filter configured to target data associated with the user calendar and the future event indicative of what the user associated with the event is going to do at the event, a third filter configured to target where a location of the event associated with the user is, and a fourth filter configured to target when the event associated with the user is going to occur;

compare data of the future event associated with the particular user to the four configurable filters of one or more the electronic advertisements;

determine that a condition of each of the four configurable filters of at least one electronic advertisement matches data of the future event associated with the particular user; and serve the at least one electronic advertisement determined to match data of the future event associated with the particular user as advertising content for presentation by the user interface.

12. The system of claim 11 wherein the configurable filter condition configured to target who the user of the event is includes a condition indicating a type of relationship of the user to another person.

13. The system of claim 11 wherein the configurable filter condition configured to target where the location of the event of the user is includes a condition indicating one of a type of location or an address associated with the event.

14. The system of claim 11 wherein the configurable filter condition configured to target what the user is going to do at the event includes a condition indicating one or more of a user activity, a type of user event, a category of product or service, a brand, a product or service name, and a stock keeping unit.

15. The system of claim 11 wherein the configurable filter condition configured to target when the event of the user is going to occur includes a condition indicating a predetermined period of time before or a date relative to a time the event is scheduled to occur.

16. The system of claim 11 wherein the one or more processing devices configured to determine that a condition of each of the configurable filters matches data of the future event is further configured to determine that the condition of a configurable filter that is left unspecified is determined to match the future event.

17. The system of claim 11 wherein the at least one advertisement is a graphical advertisement (Glad) configured for presentation by the user interface.

18. The system of claim 17 wherein the Glad is configured to present information indicating one of an incentive, a coupon, a value, a price, a discount, an offer, and a rebate associated with a product or a service.

19. The system of claim 18 wherein at least one of the one or more processing devices is configured to monitor indications of an interaction of a user with the Glad and store data about the interaction in a database.

20. The system of claim 11 wherein each of the four configurable filters includes digital data configurable from a range of conditions from general to specific that is selected by the online service provider, the system partner, or the advertiser to tailor targeting of the advertisement to a particular user associated with an event.

21. A method of serving electronic advertising content for presentation in association with a user interface, the method comprising:

storing user data associated with a plurality of users in a user database based on interaction of a user with a user interface;

accessing, by one or more processing devices, electronic advertising content stored in at least one advertising database including a plurality of electronic advertisements, each of the plurality of electronic advertisements configurable to target a user, the plurality of configurable electronic advertisements including at least four associated configurable filters each configured with a condition by at least one of an online service provider, system partner, or advertiser to target the advertisement to a particular user, the four configurable filters including a first filter configured to target demographic or other information identifying who the particular user is, a second filter configured to target data indicative of what the particular user is doing, a third filter configured to target where what is being done by the particular user is; and a fourth filter configured to target when what is being done by the particular user is supposed to occur;

comparing, by at least one of the one or more processing devices, the user data associated with the plurality of users to each of the four configurable filters of the plurality of electronic advertisements;

determining, by at least one of the one or more processing devices, that the user data associated with at least one of the plurality of users matches a condition of each of the four configurable filters of at least one of the plurality of electronic advertisements; and serving the at least one electronic advertisement for presentation by the user interface associated with the at least one of the plurality of users based on the determination.

22. The method of claim 21 further comprising setting a condition of each of the four filters to configure the at least one of the plurality of electronic advertisements to target a particular user by receiving input from one of the online service provider, the system partner, or the advertiser indicating selection from one of a plurality of predetermined different conditions provided for each of the filters.

23. The method of claim 21 wherein determining that the user data associated with at least one of the plurality of users matches each of the four configurable filters includes determining that the user data associated with at least one of the plurality of users matches a configurable filter of the electronic advertisement when a condition of the configurable filter is left unspecified.

24. The method of claim 21 further comprising providing an interface operative to provide configuration of one or more of the four configurable filters from a range of general to specific conditions selectable by the online service provider, the system partner, or the advertise to tailor targeting of an electronic advertisement to a particular user.

25. A system to serve electronic advertising content for presentation in association with a user interface, the system comprising:

a database configured to store user data associated with a plurality of users in a user database based on interaction of a user with a user interface; and one or more processing devices configured to:

access electronic advertising content stored in at least one advertising database including a plurality of electronic advertisements, each of the plurality of electronic advertisements configurable to target a user, the plurality of configurable electronic advertisements having at least four associated configurable filters each configured with a condition by at least one of an online service provider, system partner, or advertiser to target the advertisement to a particular user, the four configurable filters including a first filter configured to target demographic or other data identifying who the particular user is, a second filter configured to target data indicative of what the particular user is doing, a third filter configured to target where what is being done by the particular user is; and a filter configured to target when what is being done by the particular user is supposed to occur;

compare the user data associated with the plurality of users to each of the four configurable filters of the plurality of electronic advertisements;

determine that the user data associated with at least one of the plurality of users matches a condition of each of the four configurable filters of at least one of the plurality of electronic advertisements; and serve the at least one electronic advertisement for presentation by the user interface associated with the at least one of the plurality of users based on the determination.

26. The system of claim 25 wherein at least one of the one or more processing devices is further configured to set condition of each of the four filters to configure at least one electronic advertisement to target a user in response to an input received from the online service provider, the system partner, or the advertiser indicating a selection from one of a plurality of predetermined different conditions provided for each of the filters.

27. The system of claim 25 wherein at least one of the one or more processing devices configured to determine that the user data associated with at least one of the plurality of users matches each of the four configurable filters is further configured to determine that the user data associated with at least one of the plurality of users matches a configurable filter of the electronic advertisement when a condition of the configurable filter is left unspecified.

28. The system of claim 25 wherein at least one of the one or more processing devices is further configured to provide an interface operative to provide configuration of one or more of the four configurable filters from a range of general to specific conditions selectable by the online service provider, the system partner, or the advertise to tailor targeting of an electronic advertisement to a particular user.

* * * * *